(12) United States Patent
Pryor

(10) Patent No.: US 8,576,199 B1
(45) Date of Patent: Nov. 5, 2013

(54) COMPUTER CONTROL SYSTEMS

(75) Inventor: Timothy R. Pryor, Tecumseh (CA)

(73) Assignee: Apple Inc., Cupertino, CA (US)

( * ) Notice: Subject to any disclaimer, the term of this patent is extended or adjusted under 35 U.S.C. 154(b) by 1230 days.

(21) Appl. No.: 11/878,024

(22) Filed: Jul. 20, 2007

Related U.S. Application Data

(63) Continuation of application No. 11/272,868, filed on Nov. 15, 2005, now abandoned, which is a continuation of application No. 09/789,538, filed on Feb. 22, 2001, now Pat. No. 7,084,859.

(60) Provisional application No. 60/183,807, filed on Feb. 22, 2000.

(51) Int. Cl.
*G06F 3/042* (2006.01)

(52) U.S. Cl.
USPC ........................................ 345/175; 178/18.09

(58) Field of Classification Search
USPC ................ 345/173–178; 178/18.01–18.11
See application file for complete search history.

(56) References Cited

U.S. PATENT DOCUMENTS

| | | | |
|---|---|---|---|
| 3,609,695 A | 9/1971 | Pirkle | |
| 3,748,751 A | 7/1973 | Breglia et al. | |
| 3,757,322 A | 9/1973 | Barkan et al. | |
| 3,825,730 A | 7/1974 | Worthington, Jr. et al. | |
| 3,846,826 A | 11/1974 | Mueller | |
| 4,014,000 A | 3/1977 | Uno et al. | |
| 4,017,848 A | 4/1977 | Tannas, Jr. | |
| 4,146,924 A | 3/1979 | Birk et al. | |
| 4,219,847 A | 8/1980 | Pinkney et al. | |
| 4,303,856 A | 12/1981 | Serras-Paulet et al. | |
| 4,305,071 A | 12/1981 | Bell et al. | |
| 4,305,131 A | 12/1981 | Best | |
| 4,346,376 A | 8/1982 | Mallos | |
| 4,375,674 A | 3/1983 | Thornton | |
| 4,396,945 A | 8/1983 | DiMatteo et al. | |
| 4,435,835 A | 3/1984 | Sakow et al. | |
| 4,475,122 A | 10/1984 | Green | |
| 4,484,179 A | 11/1984 | Kasday | |
| 4,542,375 A | 9/1985 | Alles et al. | |
| 4,561,017 A | 12/1985 | Greene | |

(Continued)

FOREIGN PATENT DOCUMENTS

| | | |
|---|---|---|
| GB | 2 435 369 A | 8/2007 |
| JP | 63-167923 A | 7/1988 |

(Continued)

OTHER PUBLICATIONS

Final Office Action mailed Jan. 19, 2011, for U.S. Appl. No. 11/980,721, filed Oct. 31, 2007, nine pages.

(Continued)

*Primary Examiner* — Bipin Shalwala
*Assistant Examiner* — Steven Holton
(74) *Attorney, Agent, or Firm* — Morrison & Foerster LLP

(57) ABSTRACT

Methods for controlling computers using touch input devices such as touch screens and touch pads are disclosed. These methods include several tactile features that allow reliable operation even in situations where the user has trouble seeing the display of an associated device, and are particularly valuable in stress situations such as encountered in vehicles or using certain mobile devices. Several novel methods of displaying and sensing information in these situations are also disclosed, as are many examples of apparatus useful in vehicles and the home.

16 Claims, 32 Drawing Sheets

(56) References Cited

U.S. PATENT DOCUMENTS

| | | |
|---|---|---|
| 4,613,942 A | 9/1986 | Chen |
| 4,629,319 A | 12/1986 | Clarke et al. |
| 4,631,525 A | 12/1986 | Serravalle, Jr. |
| 4,631,676 A | 12/1986 | Pugh |
| 4,644,100 A | 2/1987 | Brenner et al. |
| 4,644,326 A | 2/1987 | Villalobos et al. |
| 4,654,872 A | 3/1987 | Hisano et al. |
| 4,686,374 A | 8/1987 | Liptay-Wagner et al. |
| 4,703,306 A | 10/1987 | Barritt |
| 4,710,760 A | 12/1987 | Kasday |
| 4,746,770 A | 5/1988 | McAvinney |
| 4,772,028 A | 9/1988 | Rockhold et al. |
| 4,787,040 A | 11/1988 | Ames et al. |
| 4,814,759 A | 3/1989 | Gombrich et al. |
| 4,818,048 A * | 4/1989 | Moss ............................. 345/7 |
| 4,853,888 A | 8/1989 | Lata et al. |
| 4,948,371 A | 8/1990 | Hall |
| 4,988,981 A | 1/1991 | Zimmerman et al. |
| 4,993,806 A | 2/1991 | Clausen et al. |
| 5,045,843 A | 9/1991 | Hansen |
| 5,045,846 A | 9/1991 | Gay et al. |
| 5,072,294 A | 12/1991 | Engle |
| 5,153,829 A | 10/1992 | Furuya et al. |
| 5,168,531 A | 12/1992 | Sigel |
| 5,212,555 A | 5/1993 | Stoltz |
| 5,227,985 A | 7/1993 | DeMenthon |
| 5,252,951 A | 10/1993 | Tannenbaum et al. |
| 5,328,190 A | 7/1994 | Dart et al. |
| 5,412,189 A | 5/1995 | Cragun |
| 5,418,760 A | 5/1995 | Kawashima et al. |
| 5,422,656 A | 6/1995 | Allard et al. |
| 5,459,793 A | 10/1995 | Naoi et al. |
| 5,483,261 A | 1/1996 | Yasutake |
| 5,488,204 A | 1/1996 | Mead et al. |
| 5,489,940 A | 2/1996 | Richardson et al. |
| 5,495,269 A | 2/1996 | Elrod et al. |
| 5,495,576 A | 2/1996 | Ritchey |
| 5,502,514 A | 3/1996 | Vogeley et al. |
| 5,510,806 A | 4/1996 | Busch |
| 5,511,148 A | 4/1996 | Wellner |
| 5,515,079 A | 5/1996 | Hauck |
| 5,530,456 A | 6/1996 | Kokubo |
| 5,559,301 A | 9/1996 | Bryan, Jr. et al. |
| 5,572,239 A | 11/1996 | Jaeger |
| 5,594,469 A | 1/1997 | Freeman et al. |
| 5,613,913 A | 3/1997 | Ikematsu et al. |
| 5,649,706 A | 7/1997 | Treat, Jr. et al. |
| 5,709,219 A | 1/1998 | Chen et al. |
| 5,712,661 A | 1/1998 | Jaeger |
| 5,726,685 A | 3/1998 | Kuth et al. |
| 5,729,249 A | 3/1998 | Yasutake |
| 5,736,975 A | 4/1998 | Lunetta |
| 5,777,603 A | 7/1998 | Jaeger |
| 5,805,145 A | 9/1998 | Jaeger |
| 5,805,146 A | 9/1998 | Jaeger et al. |
| 5,825,352 A | 10/1998 | Bisset et al. |
| 5,831,601 A | 11/1998 | Vogeley et al. |
| 5,835,079 A | 11/1998 | Shieh |
| 5,841,428 A | 11/1998 | Jaeger et al. |
| 5,859,631 A | 1/1999 | Bergman et al. |
| 5,867,149 A | 2/1999 | Jaeger |
| 5,871,251 A | 2/1999 | Welling et al. |
| 5,880,411 A | 3/1999 | Gillespie et al. |
| 5,923,319 A | 7/1999 | Bishop et al. |
| 5,933,134 A | 8/1999 | Shieh |
| 5,936,613 A | 8/1999 | Jaeger et al. |
| 5,949,345 A | 9/1999 | Beckert et al. |
| 5,977,867 A | 11/1999 | Blouin |
| 5,982,352 A | 11/1999 | Pryor |
| 5,982,353 A | 11/1999 | Gallery et al. |
| 5,982,355 A | 11/1999 | Jaeger et al. |
| 5,995,104 A | 11/1999 | Kataoka et al. |
| 6,005,611 A | 12/1999 | Gullichsen et al. |
| 6,008,800 A | 12/1999 | Pryor |
| 6,013,956 A | 1/2000 | Anderson, Jr. |
| 6,049,328 A | 4/2000 | Vanderheiden |
| 6,054,990 A | 4/2000 | Tran |
| 6,057,540 A | 5/2000 | Gordon et al. |
| 6,061,177 A | 5/2000 | Fujimoto |
| 6,063,030 A | 5/2000 | Vara et al. |
| 6,066,075 A | 5/2000 | Poulton |
| 6,154,201 A | 11/2000 | Levin et al. |
| 6,175,610 B1 | 1/2001 | Peter |
| 6,188,391 B1 | 2/2001 | Seely et al. |
| 6,219,035 B1 | 4/2001 | Skog et al. |
| 6,256,020 B1 | 7/2001 | Pabon et al. |
| 6,278,441 B1 | 8/2001 | Gouzman et al. |
| 6,282,264 B1 | 8/2001 | Smith et al. |
| 6,289,258 B1 | 9/2001 | Carter, Jr. et al. |
| 6,310,610 B1 | 10/2001 | Beaton et al. |
| 6,323,846 B1 | 11/2001 | Westerman et al. |
| 6,326,956 B1 | 12/2001 | Jaeger et al. |
| 6,339,748 B1 | 1/2002 | Hiramatsu |
| 6,388,655 B1 * | 5/2002 | Leung ............................ 345/157 |
| 6,392,632 B1 | 5/2002 | Lee |
| 6,396,477 B1 | 5/2002 | Hinckley et al. |
| 6,411,877 B2 | 6/2002 | Böckmann et al. |
| 6,412,961 B1 | 7/2002 | Hicks |
| 6,414,672 B2 | 7/2002 | Rekimoto et al. |
| 6,421,042 B1 | 7/2002 | Omura et al. |
| 6,421,046 B1 | 7/2002 | Edgren |
| 6,429,846 B2 | 8/2002 | Rosenberg et al. |
| 6,441,806 B1 | 8/2002 | Jaeger |
| 6,441,807 B1 | 8/2002 | Yamaguchi |
| 6,457,834 B1 | 10/2002 | Cotton et al. |
| 6,473,069 B1 * | 10/2002 | Gerpheide .................... 345/157 |
| 6,478,432 B1 | 11/2002 | Dyner |
| 6,481,851 B1 | 11/2002 | McNelley et al. |
| 6,489,947 B2 | 12/2002 | Hesley et al. |
| 6,501,515 B1 | 12/2002 | Iwamura |
| 6,505,088 B1 | 1/2003 | Simkin et al. |
| 6,545,670 B1 | 4/2003 | Pryor |
| 6,563,492 B1 | 5/2003 | Furuya et al. |
| 6,563,769 B1 * | 5/2003 | Van Der Meulen ........ 369/30.06 |
| 6,570,557 B1 | 5/2003 | Westerman et al. |
| 6,570,584 B1 | 5/2003 | Cok et al. |
| 6,611,252 B1 | 8/2003 | DuFaux |
| 6,642,943 B1 | 11/2003 | Machida |
| 6,664,948 B2 | 12/2003 | Crane et al. |
| 6,690,365 B2 | 2/2004 | Hinckley et al. |
| 6,690,387 B2 | 2/2004 | Zimmerman et al. |
| 6,697,721 B2 | 2/2004 | Arlinsky |
| 6,703,599 B1 | 3/2004 | Casebolt et al. |
| 6,707,027 B2 | 3/2004 | Liess et al. |
| 6,740,860 B2 | 5/2004 | Kobayashi |
| 6,762,751 B2 | 7/2004 | Kuan |
| 6,781,570 B1 | 8/2004 | Arrigo et al. |
| 6,791,467 B1 | 9/2004 | Ben-Ze'ev |
| 6,795,056 B2 | 9/2004 | Norskog et al. |
| 6,816,150 B2 | 11/2004 | Casebolt et al. |
| 6,833,825 B1 | 12/2004 | Farag et al. |
| 6,842,170 B1 * | 1/2005 | Akins et al. ................... 345/173 |
| 6,896,375 B2 | 5/2005 | Peterson et al. |
| 6,950,094 B2 | 9/2005 | Gordon et al. |
| 6,995,744 B1 | 2/2006 | Moore et al. |
| 7,002,749 B2 | 2/2006 | Kremen |
| 7,006,080 B2 | 2/2006 | Gettemy |
| 7,015,894 B2 | 3/2006 | Morohoshi |
| 7,030,861 B1 | 4/2006 | Westerman et al. |
| 7,079,114 B1 | 7/2006 | Smith et al. |
| 7,084,859 B1 | 8/2006 | Pryor |
| 7,098,891 B1 | 8/2006 | Pryor |
| 7,136,045 B2 | 11/2006 | Rosenberg et al. |
| 7,158,123 B2 | 1/2007 | Myers et al. |
| 7,170,488 B2 | 1/2007 | Kehlstadt et al. |
| 7,184,064 B2 | 2/2007 | Zimmerman et al. |
| RE40,153 E | 3/2008 | Westerman et al. |
| 7,397,464 B1 | 7/2008 | Robbins et al. |
| 7,417,681 B2 | 8/2008 | Lieberman et al. |
| 7,466,843 B2 | 12/2008 | Pryor |
| 7,489,303 B1 | 2/2009 | Pryor |
| 7,663,607 B2 | 2/2010 | Hotelling et al. |
| 7,675,504 B1 | 3/2010 | Smith et al. |
| 7,714,849 B2 | 5/2010 | Pryor |

(56) References Cited

U.S. PATENT DOCUMENTS

| | | | |
|---|---|---|---|
| 7,970,870 | B2 | 6/2011 | Hinckley et al. |
| 8,228,305 | B2 | 7/2012 | Pryor |
| 2001/0012001 | A1 | 8/2001 | Rekimoto et al. |
| 2002/0030667 | A1 | 3/2002 | Hinckley et al. |
| 2002/0093487 | A1 | 7/2002 | Rosenberg |
| 2002/0113778 | A1 | 8/2002 | Rekimoto et al. |
| 2002/0130839 | A1 | 9/2002 | Wallace et al. |
| 2003/0001010 | A1 | 1/2003 | Schmidt et al. |
| 2003/0038849 | A1 | 2/2003 | Craven et al. |
| 2003/0072077 | A1 | 4/2003 | Peterson et al. |
| 2003/0073461 | A1 | 4/2003 | Sinclair |
| 2003/0076306 | A1 | 4/2003 | Zadesky et al. |
| 2003/0128188 | A1 | 7/2003 | Wilbrink et al. |
| 2004/0046741 | A1 | 3/2004 | Low et al. |
| 2004/0113886 | A1 | 6/2004 | Lee |
| 2004/0141157 | A1 | 7/2004 | Ramachandran et al. |
| 2004/0183782 | A1 | 9/2004 | Shahoian et al. |
| 2004/0227739 | A1 | 11/2004 | Tani et al. |
| 2004/0227830 | A1 | 11/2004 | Kobayashi et al. |
| 2005/0064936 | A1 | 3/2005 | Pryor |
| 2005/0078087 | A1 | 4/2005 | Gates et al. |
| 2005/0122308 | A1 | 6/2005 | Bell et al. |
| 2005/0134565 | A1 | 6/2005 | Hong |
| 2005/0259077 | A1 | 11/2005 | Adams et al. |
| 2006/0026521 | A1 | 2/2006 | Hotelling et al. |
| 2006/0047509 | A1 | 3/2006 | Ding et al. |
| 2006/0097991 | A1 | 5/2006 | Hotelling et al. |
| 2006/0150120 | A1 | 7/2006 | Dresti et al. |
| 2006/0197753 | A1 | 9/2006 | Hotelling |
| 2006/0227099 | A1 | 10/2006 | Han et al. |
| 2007/0159453 | A1 | 7/2007 | Inoue |
| 2007/0296688 | A1 | 12/2007 | Nakamura et al. |
| 2008/0024463 | A1 | 1/2008 | Pryor |
| 2008/0029691 | A1 | 2/2008 | Han |
| 2008/0088587 | A1 | 4/2008 | Pryor |
| 2008/0129707 | A1 | 6/2008 | Pryor |
| 2008/0211779 | A1 | 9/2008 | Pryor |
| 2009/0267902 | A1 | 10/2009 | Nambu et al. |
| 2009/0267921 | A1 | 10/2009 | Pryor |
| 2009/0273563 | A1 | 11/2009 | Pryor |
| 2009/0273574 | A1 | 11/2009 | Pryor |
| 2009/0273575 | A1 | 11/2009 | Pryor |
| 2009/0300531 | A1 | 12/2009 | Pryor |
| 2009/0322499 | A1 | 12/2009 | Pryor |
| 2010/0231506 | A1 | 9/2010 | Pryor |
| 2012/0287072 | A1 | 11/2012 | Pryor |
| 2013/0009900 | A1 | 1/2013 | Pryor |

FOREIGN PATENT DOCUMENTS

| | | |
|---|---|---|
| JP | 05-297979 A | 11/1993 |
| JP | 07-230352 A | 8/1995 |
| JP | 2000-163031 A | 6/2000 |
| JP | 2002-342033 A | 11/2002 |
| JP | 2005-233679 A | 9/2005 |
| WO | WO-00/21795 A1 | 4/2000 |
| WO | WO-01/94156 A2 | 12/2001 |
| WO | WO-01/94156 A3 | 12/2001 |
| WO | WO-2004/008081 A2 | 1/2004 |
| WO | WO-2004/008081 A3 | 1/2004 |
| WO | WO-2004/091956 A2 | 10/2004 |
| WO | WO-2004/091956 A3 | 10/2004 |
| WO | WO-2005/026938 A2 | 3/2005 |
| WO | WO 2007/034591 A1 | 3/2007 |
| WO | WO-2007/035491 A1 | 3/2007 |
| WO | WO-2007/112742 A1 | 10/2007 |
| WO | WO-2008/045665 A1 | 4/2008 |
| WO | WO-2010/135478 A2 | 11/2010 |

OTHER PUBLICATIONS

Non-Final Office Action mailed Feb. 17, 2011, for U.S. Appl. No. 11/852,690, filed Sep. 10, 2007, 10 pages.
Final Office Action mailed Mar. 9, 2011, for U.S. Appl. No. 11/980,722, filed Oct. 31, 2007, 11 pages.
Final Office Action mailed Mar. 21, 2011, for U.S. Appl. No. 11/832,134, filed Aug. 1, 2007, 33 pages.
Non-Final Office Action mailed Apr. 4, 2011, for U.S. Appl. No. 11/272,868, filed Nov. 15, 2005, nine pages.
Non-Final Office Action mailed Apr. 29, 2011, for U.S. Appl. No. 11/980,721, filed Oct. 31, 2007, 10 pages.
Bales, J. W. et al. (Apr. 1981). "Marking Parts to Aid Robot Vision," NASA Technical Paper 1819, 37 pages.
Final Office Action mailed Nov. 12, 2009, for U.S. Appl. No. 11/349,350, nine pages.
Final Office Action mailed Sep. 2, 2010, for U.S. Appl. No. 11/272,868, filed Nov. 15, 2005, nine pages.
International Search Report mailed Aug. 28, 2007, for PCT Application No. PCT/US2004/009701, filed Mar. 31, 2004, one page.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Jan. 6, 2009, for U.S. Appl. No. 11/349,350, filed Feb. 8, 2006, 10 pages.
Non-Final Office Action mailed Mar. 5, 2009, for U.S. Appl. No. 11/272,868, filed Nov. 15, 2005, 15 pages.
Non-Final Office Action mailed Dec. 7, 2009, for U.S. Appl. No. 11/272,868, filed Nov. 15, 2005, seven pages.
Non-Final Office Action mailed Jul. 29, 2010, for U.S. Appl. No. 11/980,721, filed Oct. 31, 2007, nine pages.
Non-Final Office Action mailed Aug. 2, 2010, for U.S. Appl. No. 11/980,722, filed Oct. 31, 2007, five pages.
Non-Final Office Action mailed Sep. 17, 2010, for U.S. Appl. No. 11/832,134, filed Aug. 1, 2007, 26 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
U.S. Appl. No. 11/272,868, filed Nov. 15, 2005, by Pryor.
U.S. Appl. No. 11/349,350, filed Feb. 8, 2006, by Pryor.
U.S. Appl. No. 11/878,024, filed Jul. 20, 2007, by Pryor.
U.S. Appl. No. 90/010,571, filed Jun. 10, 2009, by Pryor.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Jul. 29, 2011, for U.S. Appl. No. 11/852,690, filed Sep. 10, 2007, 11 pages.
Non-Final Office Action mailed Jul. 19, 2011, for U.S. Appl. No. 11/980,722, filed Oct. 31, 2007, 12 pages.
Notice of Allowance mailed Jun. 9, 2008, for U.S. Appl. No. 10/611,814, filed Jul. 2, 2003, seven pages.
Notice of Allowance mailed Aug. 12, 2011, for U.S. Appl. No. 11/375,418, filed Mar. 13, 2006, seven pages.
Supplementary European Search Report mailed Jul. 11, 2011, for EP Application No. 04759053.4, filed Mar. 31, 2004, three pages.
Non-Final Office Action mailed Sep. 23, 2011, for U.S. Appl. No. 12/500,973, filed Jul. 10, 2009, five pages.
Non-Final Office Action mailed Sep. 29, 2011, for U.S. Appl. No. 12/030,776, filed Feb. 13, 2008, seven pages.
Non-Final Office Action mailed Sep. 30, 2011, for U.S. Appl. No. 12/468,401, filed May 19, 2009, 19 pages.
Final Office Action mailed Oct. 27, 2011, for U.S. Appl. No. 11/980,721, filed Oct. 31, 2007, 17 pages.
Final Office Action mailed Nov. 10, 2011, for U.S. Appl. No. 11/272,868, filed Nov. 15, 2005, nine pages.
Final Office Action mailed May 29, 2012, for U.S. Appl. No. 12/500,978, filed Jul. 10, 2009, 10 pages.
Non-Final Office Action mailed May 23, 2012, for U.S. Appl. No. 13/310,511, filed Dec. 2, 2011, 10 pages.
Final Office Action mailed Jun. 8, 2012, for U.S. Appl. No. 12/167,237, filed Jul. 2, 2008, 21 pages.
Non-Final Office Action mailed Jun. 13, 2012, for U.S. Appl. No. 12/500,984, filed Jul. 10, 2009, eight pages.

(56) References Cited

OTHER PUBLICATIONS

Final Office Action mailed Sep. 18, 2012, for U.S. Appl. No. 11/852,690, filed Sep. 10, 2007, 13 pages.
Final Office Action mailed Oct. 3, 2012, for U.S. Appl. No. 13/310,511, filed Dec. 2, 2011, 10 pages.
Final Office Action mailed Oct. 25, 2012, for U.S. Appl. No. 11/832,134, filed Aug. 1, 2007, 27 pages.
Notice of Allowance mailed Sep. 6, 2012, for U.S. Appl. No. 13/556,019, filed Jul. 23, 2012, seven pages.
Non-Final Office Action mailed Oct. 26, 2012, for U.S. Appl. No. 12/468,401, filed May 19, 2009, 22 pages.
Final Office Action mailed Apr. 13, 2012, for U.S. Appl. No. 12/468,401, filed May 19, 2009, 21 pages.
Final Office Action mailed May 9, 2012, for U.S. Appl. No. 11/980,722, filed May 9, 2012, 14 pages.
Non-Final Office Action mailed Dec. 8, 2011, for U.S. Appl. No. 12/500,925, filed Jul. 10, 2009, nine pages.
Non-Final Office Action mailed Dec. 9, 2011, for U.S. Appl. No. 12/500,984, filed Jul. 10, 2009, nine pages.
Non-Final Office Action mailed Dec. 12, 2011, for U.S. Appl. No. 12/500,951, filed Jul. 10, 2009, eight pages.
Non-Final Office Action mailed Dec. 16, 2011, for U.S. Appl. No. 12/500,978, filed Jul. 10, 2009, nine pages.
Non-Final Office Action mailed Mar. 2, 2012, for U.S. Appl. No. 11/852,690, filed Sep. 10, 2007, 12 pages.
Non-Final office Action mailed Mar. 26, 2012, for U.S. Appl. No. 12/030,776, filed Feb. 13, 2009, five pages.
Non-Final Office Action mailed May 2, 2012, for U.S. Appl. No. 11/832,134, filed Aug. 1, 2007, 25 pages.
Notice of Allowance mailed Mar. 26, 2012, for U.S. Appl. No. 12/500,973, filed Jul. 10, 2009, 12 pages.
Final Office Action mailed Dec. 12, 2012, for U.S. Appl. No. 12/500,984, filed Jul. 10, 2009, 10 pages.
Ju, W. et al. (Apr. 1, 2001). "CounterActive: An Interactive Cookbook for the Kitchen Counter," *Proceedings of 2001 Conference on Human Factors in Computing Systems*, located at http://www.media.mit.edu/pia/counteractive/counteractive-final.pdf, pp. 269-270.
Notice of Allowance mailed Dec. 24, 2012, for U.S. Appl. No. 13/556,019, filed Jul. 23, 2012, five pages.
Notice of Allowance mailed Feb. 22, 2013, for U.S. Appl. No. 12/500,978, filed Jul. 10, 2009, five pages.

\* cited by examiner

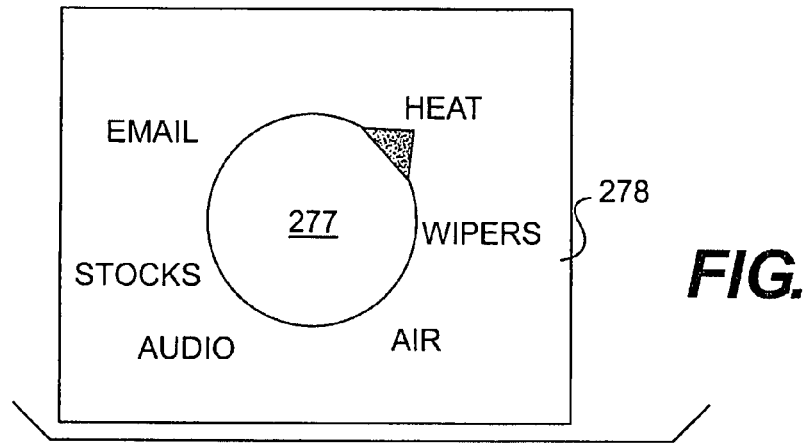
FIG. 2f
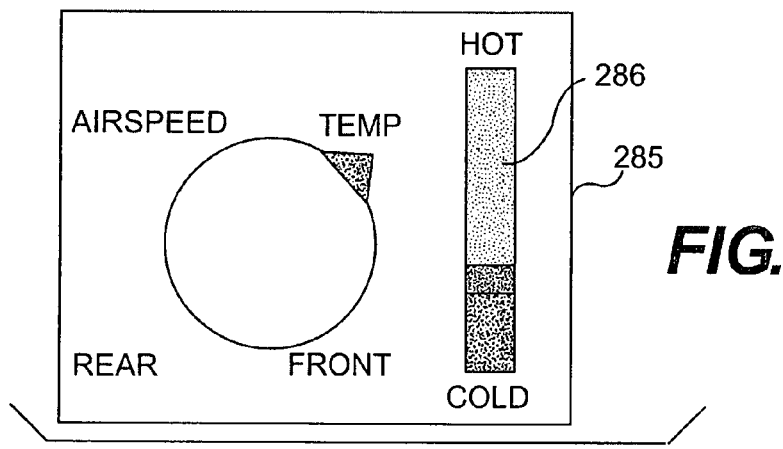
FIG. 2g
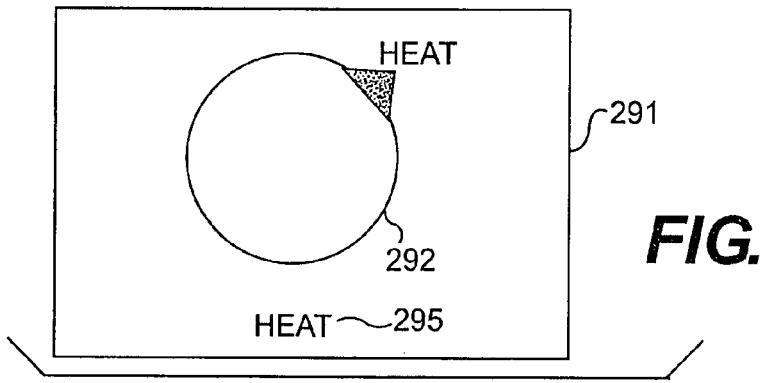
FIG. 2h
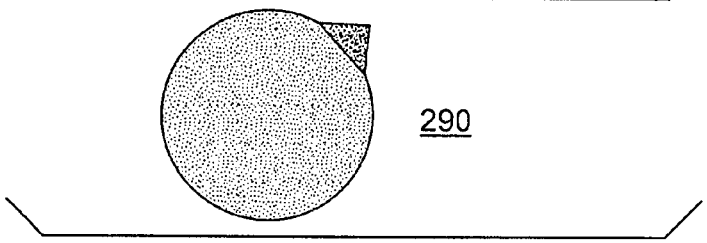

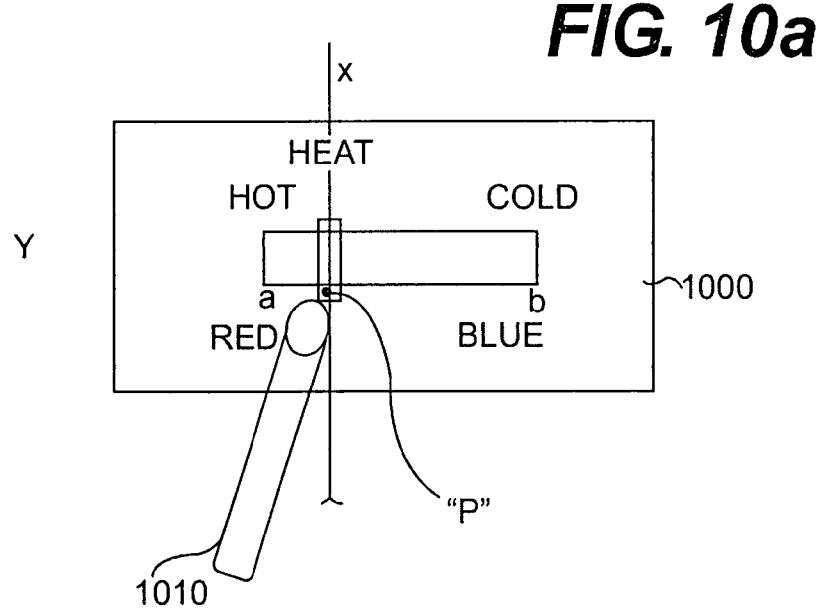
FIG. 10a
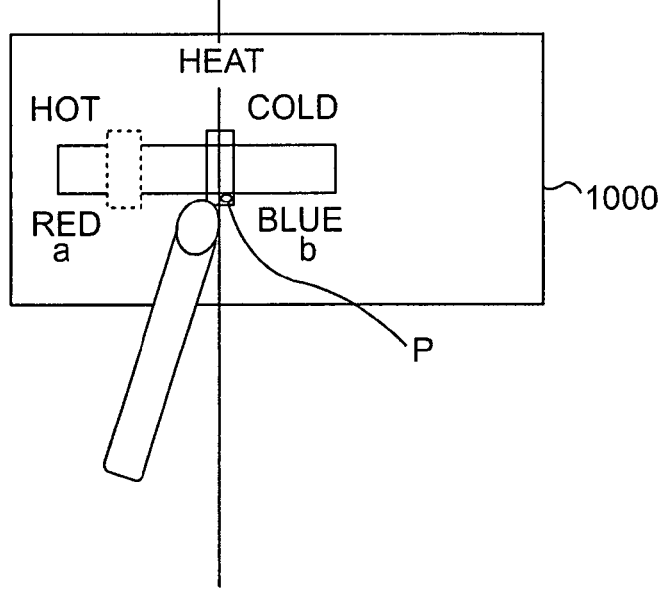
FIG. 10b
FIG. 10

SECTION AA

DRIVER

FIG. 13
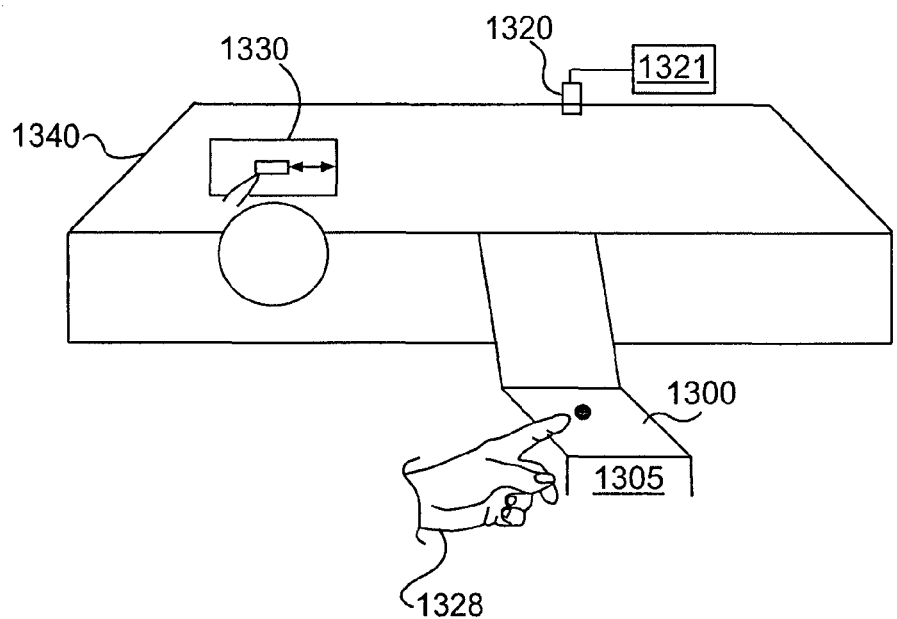
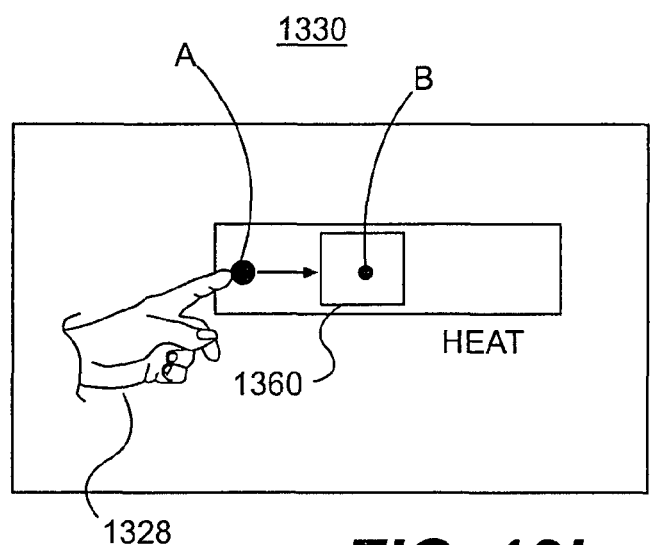
FIG. 13b

SECTION aa

COMPUTER CONTROL SYSTEMS

CROSS REFERENCE TO RELATED APPLICATIONS

This application is a continuation of U.S. application Ser. No. 11/272, 868, filed Nov. 15, 2005 now abandoned, which is a continuation of Ser. No. 09/789,538, filed on Feb. 22, 2001, now U.S. Pat. No. 7,084,859, which claims benefit of U.S. Provisional Application No. 60/183, 807 filed on Feb. 22, 2000.

OTHER APPLICATIONS BY THE INVENTOR

Useful Man Machine interfaces and application Ser. No. 09/138,339;
Touch TV and other Man Machine Interfaces Ser. No. 09/435, 854;
Systems for Occupant Position Sensing, Ser. No. 08/968,114;
More Useful Man Machine interfaces and application Ser. No. 09/433,297;
Picture Taking method and apparatus Ser. No. 09/568,55;
Methods and Apparatus for Man Machine Interfaces and Related Activity Ser. No. 09/568,554; and
Camera Based Man-Machine Interfaces Ser. No. 09/612,225

FEDERALLY SPONSORED R AND D STATEMENT

Not Applicable

MICROFICHE APPENDIX

Not Applicable

Copies of the disclosures of the following U.S. patents and co-pending patent applications are also incorporated herein by reference:
1. U.S. Pat. No. 4,629,319 (Panel Surface Flaw inspection, which discloses a novel optical principle commonly called "D Sight")
2. U.S. Ser. No. 09/435,854 and U.S. Pat. No. 5,982,352, and U.S. Ser. No. 08/290,516 ("Man Machine Interfaces"), filed Aug. 15, 1994, now U.S. Pat. No. 6,008,000, the disclosure of both of which is contained in that of Ser. No. 09/435,854
3. Application Ser. No. 09/138,339 Useful man machine interfaces and applications
4. U.S. application Ser. No. 09/433,297 More useful man machine interfaces and applications
5. Items for Occupant Position Sensing, U.S. Ser. No. 08/968, 114, itself abandoned, but the disclosure of which is incorporated by reference in items 3 and 4 above
6. Camera Based Applications of Man-Machine Interfaces U.S. Ser. No. 09/612,225
7. Picture Taking method and apparatus (U.S. Ser. No. 09/568,552
8. Methods and Apparatus for Man Machine Interfaces and Related Activity Ser. No. 09/568,554

BACKGROUND OF THE INVENTION

This invention seeks to dramatically increase the utility of car informational displays and controls, while at the same time enhancing safety by improving sensory data presentation and ease of interaction with vehicle controls and data sources. The programmable nature of the disclosed devices also creates new methods for how data is delivered and utilized.

The disclosed invention, including co-pending applications incorporated by reference, contains unique embodiments which allow one to interact, by feel, with a display, called herein a "programmable tactile display". It encompasses two main focus areas:

A display having features commonly associated with a touch screen, but in a new form which can be sensed in several tactile manners, as well as visually.

A tactile selection or adjustment means, such as a knob, slider, or switch, programmable in its tactile or visual nature, and generally operated in conjunction with the touch screen just described.

These features in turn provide the basis for a automobile instrument panel (dashboard) or other control panel which can be operated without undue concentration on visually reading the display while working the controls. It serves as an alternative, or adjunct, to voice activated systems being considered today to allow increased functionality with safety of vehicle operation. In several embodiments, the force or other sensation felt can itself be programmably changed, adding to driver understanding, and enhancing safety.

Because it resembles today's dashboards, and can be used for the basic control functions of the vehicle, the invention provides not only a potential means of telematic connectivity while driving (e.g. with the internet, cellular telephonic sources or the like), but a much more useful display and control system capable of many more functions—including the primary vehicle control functions, if desired.

In addition, I feel that a dashboard incorporating the invention can be built at lower cost than a conventional dashboard, especially as vehicles become ever more loaded up with navigational systems and other electronic functions incidental to the control of the vehicle.

There is no known prior art having the above characteristics.

SUMMARY OF THE CHALLENGE AND OPPORTUNITY

The automotive dashboard is today a confused array of switches, knobs, dials, gages, and other tactile physical selection or adjustment means and instruments. It is often hard to see and to understand, and can cause undo distraction to the driver. As a device, it is filled with different parts and thus expensive to manufacture both in serial quantity, and in redesign and tooling for new models. Furthermore, it is inflexible, and invariant once manufactured. It cannot be changed in its design by the user, and cannot be easily changed by the manufacturer or the dealer.

In addition, the instrument panel in its current form it is at its limit in so far as its ability to present data which can be acted on. There isn't any more room on the dash to put more devices, and various safety issues such as airbag deployment and passive interior safety preclude many choices. Data which might be desired for action can be from the vehicles own controls and state, its surroundings such as from other vehicles or parked objects, or could include material downloaded from the internet, or navigational data from satellites.

Because of this, Voice recognition techniques are now being researched in earnest in order to allow the user to interact with computer based functions. IBM VIA VOICE and DRAGON SOFTWARE Naturally Speaking products have already reached the general office market, and are reasonably accurate and effective if the surrounding environment is quiet and stable. But in the car, this is not the case, and even specialized limited capability Telematic systems such as Fonix Corporations Automatic Speech Recognition (ASR), L and H, etc, have lots of problems—for example:

Noise—the car is not an ideal environment under any circumstance, never mind with CD Player at full volume.

Different drivers, with different accents, practices

Limited or no teach in available to perfect the function of the recognition program Passenger disturbance, and conversation interruption (i.e. a background noise source which disturbs the recognition, or the actual intonation of the speech These problems result in function which is possibly error prone or time delayed. Having to repeat or worse, having the wrong action, is not desirable in mission critical driving situations so to speak. The Cell phone problem is notorious. In the extreme, a form of rage can take over if the system frustrates the driver. For this reason, voice recognition systems used for actual vehicle functions (as opposed to dialing phones and the like) have in effect, backup controls—defeating the concept of increasing dashboard space, and control comprehension.

In addition there is a sociological problem—talking to ones car in unacceptable to many, even if the voice recognition program works. For some this is always true, for others its true with passengers present.

In addition, the presentation of data by the computer to the driver by text to speech programs is known to have unacceptable intonation or time latency in many circumstances by the average user, and in any case is woefully inadequate for graphical or tabular information, for example. The data to be presented to the user, even in a simple list of choices, has to be vocally spoken by the computer to the driver in sequence, taking a great deal of concentration to avoid missing an important point, and taking minutes to do what can visually be done in a glance.

Voice aside, perhaps the only way more data can be presented to users (driver, and/or passengers), who might wish to engage in internet or cellular activity while driving, for example, is through the use of programmable displays, and programmable entry devices, which can be varied to suit the need of the user at the instant of use. Such displays are commonplace today in the computer world (e.g. "Windows", "Web Browsers"), so why not in a car?

It is noted that unbridled use of such displays by the driver is however limited by laws in several states as for example pointed out in U.S. Pat. No. 5,949,345 owned by MICROSOFT corporation, which desirably covers an operating system for the computer driving the display to allow legal operation. Also germane are Ser. No. 08/564,586 and Ser. No. 08/668,781 assigned to MICROSOFT.

One problem is how to interact with the display, without having a keyboard—which is generally too cumbersome, switch filled, and space consuming for a car dash, armrest, or other interior location. And a mouse is pretty much impossible as well.

Accordingly, some companies have proposed or developed conventional changeable computer window type systems using up/down/left/right buttons or even joysticks to select the screens and menus thereon in an attempt to solve this problem. Such devices are however, not intuitive and hard to use, for at least 95% of the populace I feel. Because of such problems, even where implemented, they are relegated to only non critical functions, such as navigation, climate control, cell phone dialing or audio system entertainment.

If such computer based systems could be used by the general populace, without the limits of voice recognition, a very large application area comprising in its limit the total function of the vehicle could result. In addition, improved productivity could result as people in the USA spend over 500 million hours it is said in their cars, and much of this time is wasted, from a business point of view. Even to salvage 1% is 50 million hours, which corresponds to over a billion dollars saved.

I feel a key part of the answer lies in a form of tactile display or touch screen with tactile properties not hereto fore seen. This display could, depending on its construction, occupy some, or even most of the dashboard (also called dash, or instrument panel). Alternatively and or in addition, it could occupy the region in the center of the car called the "center stack". It should also be noted that the problem may also require a multi-sensor solution, which will be discussed herein Some requirements of an Automobile display/touch screen could arguably be at least the following:

Sturdy- and conducive to interior passive safety, and regulations

Should allow multiple functions to be undertaken simultaneously, either all by feel, by glance and feel, or by combinations of touch/feel. body positions, voice and other variables.

Should provide enhanced measure of safety by requiring less concentration on controls than present with many controls today.

Allow programmable screen operation by feel if possible, for ease of use while driving (or while engaged in other tasks) and safety. The "feel" sensation should be itself programmable, such that varying responses can be given the operator, depending on what screen and what function or what amount is being actuated or interrogated (that is you touch it to get a sensation first indicative of the current value or screen type)

Activate functions easily

Not affected by environmental issues, such as ambient light, contamination

Not sacrifice airbag function—thus must not be where the airbag is, or the airbag/and screen module must be of another design (one of which is disclosed herein)

High resolution, to allow graphics and dense information such as that downloaded from the internet to be displayed, when desired.

It should desirably respond to z inputs (into the display screen itself) to give added dimension to function. (e.g. volume of sound, air, etc,) or combine a switching function with a turning, sliding or other function (similar to the heat knob of a Olds Aurora for example). And response to inputs at angles to the screen normal would also be desirable in some cases.

PRIOR ART

Directly to the point, there are no touch screens known to me, other than my own, which have a physical tactile "feel" aspect to them—a feature which I consider essential for the vehicular control application of touch screens. Having said this, a review of conventional touch screen art for automobiles follows.

Where limited functionality is all that is needed, conventional touch screens of limited size are an answer. To my knowledge, the application of touch screens for computer input in automobiles was first achieved in the 1988, in the General Motors Buick Riviera using a relatively small CRT display located in the center of the dashboard. Such a display is described in U.S. Pat. No. 4,787,040 by Ames, et al. entitled Display system for Automotive Vehicle issued to IBM Corporation Nov. 22, 1988.

More recently, numerous manufacturers have done the same, for the purpose of navigation, using instant GPS data and stored maps. However, none of these displays is easy to use by the driver, being small, difficult to interact with physically, and out of the general line of sight of the driver. This is a problem as one has to see the screen to touch the box corresponding to the input function desired. And to see the screen, you have to take your eyes off the road for a significant time. There is no physical sensation associated with the function which would allow you to actuate the function "by feel". Indeed because of this, many of the GPS systems being sold, are just displays, with function selection and the like achieved with the standard assortment of buttons, switches, dials, etc. And where touch boxes on screens are used, they by necessity have limited functions.

Other problems with computer displays of the multiple windows type exist when these are used in vehicles—this is discussed in U.S. Pat. No. 5,995,104 by Kataoka, also aimed at a Navigation system. The instant invention can use such windows in the touch screens it provides, but preferably uses more physical "objects" representing typical dashboard instrumentation.

Finally, as another example of display locations in vehicles, a recent U.S. Pat. No. (5,871,251 assigned to Prince Corp) discloses an LCD display located in the sun visor, for use by the driver, having no input capability which would allow the driver to make use of it in normal operation (even if he could see it well).

Another problem, is that the touch screen gets really attractive, as you envision it as a replacement for a large measure of the automobile user instrumentation and control functions of today, a dramatic move, filled with other advantages in flexibility, ease of use and user benefits—plus potentially lower cost.

What about then, a touch screen of the LCD type, with a surface acoustic wave (SAW) based touch cover screen? (e.g. Microtouch brand). One could just put one of these across the whole dashboard, at least in sections. SAW types do not have some objectionable properties of cover materials and the like which can get damaged which some other types of conventional screens possess.

This use of a conventional LCD based (or alternatively plasma display or other type) flat panel touch screen has several problems (and is very expensive today). These are:

The requirement to see the function touched, with no physical feedback from doing so, as pointed out above A potential problem in large size with complying with interior passive safety regulations (should a persons head hit it, say)

A problem in coexisting physically, and functionally, with dashboard or steering wheel installed airbags (also called SRS or supplemental restraint systems) and their actuation.

A potential problem with durability, being able to survive hits by kids, feet on the dash, etc., as well as degradation of performance by contaminants (a major problem of conventional technologies recently addressed in U.S. Pat. No. 5,923, 319 Bishop, et al.

Possible thermal drift and resolution problems due to the extreme temperature situations in vehicles The safety related issues are a significant stumbling block, but the ease of use without undue concentration issues are as well, and apply to other fields besides—indeed anywhere a touch screen would be desirable but not easy to use by someone who can not take the time to look, or to whom looking is inconvenient or uncomfortable, or in the case of the handicapped, difficult or impossible.

It is also noted, that the objectionable requirement to touch what one sees (and thus take ones eyes significantly off the road in many cases), has undoubtedly led manufacturers of the most recent set of navigational screens, to use a fixed set of keys as inputs; with the data display being the only thing programmable. In this case the person can feel the switch, and only quickly glance at the screen for data once presented. But the keys and switches used are by necessity small, and cluttered.

To conclude, conventional touch screens can work in vehicles, but in their form heretofore they have no tactile properties. Thus today they need to be augmented by voice recognition and/or tactile devices placed near them if they are to be used for important functions of the vehicle.

SUMMARY OF THE INVENTION

The instant invention disclosed herein seeks to provide a vast increase in flexibility of data presentation and manipulation, while obviating the problems of conventional technology, and doing so at a low price encouraging wide spread automotive application. (indeed it is thought to be less expensive to manufacture, and much less expensive to design and redesign, than a conventional dash with its various Input/Output devices). While the focus is on vehicular application, it is noted that the invention is not limited thereto.

Safety is enhanced by providing a potentially safer car interior and one more friendly to elderly or handicapped drivers and those visually challenged (primarily due to the larger displays and control devices made practical, while at the same time having more functionality). In addition, it can enhance safety by promoting a degree of dash standardization between vehicles not now practical from a marketing point of view. This is because certain functions could be common, with the decorative and other portions customizable.

The invention is also differentiated in that it expands the stylistic and after market business opportunities associated with vehicle sales. Just one example disclosed is a single use or mission specific accessories to enable safe driving while executing detailed specialized tasks, for example a project worked on ones way to work, or a trip taken to a specific place.

There are many embodiments of the invention disclosed herein. One version, has a major advantage for near term commercialization in that it results in a dashboard and/or center stack which is as close as possible to today's cars while possessing a high degree of programmably variable operation needed for enhanced use by a driver.

It is especially noted that the invention serves to eliminate problems brought about by reliance on voice communication between driver and vehicle, and telematic connections to same. Voice recognition has problems, as it often requires prompts for the driver, which are often time consuming, frustrating, and difficult to hear. Undue concentration on same can also cause unsafe driving (for example in the presence of sirens). In addition, voice is linear, and sequential. Only one message/action can be executed at once. And the whole message has to be understood by the driver, or vehicle or telematic connection—or all can be lost and the process required to be repeated, which can provide frustration and endanger safety in extreme circumstances.

With the instant invention however, key functions can all be implemented with little or no voice input/output by the driver at all. And more than one function can be done at once, using multiple fingers, hands, head movements and a variety of alternative input mechanisms.

The invention also contributes to safe operation in other ways. For example the dash can be built with a lack of protruding devices if desired, contributing to passive safety. In addition, the invention is also unique among touch screens, as it allows the touch screen to coexist so to speak, with an airbag. This in-turn may allow novel location of the invention in the steering wheel. This is the easiest to use of any location, as the drivers hands are normally on the wheel.

Another good location for the driver, also largely unexploited heretofore is in the center console (also called center stack). Even the armrest can be used, desirably assisted by a heads up display on the windshield. Other embodiments of the invention describe display locations of use to passengers, or of use to the driver on an periodic basis only.

Since the technology disclosed herein and in co-pending applications incorporated by reference is in many ways universal in its application, some applications are herein disclosed of use in the home and business as well. These often do not require "feel", but benefit from the invention's similarity to familiar tactile physical selection or adjustment means found in the home or workplace—knobs, switches, levers, sliders, and the like.

The basic aspects of some features and/or embodiments of the invention have been disclosed in provisional patent applications, co-pending applications and patents incorporated herein by reference. These are now briefly summarized.

Co-pending application Ser. No. 09/435,854 by the inventor (and recently granted US Patents related thereto) describes the use of unique touch devices for automotive dashboard related applications, and in addition, discloses new type of data entry device for computers and other electronic equipment generally in the category of digitizers and touch screens having several unique properties. This device, in the form usable here, is most generally based on the use of one or more TV cameras to view optically discernable data associated with the screen from the rear in order to determine the location in screen coordinates (and z in some cases as well) of one or more touch points. Primarily discussed therein are devices which use the electro-optical determination of temporary surface distortion caused by the physical input signal, or force, creating distortion (e.g. a finger "touch"). This is referred to as "surface distortion imaging" and depends on the ability to detect, and in some cases quantify, small distortions of or stresses in member over a large (by comparison) area. This technology has some unique advantages for automotive control and display applications, the subject of this disclosure, which elaborates on the versions shown previously. It is also highly useful for other applications, such as Kiosks, control panels in the home, and the like.

And further disclosed are means to allow tactile physical selection or adjustment means such as knobs, levers and switches to be integrated with a touch screen, an area expanded on further in this application.

In addition to the unique touch screen just described, other referenced patent applications by the inventor incorporated by reference describe novel means to determine other events which cooperatively or individually may a be imputed to a computer using electro-optically determinable datum's on persons or other entry means, typically objects such as steering wheels, switches, and the like in a vehicle. Included is data input using direct camera observation of the user, or datum's attached to the user, or objects held by the user. With the advent of low cost cameras, the use of such camera systems becomes practical for automotive interior application. And disclosed herein are other touch screen transduction methods which can be used alternatively or in combination with those of previous applications.

The above features are very useful in answering the needs of potential applications in cars, trucks and other vehicles, as well as for certain other instrumentation and related applications—even in the home. In particular, the invention herein, even beyond previous disclosures will be further shown to have unique advantages in the following areas.

Feed back to the user of touch related activities

Safety enhancement and compatibility with existing safety systems and norms.

Ruggedness and ease of application in difficult environments

Novelty in terms of the benefits for the user

New business methods resulting from the data intensive activities made possible in the car Novel locations made possible for the screens Additional novel touch screen sensing approaches including those using TV cameras to view the user or objects.

Advantages of the Instant Invention

The instant invention is aimed primarily, but not necessarily for dash mounted touch screen displays, which can literally fill the dash if desired, or at least provide a large display at any or all of these locations of primary interest:

In the center of the dash, or in the console (also called center stack) for use by driver and/or passenger Replacing the existing instrumentation cluster in front of the driver Located in the steering wheel, in addition to or in place of said cluster.

In front of the passenger

Safety Advantages Include

Reduction in sources of anger or frustration caused by alternative voice based systems Large easy to read data—much larger than possible today, and ideally suited for just quick glances and elderly drivers, and drivers in general who are far sighted and don't have close up glasses. The large size is due to the ability to time share the dashboard space In addition the Focus of eye can be on objects outside the vehicle, as letters big enough to read even if out of focus.

Can lead a degree of dash standardization between vehicles not now practical from a marketing point of view. One can in an extreme, carry your own dash program with you from one vehicle to another (e.g. a rental car)!

Much more data available, in a wide expanse of screen. This also includes TV imagery of the surroundings of the vehicle (eliminating blind spots, aiding parking, etc). Novel too is the ability to provide a human assist, e.g. designation, to automatic vision and it systems The tactile control of the computer system used can be customized not only by the user in general, but for specific purposes—what I call a "Mission specific" tactile and visual input and output. This makes it still safer by providing just the right tactile controls for the application at hand.

Some exemplary versions can potentially be collocated with airbags, allowing placement in positions most easy to use, such as the steering wheel.

It is in addition, a goal of the invention to improve vehicle safety by

Providing an instrument panel which has larger and easier to read and comprehend controls Providing a means to inform drivers of hazardous conditions Providing a means to automatically cause the vehicle to take action in hazardous situations Providing a means for drivers to seek important safety related information Providing a dashboard of enhanced passive safety Providing a means for telematic connectivity which is conducive to safe driving It is a also a goal of the invention to make possible the safe use of aesthetically pleasing large screen programmable displays by a driver as the primary means of data input and output. And to provide means for changing these displays and inputs to suit the needs and desires of the user.

It is an added goal of the invention to provide tactile displays which allow a driver to "feel" the information desired as well as see it, similar in many ways to instrument panels of today but with many added benefits.

It is a goal of the invention to provide a touch screen or other tactile display having a passive or active tactile feedback to a users touch It is another goal of the invention to provide a method by making touch commands usable with just a glance from a driver to the region of a large easy to read display.

It is a further goal to provide displays and actuation devices for vehicle functions which can be customized at a factory or dealership or otherwise (for example from a web site).

It is also a goal of the invention to provide displays and inputs not just for the functions of the vehicle operation systems, but for a myriad of added functions, such as navigation, reconnaissance, communication, information download and retrieval, gaming, and even pleasing interior design and changes thereto. Many of these functions also can serve applications outside the vehicle as well, such as in the home or workplace.

It is another goal of the invention to provide a touch screen having controls which indicate to the user via physical touch sensible signals, such as acoustic waves, a condition, such as the control device touched, the particular selection made of choices concerning same (e.g. heat or wipers), or the magnitude of the setting desired of the choice made. This can also indicate what the current value of the choice or function is at the time of touch, not just changes therein.

It is a goal of the invention to further provide means by which complex instructions for use can be presented in easily readable form co-located with the control function whose instruction is needed.

It is a goal of the invention to provide means by which multiple inputs and outputs (e.g. touch, voice and direct optical viewing of human or human actuated switch positions) can be used in concert.

It is a goal of the invention to provide means for both z (direction into the display screen) and force based input of single or multiple human or object inputs.

It is goal of the invention to provide a new form of flat panel touch screen having tactile relation of user touch to the screen.

It is goal of the invention to provide a flat panel display having tactile physical selection and adjustment capability It is goal of the invention to provide a touch screen which optically provides feed back to a driver in his line of sight of touch screen or touch pad input movements It is goal of the invention to provide a device, which may also include a touch screen, equipped with interchangeable front panels which have specialized and if desired, purpose special physical devices for interaction with the sensing arrangement used.

It is goal of the invention to provide a touch screen having a display and associated control function which moves around the point of touch, using for example a vector of touch, as opposed to requiring a person's touch to track a predetermined fixed display-a task requiring much more visual concentration.

It is a goal of the invention to provide methods for using a touch screen for fine manipulation of data on the screen, heretofore not possible.

It is goal of the invention to provide a method for controlling a vehicle or other device which uses a combination of functions, particularly touch, voice and gestures.

It is another goal of the invention to provide for methods of work improvement in use of computer tools such as spread sheets, word processing, computer aided design and the like.

It is a further goal of the invention to provide improved controls for automation systems, including those in the home.

It is noted that this invention presents fundamentally different concepts for touch screens that those which are menu driven as known in the art (though it can use those too). It calls for "Natural" functions more related to the existing instrumentation of the vehicle and the experience base of the driver, including physical implementation not known heretofore in the touch screen or control art, whether for cars or for any other purpose.

These tactile methods, together with novel screen embodiments and other means for communication with automotive and other control functions are now disclosed.

While described as displays or "screens" in typical computer parlance, there are in general, combinations of programmable displays, tactile touching aspects and gesture and voice, to make a synergistic whole. Also the screens can be as noted in front of the driver or passenger, or in the center stack (middle region of the dash) for example, as desired. They are discussed herein in the center stack as this is thought the first point of application due to non-interference with airbag location and other factors Finally, it is possible that the disclosed display and instrumentation invention will prove safer for vehicle occupants than those of today. One reason is that protruding switches, knobs, stalks and the like can be eliminated, and these in some cases have caused injury, particularly when passengers have been thrown into the center part of the vehicle which has no protective airbag today.

BRIEF DESCRIPTION OF THE DRAWINGS

FIGS. 10a-10b illustrate an embodiment of the invention where a Screen display moves to or around a touch point touched by a user, using a vector of touch or a time based input.

FIGS. 13-13b illustrate a unique "Heads up display" (HUD) of touch screen and touch position, to aid the driver to work the touch screen while driving.

DESCRIPTION OF THE PREFERRED EMBODIMENTS OF THE INVENTION

FIG. 1

This invention is predominately aimed at providing a new form of instrument panel and related controls, based on displays, including touch screen displays, which have tactile attributes of considerable utility for the driver of the vehicle. By themselves, or in concert with voice techniques, these tactile displays enable the effective selection of functions in control related applications, not just in the vehicle, but in the home and elsewhere. Many of the disclosed embodiments are also thought to improve the safety of vehicle operation, while doing so at less manufacturing cost.

In a vehicle, tactile displays of the invention can be located on the passenger side (mainly for amusement and internet communication), on the driver's side as a replacement for the existing instrument cluster, or in the middle (also called center stack) which is the easiest to implement today because of lack of requirement of airbag application and the fact that the steering wheel does not obstruct hand or eye communication with the display screen.

Before providing detail on the specific technology employed, it is of interest to consider what sorts of new presentations of data to the driver and passengers of a vehicle might be, if such technology were employed, especially but not necessarily that of the invention. Only if displays having suitable tactile aspects are available (the primary goal of the invention herein), will these possibilities likely ever be realized, and least in the near to mid term.

Figure 1A:
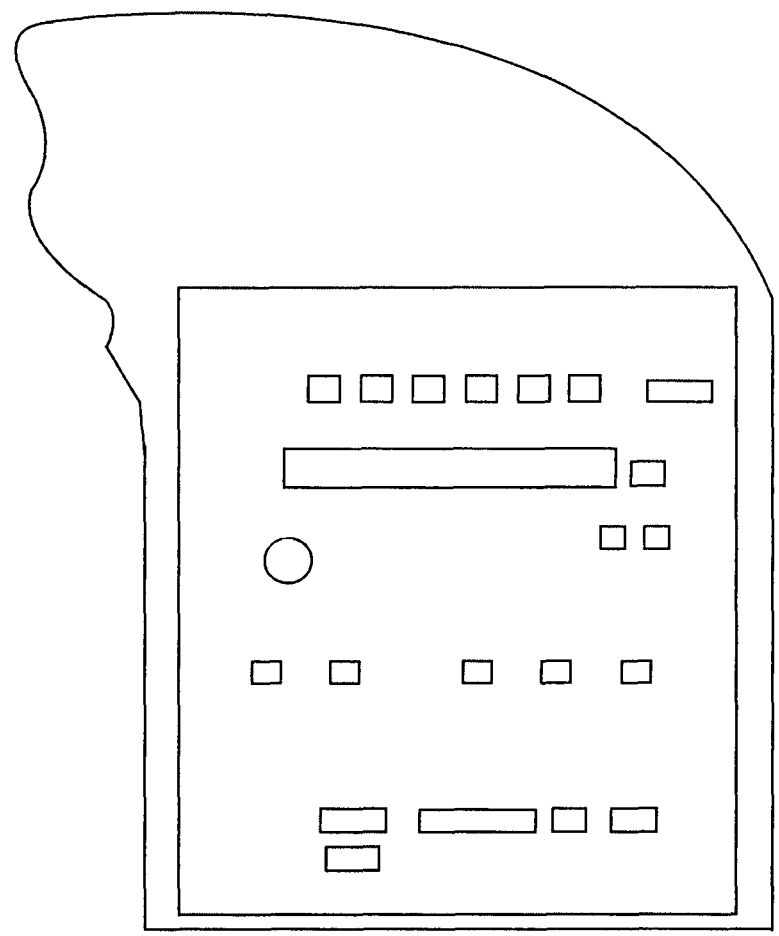
FIGS. 1a-1f Illustrate conventional automotive practice, and arrangements of screens and input devices (touch or otherwise) which comprise various automotive operative control and information embodiments of the invention. Further illustrated is a preferred embodiment for near term commercialization, located in this example in the center stack. This embodiment discloses programmable tactile physical selection or adjustment means and is most like the dash operation in vehicles of today, but in addition has programmable visual and tactile aspects of high utility. Projection and LCD display examples with different types of optical sensing are illustrated, as are interchangeable tactile elements.
Figure 1B:
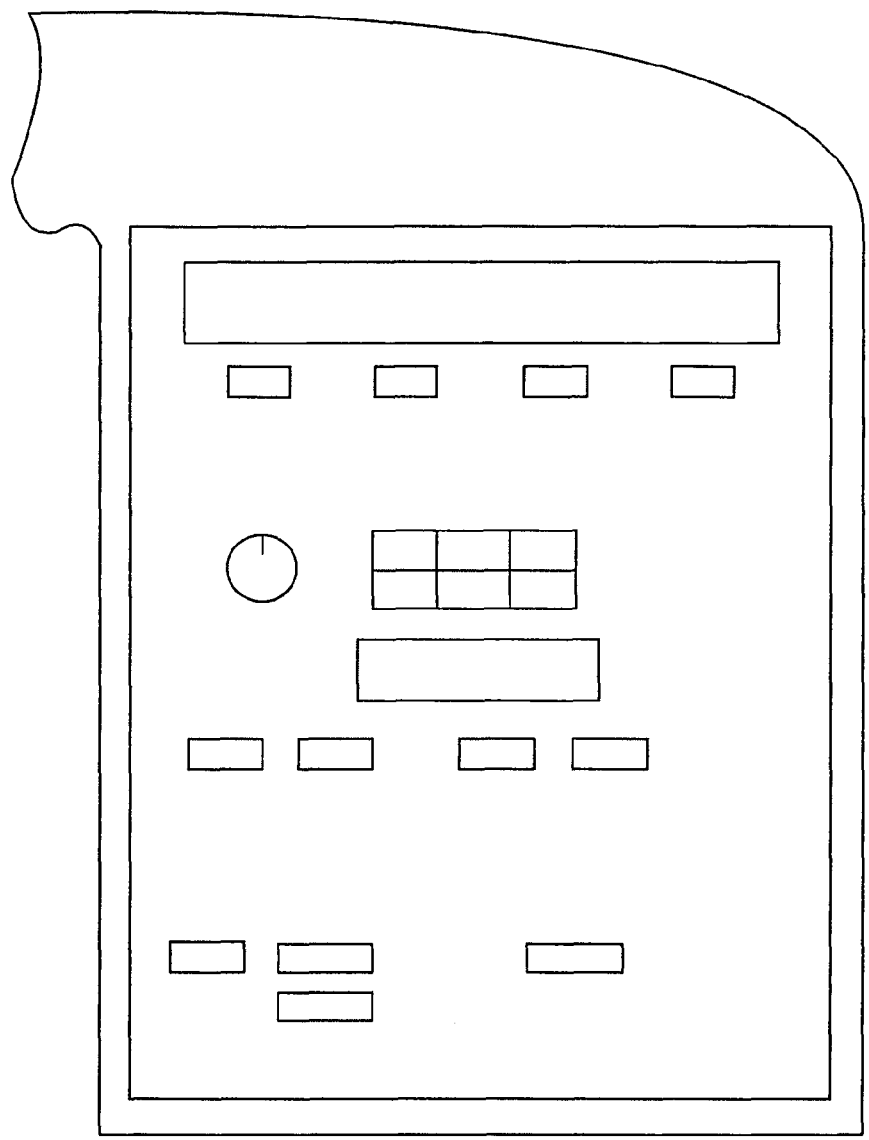

FIGS. 1a and b illustrate one example of a conventional Automobile instrument panel of today, in this case of a SAAB 9-5. This dash includes many small buttons, displays and controls, and yet has none of the features desired for advanced forms of telematics, navigation and other features disclosed herein. It is a good example of a nice design at its limit.

Figure 1C:
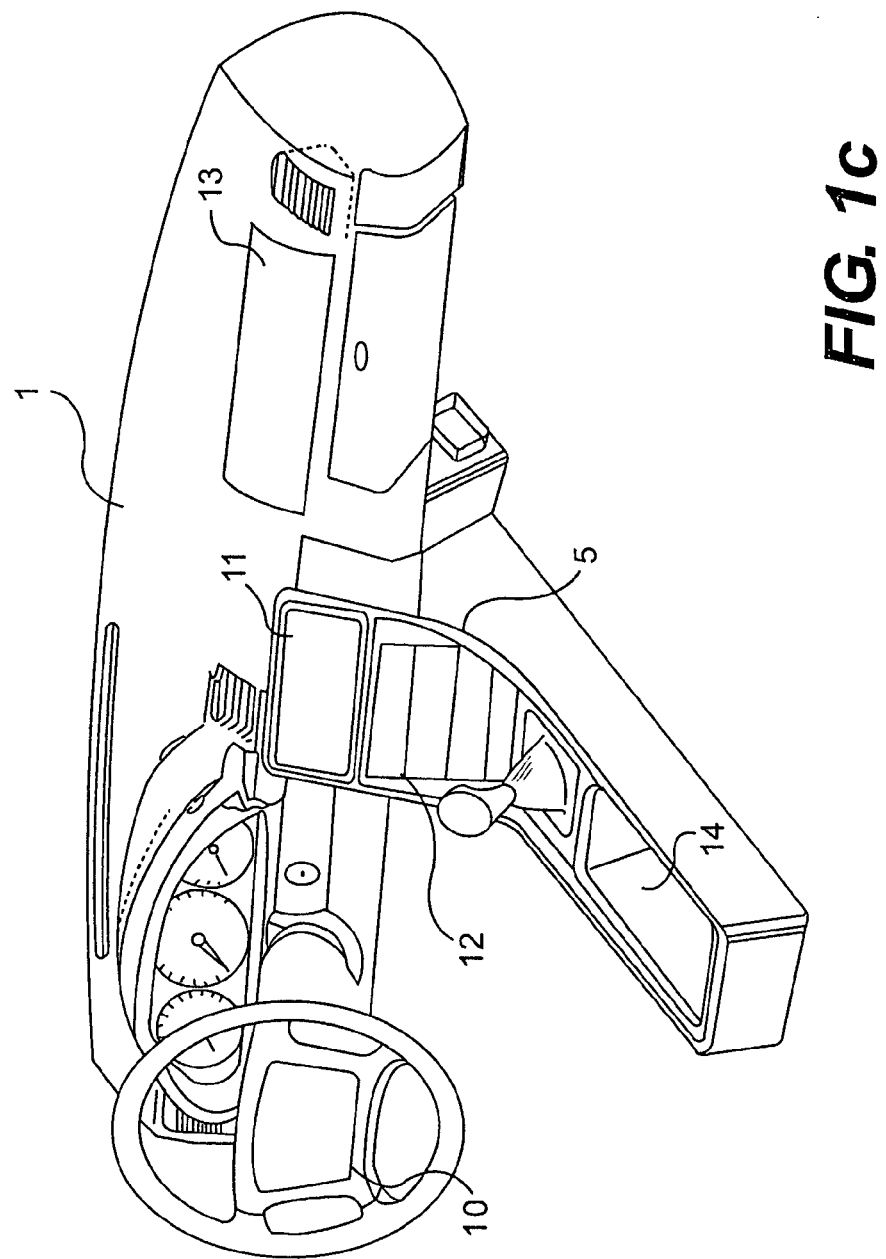

FIG. 1c Illustrates one example of a conceptual vehicle basic dash board 1, and center stack 5, with tactile displays and/or touch screens 10-14, made possible by this invention, incorporated in The steering wheel center, 10
The center stack, 11,12
The console, 14
The passenger side of the dash board, 13
And possibly the instrument cluster itself
Not here illustrated.

As will become apparent on consideration of this invention, it is possible to provide in an automobile dash, a highly effective touch screen or other display of large size having the necessary tactile feel, passive safety, and air bag accommodation where needed to make it acceptable from a safety point of view.

This unique ability opens up a host of novel dashboard implementation embodiments presented here, which are sometimes also possible less preferably with other prior art touch screen devices in certain circumstances as well. The reason for this is the huge increase in flexibility presented by the tactile touch screen concept, and its ability to greatly increase the active information which may be made available to improve automotive safety, as well as the driving experience, at the same time in total synchronism with current trends to information availability at all times and places, including in ones vehicle. (a concept referred to as "Telematics").

Many of these advantages accrue because the same display can function as the controls, the vehicle operation information presentation, and the telematic function displays. And on top of that, can provide information from cameras and other inputs directly where needed by the driver (as such information can temporarily, as in time of stress or crisis, replace some or all of the functional displays, for example of speed or engine RPM).

Some novel screens and other dash configurations and representations according to the invention, which give an idea of the breath of possibilities are given below.

Standard screen

Highway screen

City Traffic screen

Audio enjoyment screen

Night vision and fog screen

A Difficult driving or "Crisis" screen, where all functions relate to navigating or recovering from a difficult situation—such as very heavy traffic, ice conditions, etc.

Malfunction and alarm screen, including Automatic switch to a "trouble mode" so to speak when something wrong is detected Telephoning faxing and Email screen Climate control optimization screen Exaggerated character and input screen (for elderly or infirm persons, or as desired)

Internet and communication screen (passenger)

Internet and communication screen (driver moving, and driver stopped)

A Techno screen, with graphs, charts, etc of interest (laws may prohibit some of these from being displayed to the driver while moving—in this case a set of abbreviated screens with "legal information" might just be displayed.

A "preflight" checkout screen to allow the driver to ascertain correct functions and settings of various subsystems Preventive maintenance screen, with data, predicted service times, and even camera images of key parts of vehicle such as wheels, engine, etc.

"Global" navigational screens, including GPS based MAP data as is now prevalent for guiding one to a destination "Local" navigational screen for parking, in which camera and other sensory data (microwave, ultrasound, IR lidar, etc) are greatly magnified and presented. To aid in parking or navigating in tight quarters.

Parking spot screen, providing data on location of parking spots in for example, a garage, using data downloaded to the car upon entering or nearing said garage.

Car subsystem amusement and education screen, for displaying, for example 3D representation of airflow, with different HVAC and vent position settings, 3D representation of sound, with different settings, including if desired the monitoring of ambient sound 3D representation of rear and front viewing situations by various optical subsystems (mirrors, cameras, IR or other night vision, etc) and radar subsystems if used.

The above screens can, if desired, occupy 60-70% of the width of the dash, in front of the driver and in the center. Or they can be in front of the driver, in the instrument cluster area, or on the steering wheel as disclosed herein. They are primarily for use by the driver, unassisted, but clearly have use for passengers as well. If they are not for the driver, many of the comments regarding vehicle functions may not apply (e.g. the need for a speedometer or other critical car function if any to be displayed somewhere at all times may not be needed)

These screens do not represent the totality of novel functions which may be provided, but are ones that I feel are of considerable utility. Generically, these novel screens have one or more of these common threads.

An ability to switch automatically to a new safety oriented state on input of data from sensors which indicate such is called for. This state can be activated manually as well an ability to switch among several screens an ability to be switched from one to another, as well has have individual functions triggered from a variety of human command inputs, including touch related activities of various sorts, plus hand motions, head motions, finger motions, and the like.

Figure 1D:
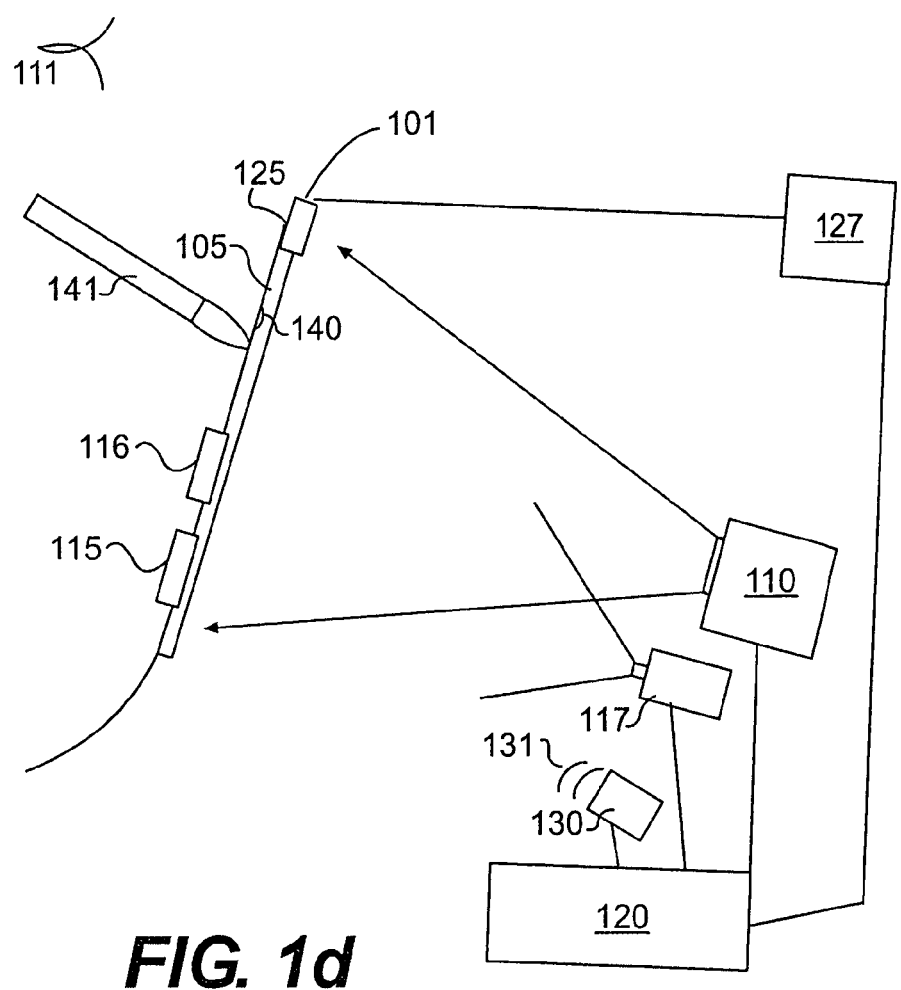

FIG. 1d illustrates a preferred highly tactile center stack embodiment for near term commercialization, as it is closest to the instrument panel of today in terms of touch and feel, and visually, yet offers the full programmability required tomorrow and it is also thought to promote safer driving. The overall shape, in this example, is that of a SAAB 9000 and 9-5 which, like the Oldsmobile Aurora has a portion of the dash/center stack as its called, canted toward the driver, representing an almost ideal location for a touch screen or other embodiment of the invention.

The base screen functions are depicted in the quasi rectangular portion of the center stack area in question, in keeping with the notion of a relatively simple projection display on a scattering screen in the same area.

This embodiment utilizes "classical" tactile physical selection or adjustment means (such as knobs) common to dashboards today which may be also operated in conjunction with the surface distortion or other types screens disclosed herein. What makes it novel and exceedingly useful is that it has programmable visual and tactile aspects approaching and in some cases exceeding today's dashboards, while at the same time being programmably changeable as needed to provide added features and enhanced versatility. By doing so, safety is improved, and user value is enhance.

Elements have been disclosed in the referenced co-pending applications. Additional details are provided in FIG. 2 and other figures.

As shown in figure, an instrument panel center stack 101 is equipped with a large panel 105 which is primarily a display screen having scattering characteristics to act as a rear projection screen for LCD, DLP, or other type of computer display projector 110 positioned behind it when viewed by driver 111 from the drivers side, and controlled by computer 120

Clearly by known means computer data including messages and other communications down loaded to the computer from external sources, or the vehicle itself can be projected on the screen.

Figure 2:
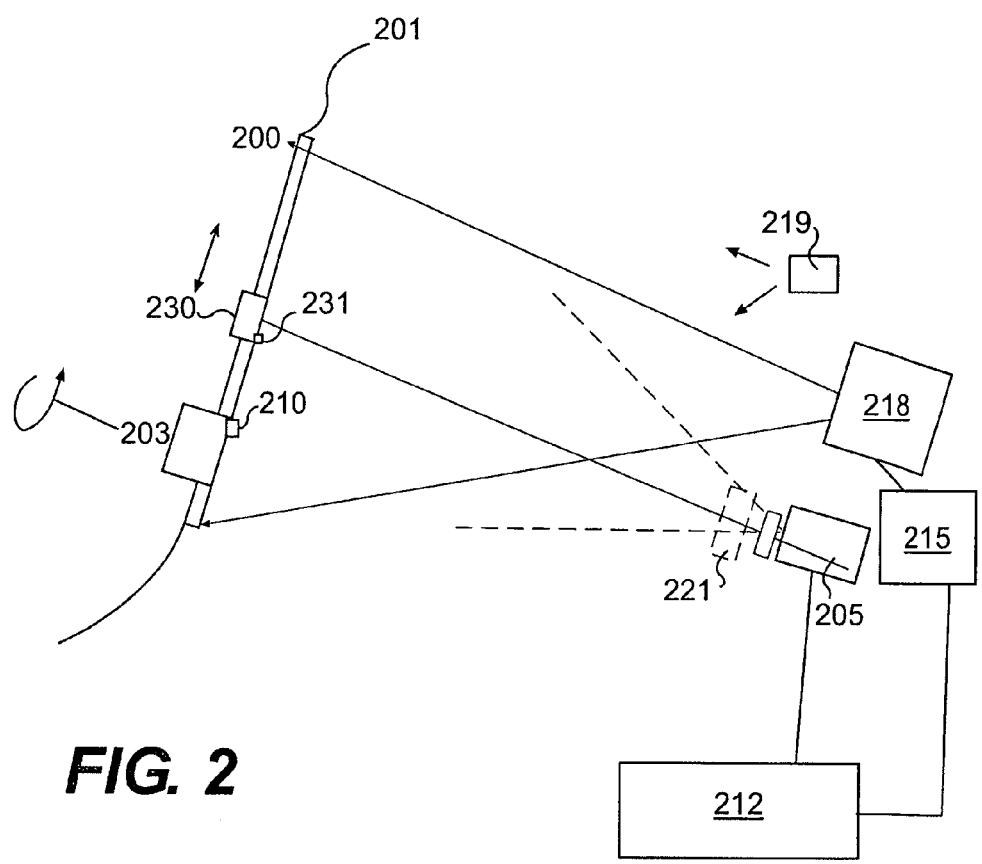
FIGS. 2-2h illustrate additional detail and features of the preferred embodiment for near term commercialization possessing a physical detail tactile feel, which may be also operated in conjunction with the surface distortion or other types of touch screens disclosed herein

In this embodiment however, knob 115 (and if desired other knobs or tactile physical selection or adjustment means such as 116) is mounted on the screen so as to be rotatable thereon to various positions which are sensed (for example by optical means as shown in FIG. 2, such as camera 117 which looks at points on the back of the knobs which relate to their circumferential position) and reported to the computer 120 which in turn indicates the knob position, functions or other data by projecting same onto the screen. The rotation can optionally have a detent function, or another feeling sensation dependent on rotational position can be alternatively provided by an acoustic source such as 125 programmed by computer 120 and driven by drive electronics 127 which, on command sends acoustic waves 126 which can be felt by the user thru the screen panel 105, which is made of Plexiglas or lexan.

By sharing the display area between knob selection or adjustment functions (and their description/instructions, and display functions (e.g. display of navigational charts), space is saved on the dashboard, and larger knobs and lettering may be provided (especially given the programmable operation). This then promotes safety immediately by making it easier to see what is desired, or has been effected. The screen too can be a touch screen as well.

Contributing even more to safety, the tactile feel of the knob, or other tactile physical selection or adjustment means, can itself be programmable, for example using programmable acoustic wave pulses or other means, giving many added benefits. Note that such a programmable tactile response can be programmed to change with function selected, and/or variable affected And can operate statically too, to give the driver a chance to tell the setting of the knob by feel alone. In addition, conventional cues to the driver such as the displayed values or computer generated speech can be used as well or instead.

Figure 1E:
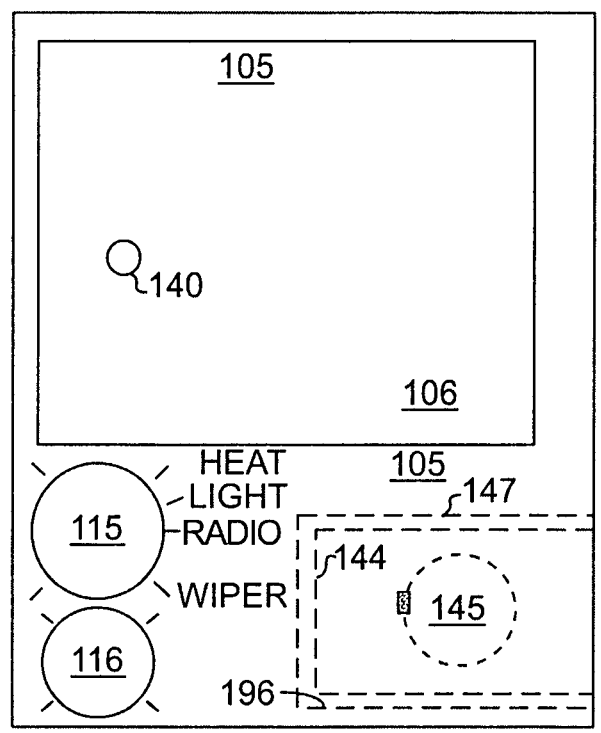

While described as a knob movable rotationally, other tactile physical selection or adjustment means like sliders, switches, levers or the like which are movable linearly, angularly, or in other manners can be used Let us consider in more detail the operation of the preferred embodiment, also in consideration of the front view of FIG. 1e. As shown, there are two knobs, 115 and 116 preferably large for ease of use. While illustrated vertically, a horizontal or any other positioning of such knobs or other tactile selection and adjustment means can be used.

A driver can look at this screen 105 and see the lettering displayed in big letters next to knob 115 indicative of its function, eg the word "HEAT" as shown. If he needs to keep his eyes on the road he can as he touches the knob receive a physical sensation due to the acoustic source 125, which typically is a piezo-electric transducer known in the art. For example, if as he touches the knob 115 the computer 120 can cause the driver to feel a series of pulses 1 sec apart which indicate that the knob is a function selector knob in its current state of programmed operation. Or the one hertz pulses might mean that it was the heater function (if there was no doubt as to what the knob was for—ie having a sign with big lettering right next to it.) or perhaps it was permanently such a knob.

Alternatively, the definition of the setting can also be actuated by voice. Say status, and the HEAT indication is displayed.

In any case as the knob is moved, the lettering projected is changed to indicate the new position. For example in one program, as the knob is turned 20 degrees rotationally, the function changes to wipers from heat, and in so doing the acoustic source causes 2 hertz pulses, (or another choice of signal like alternating high low pulses etc) which signify the wiper function.

The system is totally programmable—the degrees of turn to create a new choice of selection or function, the acoustic pulse choices, and the visual display of lettering (and language thereof too) is all programmable in computer control unit 120. If desired a computer generated sound (which can be made to emanate from one or more of the radio loudspeakers can also be used to indicate position as well or instead of the acoustic wave tactile pulses (or other types).

This system has the ability to have its data read in a quick visual glance and/or touch and visual confirmation too after a move is made. Voice input or output can also be used. For example when the knob is stopped from being turned, the computer can annunciate its position. Or the person can tell the system via a microphone connected to the computer equipped with a voice recognition program (not shown) what he wants the knob to be (eg heating and air) and the knob function and its associated display can be changed accordingly.

When the knob is at the point desired in the circumferential direction, it can be left there and after a momentary dwell, the computer registers the reading desired (e.g. wipers at the second position). Or, in another exemplary mode of operation, the knob function can be changed. For example, when at the "wipers" position, the knob can be pushed in to register this choice (wipers) and then after that the knob function and the display associated with the knob changed to wiper speed delay and other wiper function settings at the different circumferential positions desired.

Note that the unit may have different functions made possible for the knob or other devices when the car is stopped. For example the knob might indicate wipers, heat and radio when in motion, but additionally when stopped could have email, internet surfing and other functions which might be too dangerous while in motion.

As an alternative to an acoustic source thru the screen to signal a feel of a variable to the user, a sound generator loudspeaker 130 can send sub audible waves 131 against the whole screen 105 which can be sensed at the point touched.

In the preferred embodiment shown, the portion 106 of the screen 105 is reserved for touch screen inputs for example using known resistive, capacitive or other means such as my distortion based types. Similarly as shown, the users finger 141 (FIG. 1d) touching screen 105 can input data, and information can also be communicated via acoustic source 125 controlled by computer 120. (see also FIG. 14).

It is noted too that the touch screen can desirably have indents or ridges such as circular depression 140 in screen 105, in order to guide the users finger such as 141 to a certain location on the screen where for example the starting point of various command movements might be made. The indent or ridge (disclosed further in FIG. 5 and elsewhere herein) can be shallow such that it can be felt, but not deep enough to cause refractive gradients which would disturb an image say of a map that might take up the whole screen surface in a navigational mode for example. Ridges and depressions in smooth surfaces of even 0.003 inches for example can work (thickness of human hair), while even 0.020 inches deep or high can be used with little optical effect in many cases.

It should be noted that because the display and tactile physical selection or adjustment means providing control functions and feedback are both programmable, one can have programs which vary by driver. Indeed, one can even take your program with you, for example if renting a car having a similar display and a data input device for your to enter your program in (e.g. a CD Rom for example using a version of the CD player of the car). Or your program can be downloaded from remote sources such as your home computer or the internet (where a selection of programs might be found, say on the GM web site)

The Sequence of actions undertaken then using the embodiment in one preferred version is Glance,
touch,
move,
confirm (tactilely and/or visually—much like today's dash boards—but generally with even more tactile feel relating to the position, and larger lettering which can be better seen at a glance)

Alternatively, one can do it entirely by feel, using the techniques described above where the programmable acoustic source is used to input to the user all data needed (even to include the initial starting point of the knob position such as a short pulse burst, with a long delay until the next one to indicate a first position, or the end point, which might be three short pulses with a long delay, to indicate position 3 for example. Other pulse frequencies or codes could signify different programmed knob functions if desired, like wipers or heat, or whatever. Or voice can be used as discussed, or combinations thereof.

Also gestures can be used, such as hand or finger position or movement, as disclosed in my copending applications for example.

It should also be noted that using the computer controlled projector (or other screen) display a variety of visual cues can be used to signal a function or state has been reached. For example, Not only can one display a word such as "high" to indicate high heat, but one can also have it blink 3 times when reached. This could correspond to a acoustic or other tactile signal comprising three pulses as well.

Also it is possible for the colors or patterns of the words or figures to be changed programmably. For example, in the FIG. 1 case the whole knob, or its surroundings could be illuminated through use of an appropriate computer program for the display, in bright red when the highest heat position was chosen (with blue, for the lowest, for example). And for example, the knob surroundings could be projected on the display in polka-dots, if the knob was not in a position that actuated a function (e.g. a dead zone).

Where desired (e.g. with elderly drivers) the writing near the knob, might be in large letters, which could even be so large that the words (such as "high", for a heater blower speed selected, would need to be abbreviated as HI" for example).

It should be noted that the knobs or other tactile input devices shown could be contained on an interchangeable member. One can have a touch screen, equipped with interchangeable front panels of the type just described which have specialized physical devices for interaction with the sensing arrangement used. In this manner one can actually add in an interchangeable manner, overlays to your dash which can be used for different purposes. This can enable you to do tasks by feel not otherwise possible.

For example consider a tactile display or touch screen of the type shown in FIG. 1 or 2 using optically sensed details on the back of the various control items used. In this instance the control items are able to be interchanged. A group of levers could be on one screen, knobs on another, and so forth. Or one screen could have markings on its face for email and stocks, with levers and knobs to suit, etc.

Figure 12:
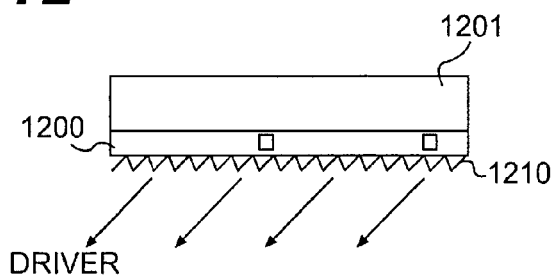
FIGS. 12-12c are alternate acoustic embodiments of the invention using a surface acoustic wave (SAW) conventional type touch screen or other acoustic means and employing a LCD Flat panel display

This overlay type of arrangement does not depend only on the touch screen types I have invented, but may work with touch screens employing other technology, for example the acoustic surface wave version of FIG. 12.

The tactile control of the computer system used can in this manner, be customized not only by the user in general, but for specific purposes—what I call a "Mission specific" tactile and visual input and output. This makes it still safer by providing just the right tactile controls for the application at hand.

To illustrate, consider optional removable (and interchangeable) tactile screen member 144 (dotted lines), in this case a piece of plastic shaped like a 3×5 inch card, and containing a knob 145 (also dotted lines) as described whose position can be determined (optically via camera 117, or otherwise).

This card member can be inserted to change the function of the tactile portions, or for example to include, as illustrated in this case, an additional knob as tactile physical selection or adjustment means. In one preferred embodiment, the card member can be placed in slot between guides 146 and 147 (which could be dovetailed to assist). Data concerning the function of the knob in this particular case can be provided to computer 120 by any means desired, including downloads from the internet, magnetic or optically encoded data on the card or whatever.

The card as well can have printing on it, and may be transparent in areas desired to allow data from the display behind it to indicate data relating to the knob position or other variables. The use of data permanently printed on the card might befit a mission specific or one time use card, for a particular project, or a particular drive to work. Note that the card could also correspond to just one function, like an internet music source selection card, that you could use just for this purpose, removing and storing it when you wanted to put another card in, or free up the display area for other information.

It should be noted that an acoustic source such as 125 providing programmable feel, can couple to this insert-able member as well. Such cards have a very interesting use as single use, or mission specific controls for certain purposes, and provide additional freedom in choice of tactile physical selection and adjustment means.

It is noted that TV camera based systems are not the only way of determining position or orientation of tactile physical devices such as knobs in the invention. Other technologies may be used. For example of interest in rear projection display based applications of the invention are DLP or micro-mirror type chip projectors which can be used in a reverse mode as a scanning device, capable of determining, with a suitable detector in conjunction therewith, indications relating to say the location of a flag on a knob, corresponding to its rotational position. In some cases they can be used to see finger touch as well, by for example, the direct viewing method of FIG. 11.

Figure 1F:
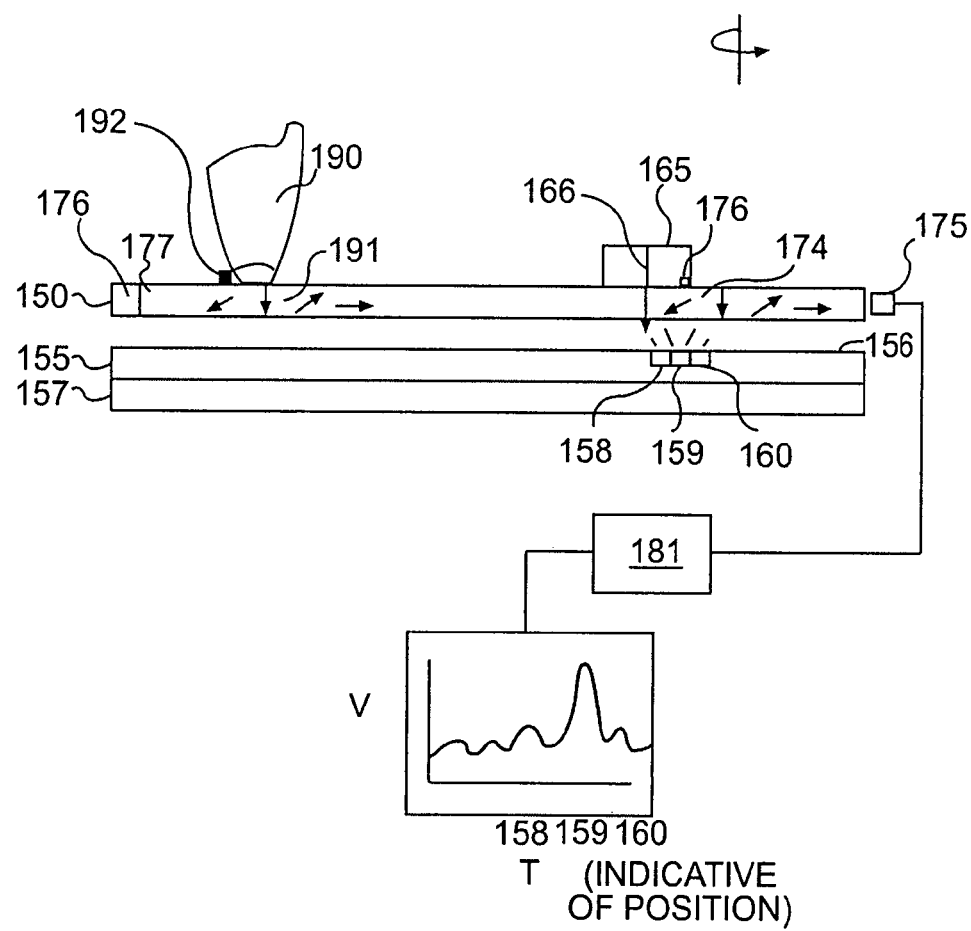

FIG. 1*f* provides another illustration of such devices. Consider a version, in which a transparent member 150, typically glass or Lexan plastic is placed in front of an LCD or other flat panel display (e.g. a plasma display) 155 having front surface 156 and rear illumination source 157 which directs light upward in the drawing. LCD displays operate by switching bi-refringent properties of individual elements such as 158-160 (of hundreds of thousands), whose size is exaggerated for clarity.

Knob 165 is secured to transparent member 150 using pin 166. On the rear of the knob, is reflector 170 which reflects light 174 from light source 157 passing thru the LCD elements such that light so reflected (or other wise deviated) back into member 150 reaches high gain photo detector 175 by bouncing between the front and rear surfaces 176 and 177 of member 150. The reflector design can be such that it scatters or otherwise helps direct light to the detector.

In operation, the location of reflector 170 is determined, in order to determine the circumferential location of knob 165. In this example, the area of LCD pixel elements in the region of the knob are all initially dark (in this case a circular area), and one by one are sequentially opened up (under computer control) to allow light from source 157 to pass thru in order to illuminate the region in front of them. To illustrate, with the knob pointed in the position to the right of the drawing, as the pixel elements 158-160 are sequenced thru, it is noticed on graph 180 of detector amplifier 181 output, that at as element 159 was illuminated, that detector 175 received a signal considerably stronger than at other positions. This then indicates that the reflector was closest to that represented by LCD element 159. Typically such a position would be an grouping of elements able to identify knob circumferential position within the tolerances needed (e.g. every 10 degrees, say).

LCD elements can be very rapidly sequenced in many cases. Thus it may be that a sequential illumination scan such as just represented can be done so fast (e.g. in a millisecond) that it is unnoticed by a user—even if he is looking directly at the knob. (human eye integration time being 60 milliseconds.). To make the total scan even quicker, it is noted that it is only necessary to scan an annulus corresponding to expected reflector positions, if a point reflector is used on the periphery of the knob, say. Other reflector designs can also be used. And refractive, diffractive, or other elements to direct light can also be used It is noted that transparent member 150 may be interchangeable as well, as disclosed above.

As shown therefore the circumferential location of knob 165 has been determined. Similarly slider (or other tactile selection or adjustment means) axial locations can be determined as well. And in addition, so can finger touch locations in x and y dimension of the LCD panel surface For example consider finger 190 touching front surface 177 of member 150 as shown. In this case the finger itself acts to reflect light 191 from individually sequenced LCD pixels (not shown for clarity) to the detector and its location can be determined by similar means.

Finally it is of interest to consider optional ridge or other small protrusion 192 on LCD flat panel screen (or cover glass thereon, which as noted can be interchangable). This as noted is to provide a tactile relation between the users finger and the screen and display, an issue discussed in FIG. 5. This allows the finger to easily find a set point or line of action on the screen without looking. Typically the height of the ridge or alternatively an indentation is small, so as not to unduly disturb the light field of the screen. Generally preferable is when there is sharp slopes, so as to minimize lens effects.

It should be noted that displayed data next to (or even within same, if room exists) a knob or other tactile physical selection or adjustment means usually at a minimum displays the selection or adjustment choices—e.g. wipers, heat, air, cruise; or lo, med, hi for example. Alternatively or in addition, pictographs, colors or patterns may be used for example.

In addition other information can also be displayed, such as more detail about what the choice means. This can even include effectively displaying the instruction manual for that function if desired.

FIG. 2

FIG. 2 illustrates in further detail the versions and features of the preferred embodiment for near term commercialization disclosed in FIG. 1. It is illustrated in the form of a rear projection display, but is not limited thereto. This embodiment senses positions of screen mounted knobs and other conventional tactile selection and adjustment means. Such sensing can be performed by a variety of electrical, magnetic, acoustic or other means known in the art, but here is preferably illustrated with optically based sensing means, which has the advantage of simplicity and non contact operation.

Consider screen 200, where a physical tactile selection or adjustment means such as a knob, (switch, slider, rocker, etc), 203, is in one portion of the screen surface, and this knob has on its rear facing the camera a "pointer" or mark 210 which can be imaged and sensed by the camera 205 and its associated image processing computer 212 to tell the angular knob position, and pass this information to the display and vehicle control computer 215. Camera 205, can also be used to see screen distortion under touch like 340 in FIG. 3. This means that a combination touch screen and "regular" function dash can be provided for very low cost, which can be interchanged, since the camera 205 can be programmed to see any effect in any zone. Note that the light source of projector 218 even may be used to provide illumination of mark 210. And since one can control the projector, one can choose the light projected for example to clearly illuminate the marker—which itself may be preferentially reflective of a certain color which may be instantly recognized in the color image obtained by camera 205, which can be a solid state matrix TV camera. Identification of the marker is also made easier by the fact that its relative position is approximately known to be in a certain region of the screen.

While the projector source may be used to light the markers of any knob slider, switch or other selection or adjustment means, a separate light source such as laser light source 219 can be used alternatively such that the camera using filter 221 (dotted lines) can for example see, using an interference filtered image responsive only to laser light, the knob mark reflection (where it too can have a dichroic mirror reflecting only laser light substantially). This makes the sensing of knob position independent of what is being projected., and it can operate with no projection at all. Its noted that if the laser (or alternatively for example an LED source) is in the near IR (e.g. 0.9 microns) the user will not see any indication of this.

With proper construction, the knob or for example transparent slider 230, having mark 231 (also viewable by camera 205, or a different camera if desired) running in track 235 in transparent screen 200, can be all transparent (however, scattering light from the screen face, 201. Under computer control, the projector source 218 then can be used to change these devices to indicated different functions, both by projected lettering and color, and possibly other patterns or the like.

Figure 2B:
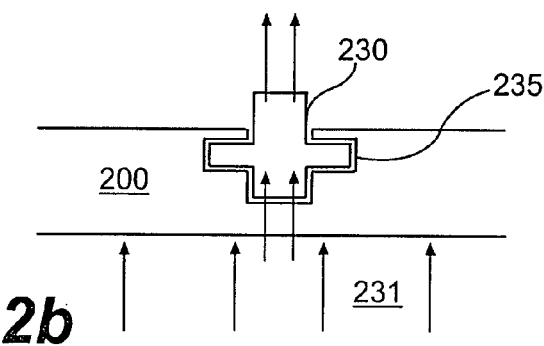
Figure 2C:
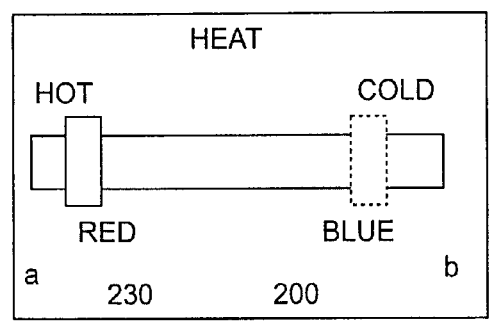

For example consider the function of transparent slider 230, illuminated by light projected through it, 231. as shown this runs in dove tail groove track 235 in the outer portion of screen 200, as shown in FIG. 2b. in one mode, shown in FIG. 2c, the word "HEAT" is projected on the screen over the top of it, by projector 218, and further, the zone from a to b in the slider grove may be projected with a continuous band changing from red (hot) at point a, to blue (cold) at point b. Camera 205 senses the position of mark 231 and computer controls the heating and air-conditioning system of the vehicle accordingly.

Figure 2D:
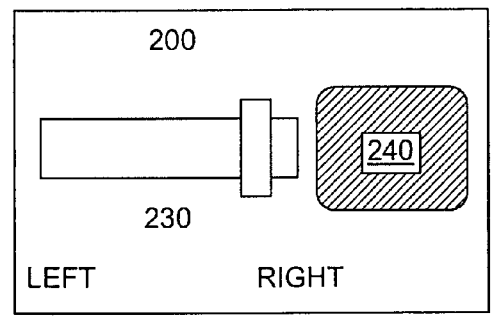

In another screen scenario however, the projector can turn this same slider into another function altogether, for example as shown in FIG. 2d, where the data projected is indicative of the viewing direction of a swiveling exterior rear view camera on the right side of the vehicle, which presents an image 240 of the rearward TV camera scene viewed on the same screen 200 (or alternatively, a different screen), by virtue of the projector 218 also projecting the image. The words right and left are projected in this case.

In this manner, a relatively small number of knobs, sliders, switches, buttons, or whatever can be used to control a large number of functions, while in large measure still retaining a classical "feel" to which users of dashboards are accustomed. Not all portions of the screen zone need be transparent, allowing the projected image to be displayed at all points, but this feature allows maximum flexibility in the use of the screen. The surface distortion technique or other touch screen technologies as desired, may be combined with the direct viewing technique as can be appreciated, such that more data can be entered as well. For example in a particular combination, one can use the FIG. 2 version to dial in a heat setting, and then push the knob in, creating a distortion type reading as taught in FIG. 2-4 above and co-pending applications indicating that the selection has been made. Or one can use stereo vision or other means to detector the push command—which also may be proportionally related, rather than just a switch.

It Is noted that not only then is the image displayed programmable, but the inputs are too. for example, if problems were detected, the Malfunction screen (or an applicable portion thereof, such as electrical system data, if an electrical problem was detected) could be called to be displayed, and the slider 230 would assume say, the function of turning the hazard lights on, and calling "ONSTAR"—if not automatically called.

Figure 2E:
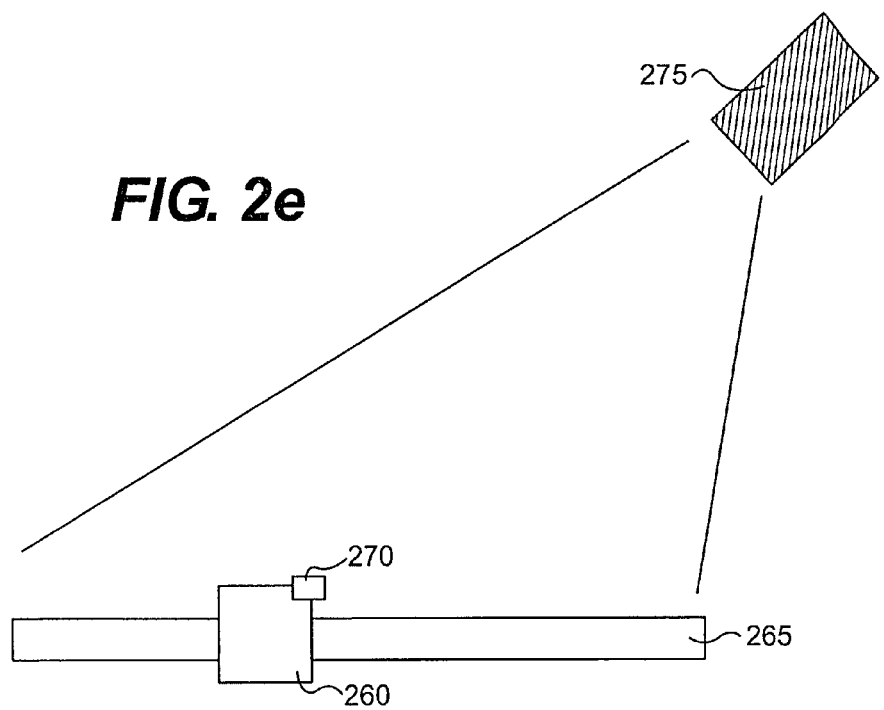

It is noted that the knob and slider examples, are those where the position of the device (angular or linear, in the case of knobs and sliders) is determined, and provides an analog or digital indicator (if converted, or if mechanical detents area used) to the control computer. If switches are used, the function can be as simple as on or off. In this case, shown in FIG. 2e, the button, such as 260, might push in to the screen 265 to turn on, exposing as it does so a mark 270 to camera 275 (like 205).

It is useful to have tactile feel provided with ratchet clicks for example, when moving a knob or slider or other means of the invention. This provides a feedback to the user of how much movement has occurred. In addition, the system itself can provide a feedback by sound, or by visual indication on the screen which could be a change of pattern, color or the like.

FIG. 2f illustrates another example of a tactile conventional mechanism built into a screen—which itself may optionally be a touch screen. A big knob 277 as above is for example located in the middle of a large screen 278 in the central dash portion. Both the knob and the lettering on the screen are desirably large to allow most all drivers to read it easily in a glance without the aid of glasses. Optionally the print and control knob etc sizes could be user selectable. For example a young user might like four small knobs rather than one big one, with less need to go to secondary screens. Another user might want sliders rather than knobs. With an open computer system, programs for this could even be purchased in the after market.

As shown there are 6 indications at different circumferential locations (as shown there are diversely illustrated as Heat/Air, Wipers, Stocks, Email, audio. It is possible to have more than 6, with each still being quite readable, especially if the screen is large.

The user turns the knob to the desired indication and presses in the knob as appropriate to indicate his selection, which is detected by the touch screen apparatus or by a second camera capable of seeing the knob from a different angle and thus by matching with image from camera 205 determining depth movement of the knob by pressing. (see other drawings for examples).

Then as shown in FIG. 2g, a new screen 285 (in this case a heat one selected in the first case 2f for example) may be generated by the display control, indicative of that function. In this particular example a bar indicator 286 is displayed, and the user touches the point "P" on the bar which he wants, temperature wise that is. The point can be programmed by the display computer to be color indicated, or with actual temperature markings or whatever. Or he can use the knob to select a fan speed, rear air distribution, or something else.

FIG. 2h illustrates a version of FIG. 2f or g which can be achieved with a conventional display screen having no special capability at all. In this case a conventional knob 290 (or other tactile selection and adjustment means) is located below screen 291 and a large displayed surrogate knob 292, like 277, is displayed on the screen. As the user physically turns real knob 290, the surrogate knob 292 moves to the positions indicated—just like in FIG. 2f, where it was physically turned. Again, one can push the real knob in if desired to indicate a choice. Or the choice can be indicated by just leaving the knob in position for a minimum time period.

The "real" knob of 2f (albeit virtually displayed), or the surrogate of 2h, both allow displays having multiple choices of different variables or functions, and different gradations at different circumferential locations, and the use of different languages or the like.

It should also be noted that such a conventional approach can be still more conventional, and that is to not display the surrogate knob 292, but rather just display the status of the knob and/or the result of its movement or other action.

For example, consider display of the word "Heat" 295 in big letters on the screen, as the knob 290 is touched and movement is sensed. As it reaches its next setting which could be "Wipers", for example, the display would be changed accordingly. These large words could be supplemental to any smaller display words chosen. (particularly when the knob is on the display rather than below it or otherwise positioned)

It is noted that the acoustic or other programmable tactile feedback to the user operating the conventional knob 290 can be provided as well.

It is also noted that with TV camera sensing of a finger touch screen distortion or features of physical tactile devices such as knobs as described can be usefully accomplished by change detection, accomplished for example by subtracting images in a quiet previous state (i.e. static) from instant images. Both finger touch and knob turning represent change which can be so identified. And the region of change pinpointed.

Its also noted that one can calibrate the camera system each time a measurement is made as well, if the movement is known—e.g. a knob turn to the next position

FIG. 3

Where surface distortion based transduction of touch events is desired, a preferred means of detecting surface distortion is that given in reference 1, which discloses illumination of a surface and subsequent retroreflective re-illumination of the surface from which an enhanced image of the distortion in such surface are created. This method (and the products based thereon sold under the trade name "D-Sight™"), is at once, simple, fast, and capable of intelligibly measuring minute distortions over large surface areas. All of these are advantages for the present disclosed invention, and "D-Sight™ is the preferred method (but not the only method) for determining such distortions. Other optical techniques are grid and moiré triangulation, also providing surface distortion data.

Figure 3:
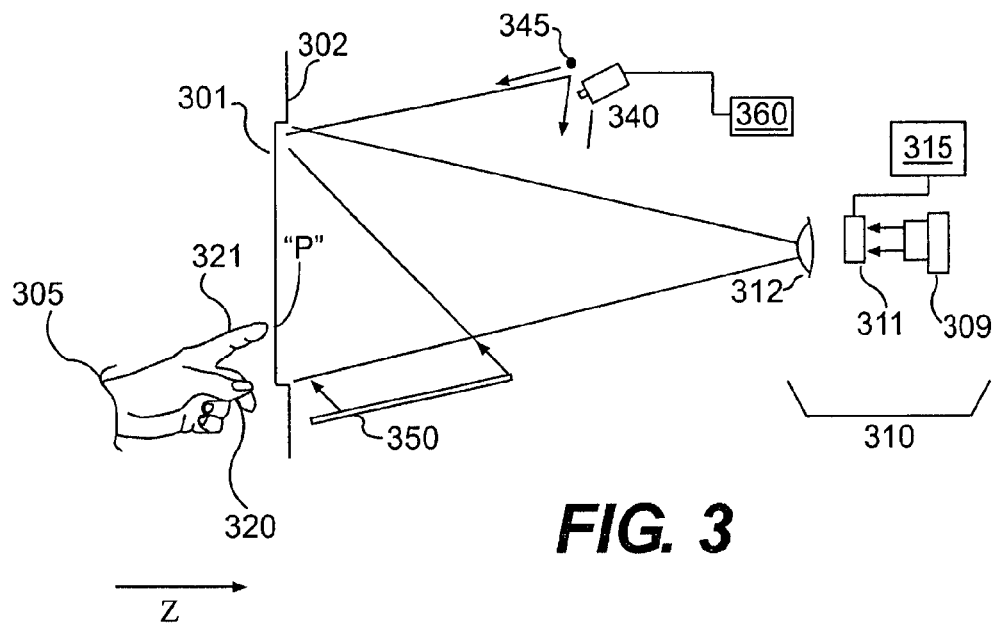
FIGS. 3-3e is a basic embodiment of a dashboard located touch screen, similar to that of FIG. 2 of Ser. No. 09/435,854. Also illustrated in FIGS. 3b to 3d are various examples of tactile-like manipulation of data using such a screen FIG. 4 a preferred arrangement for safety and other purposes, in which the illumination and image projection source are off-axis, such that an airbag (also called supplemental restraint system, or SRS) can be deployed on-axis. Both optical and computer correction techniques are used to make a presentable display.

FIG. 3 is a basic embodiment of one type of distortion/deflection based touch screen suitable of the invention, previously disclosed in reference 2, FIG. 2 (and others). Touch screen 301 located on a vehicle dashboard 302 in front of a passenger 305 for example, typically and desirably of significant size so as to make reading and touching easy, operates as follows. The screen surface 301 is illuminated by a rear projection TV projector 310, in this case provided by a low cost micro-display such as an LCD matrix 311 or alternatively for example, a Texas instruments DLP device, illuminated by light source 309, and imaged on screen 301 by lens 313, and controlled by display computer 315.

A TV camera based transduction of the screen touch or other physical function is used as described in co-pending applications and further in this application. In this embodiment, surface distortion of the screen caused by touch or impact of one or more objects (e.g. thumb 320 and first finger 321 of the passenger) is a achieved using for example the D sight effect, and employing TV camera 340, light source 345, and retro-reflective screen 350, together with microcomputer 360 (which may be the same as 315) to process the data obtained as to the location, of any and all contacts in the xy plane of the screen, and their z direction or force function if desired. As was disclosed in the referenced application, it is the local screen distortion caused by the touch that is being sensed in this case.

It is noted that camera 340 imaging distortion of screen 301 touched by finger 321 may also be used to image a projected image on the screen produced by image projector 310 and backscattered by the screen. Analysis by computer 360 attached to camera 340 directly correlates the point of touch "P" to a point determined by 360 in the image. For example if a test image is produced on the screen which has 100 vertical bars, and the finger touch hits between the $90^{th}$ and $91^{st}$ bar, it is then known that the reading of the touch determining apparatus corresponds to this location in the image. Similarly 100 vertical bars could be projected and the vertical distance calibrated.

This correlation can be performed when ever it is desired to provide a test pattern. Thus the operation of the device is not dependent on stable image projection over time and a knowledge from the projection input, as to where the touch occurred. This kind of operation is useful if there is instability in the projection for example, or if there are problems with the mounting of projection devices, large amounts of thermal expansion or the like.

The transparent screen material may be darkened if desired, to make the system innocuous and or invisible when not turned on. If desired, the display may be flat, or curved with reasonable positive or negative radius to correspond to aesthetic design considerations. (generally however, flat displays are easiest to use).

While not the only form of touch screen which can be used with the invention herein, this distortion based system has several unique properties which are helpful in the car application. For example some of those given in reference 2 are:

A potential "four" and "five dimensional" capability, wherein the force vector direction as well as the magnitude of force is measured.

An ability to have a data storage of a complete signature at once, physically or in memory.

Robust and reliable. Many prior art touch screens are of specialized construction and would be quite expensive to replace if they were broken, especially as the size increases An ability to have the surface distortion or touching input means of any material, completely removed from the actual sensing of the input.

Inexpensive, particularly for larger surfaces.

Some embodiments give a desirable tactile feedback since it is the actual physical deformation (and the amount thereof) that is responsive. Thus the feedback to a finger (or other member) in terms of resistive force is proportional to the desired input. This tactile feedback is particularly desirable in for example the automobile where one should not take one's eyes off the road.

High resolution data entry may be made directly on the screen with ordinary instruments or fingers. If desired the "beam" of the display can literally follow the touch point, just as a pencil line would follow a pencil. In this application the 3-D capability allows one to press harder and make a darker (or wider) line for example, just as one would do in normal practice.

Multipoint Operation. The existing touch screen art is capable only of measuring one touch point in X and Y at a time. The invention is however, capable of multi-point operation or even simultaneous detection of complex area "signatures", not just "points". A further advantage of the invention's ability to detect multiple input signatures, etc. at any point on its face, therefore a keyboard, a piano keyboard, a joy stick can be artificially created at any point under computer control or simply by random human command. This is particularly desirable in a car where you cannot necessarily keep your eye on the data entry device. And it is of use for handicapped people who could not be expected to hit the right point on the device every time, but if they just hit the device anywhere, could make a move from that point in a manner that would be intelligible to a computer for example Variable and "Intelligent" orientation. It is also useful therefore to replace in many cases keyboards which have continuous arrays of keys, be they optical, mechanical, contact, electro mechanical or whatever. Unlike most keyboards the disclosed type can "float" (i.e. be at any zone on the surface) which is convenient for people who know how to type but cannot see the keys for example, while driving.

Tactile feedback, including programmable. The unique tactile feedback application aspect of the invention allows one to essentially use a deformable member as a sort of miniature joy stick for each finger or to allow one to rock back and forth between one or more fingers to enter information, for example—such as seek controls on a car radio. In addition, programmable tactile feedback such as air blasts, vibration, etc., can also be added easily to the touch surface.

Another advantage of the invention is that it can detect a force or displacement signature such that the signature of someone can be used as a control enabler, or other verification tool—for example in authorizing the driver to start the car, or an internet transaction. In addition, for the handicapped, non-conventional inputs such as palms and the like can be used, rather than fingers.

Figure 3B:
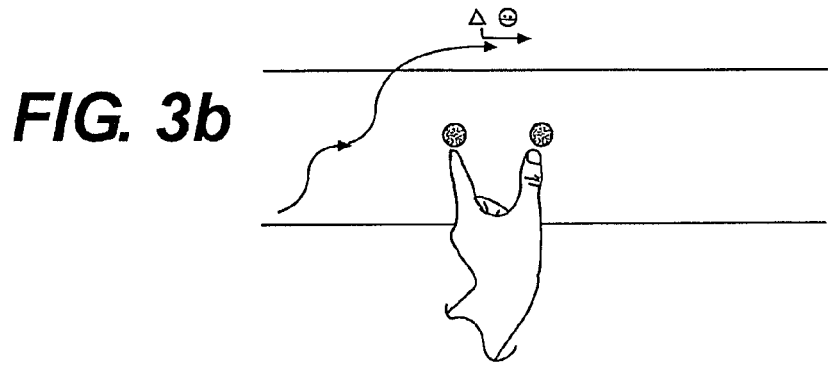

As was pointed out in copending applications, the distortion based screen, because it physically is perturbed by the finger(s) of the user, has some subtle tactile features all by itself. For example consider finger 320 and thumb 321 of person 305 who desires to "rotate" a virtual knob 365 (dotted lines in FIG. 3c) depicted on touch screen 301 (for example created by display computer 315). The person can do so by pressing in on the screen 301, and registering to the computer that a finger 320 and thumb 321 are touching in close proximity, just as one would pinch a small knob on a dash of today. This is illustrated in FIG. 3b. Then in a sequential motion, the screen sensing system senses that this knob is being turned an amount m, in direction theta, so to speak, as the fingers rotate their points of contact indication, FIG. 3c-effectively like a twisting motion. This amount of rotation is communicated to the car control system, and the heater output let us say, raised accordingly.

Figure 3C:
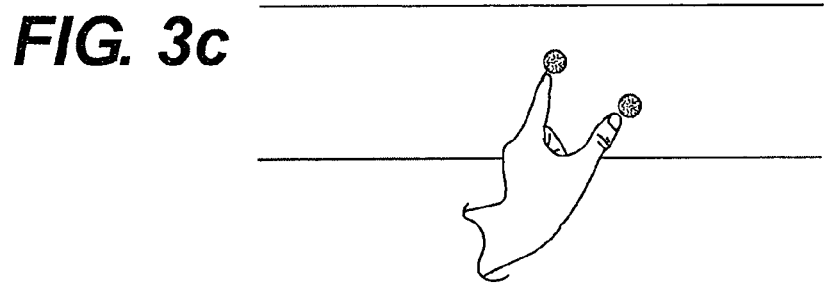
Figure 3D:
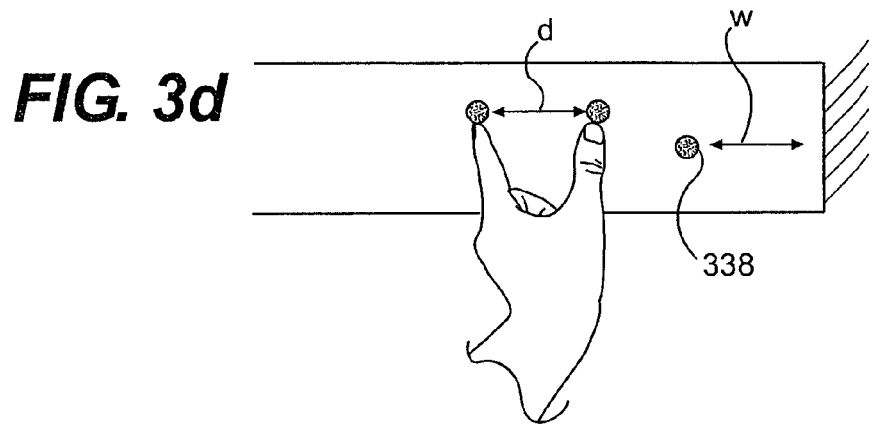

In another example shown in FIG. 3d, an input of how much windshield wiper delay is desired. is achieved by just touching the screen 301 again in this case with finger and thumb, spaced d apart, in the general area of windshield wiper control functions (dotted lines for example). This could be a fixed zone of a particular displayed screen (such that the driver would know by heart, or could be projected on the screen for the moment in such large manner that it would be easy to see- and hit, so to speak. (so one wouldn't have to take eyes off road for but a fraction of a second). With fingers still resting on the screen, the driver for example, could move them a distance delta d to a new delay position, in order to decrease the delay, say.

Alternatively the distance w of a finger touch point 338 with respect to the fixed base point 'a' (eg at the side of the screen, or from a ridge or other tactile reference) could give the delay for example.

Consider too the action of finger 320 and thumb 321 which can both rest on the screen at once, and alternately push in and out, so as to "rock" back and forth, just as one might do today in selecting radio stations with a seek rocker switch, or moving outside mirror positions for example.

While use of a finger and thumb are most natural, clearly any two things could do it in the above example. And some functions might use three or even more input points.

More common is just one input, such as a forefinger. Here again the device of ref 2 is useful, as the forefinger force on the screen (also a z input) can be the function desired.

Figure 3E:
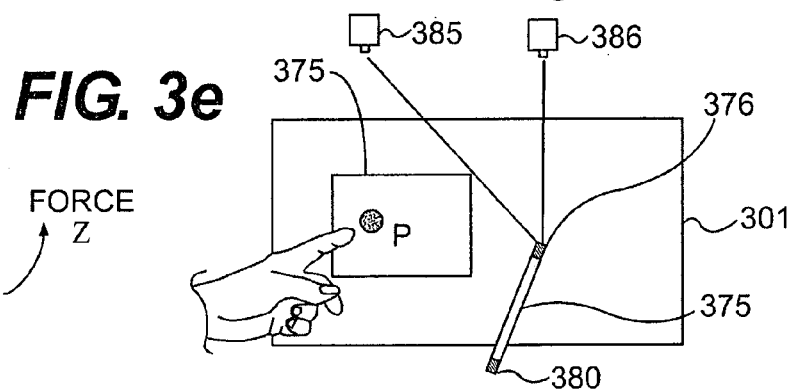

For example, as shown in FIG. 3E, a box 370 can be displayed on screen 301, and the person just pushes on the box at point 'P' with a force sufficient to cause an indentation or distortion 'Z' which is sensed, and used to indicate that a high heater blower speed is desired (the Z value attained could also be indicated to the driver with a tone or other audio pulse, or a visual indication on the dash. For example a value of 0.010 inches could give a louder or higher pitched sound than a 005 inch movement. Or it could be fed to a voice program to just say HIGH, for example). This is easier than, and preferable to, the common touch screen alternative, of leaving ones finger on the box for a given amount of time t, during which the heater speed would ramp up. The latter is disadvantageous, in that one must wait—with ones finger still in place—for the desired speed or other desired result to be obtained.

It should also noted that it is thought possible that one can push in on a surface distortion detected screen with one object, such as a forefinger, and not only detect the degree of indentation, but the degree with which one might "twist" ones finger in a rotation motion. This makes it easy for a driver to interact.

It is also noted that one can also write on the display screen 301 with any object for example pen 375 and have the computer trace the line such as 376 on the screen, or store it memory, or transmit it (the same goes for all data inputted to the system by whatever means). One can also sense the head 380 of pen 375 with a camera pair 385 and 386 (shown here in the windshield header) such that the point of contact is known on the screen, and the head position is known, and thus the pointing angle to the screen is known which can be useful for various applications, such as pointing at data within a 3D virtual display.

Note that as alternative to the twisting knob motion of FIG. 3b-c above, one can also just trace with ones finger, a movement on the screen. For example, a small left to right linear movement starting at any point in at least a region of the screen, could indicate an increase in a variable such as heat, where as an arc shaped movement in the clockwise direction could indicate an increase in heater blower speed. The more the movement, the more the increase (and likewise decrease). The rate of movement of ones finger across the screen can also be sensed by comparing consecutive camera views, and one could use rate to give a value as well—a quick movement could be a quick blower speed, or a fast wiper speed, say.

FIG. 4

Figure 4:
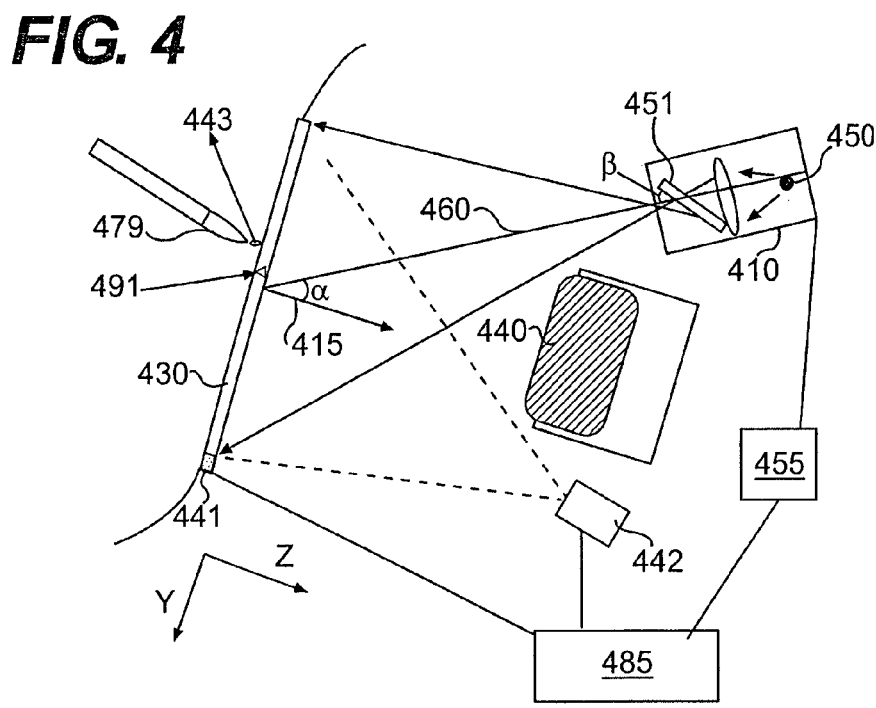

FIG. 4 illustrates the same arrangement as FIG. 3, but with the image projection device 410 located off axis at angle alpha to the normal 415 of screen 430 as shown, such at an airbag 440 can be deployed on axis, substantially along the normal. The display can be a simple display only, or can be part of a touch screen as disclosed above and elsewhere herein.

The airbag when initiated moves the touch screen 430 out of the way. In this case it is desirable to secure the screen in such a way for example by providing it with a weakened tear line, that it blows down, or out of the way, and to make the screen of material which itself causes minimal harm. The ability to choose the screen material accordingly is advantage when using the screen distortion based touch sensing technology disclosed in ref 2. However, other touch screen techniques known in the art can be used. For example a surface acoustic wave generator 441 can be used (with acoustic microphone pickups not shown for clarity), to triangulate on where the human touch 443 has modified the acoustic wave passing through the screen material.

Both optical and computer correction techniques are used to make a presentable display. For example, the projection source may have a light source 450 illuminating a LCD matrix 451 driven by display computer 455, where the matrix is tilted at an angle beta with respect to the axis of projection 460 such that the image is in focus at all points on screen 430.

Since this arrangement yields varying magnification at different points across the screen, the input to display computer 455 is advantageously corrected using equations processed by said computer to account for the variation in magnification and other issues as desired, in order to make the projected image appear uniform.

As disclosed copending applications, the point 479 of an ordinary pen or other device held and manipulated by a person is shown here as an input, for drawing or other purposes using computer 485 connected to the accoustic sensing system 441, or alternatively, electro-optically based sensing system 442. This computer 485 also acts as input to display computer 455.

Finally it should be noted that another advantage of the surface distortion system is that the material can be anything sufficiently transparent that sufficiently deflects. If it is desired that the screen break apart, rather than fly off, swing down etc, when the airbag deploys against it, it can be slit or serrated, or for example screen 430 can be equipped with a weakened tear seam 491. Other touch screen types may also be advantageously slit or serrated or otherwise induced to break or disintegrate as well, but many will not work properly in this mode due to disruption of acoustic or capacitive fields for example. Again a big advantage of the instant invention.

This approach not only allows the airbag to deploy properly independent of the presence of the touch screen, but as well allows low cost of repair after a deployment. The screen surface isn't expensive, and is the only thing struck—less cost possibly than repairing dash upholstery.

It is noted in FIG. 4 that the image projector can be angled in the x z plane as opposed to the yz plane as shown, in order to miss the airbag deployment. Any touch screen sensing using cameras or whatever does not have to be in the same plane with the projection unit. In addition, where it makes sense, the airbag itself can be somewhat angled with respect to the touch screen as well.

FIG. 5

Figure 5:
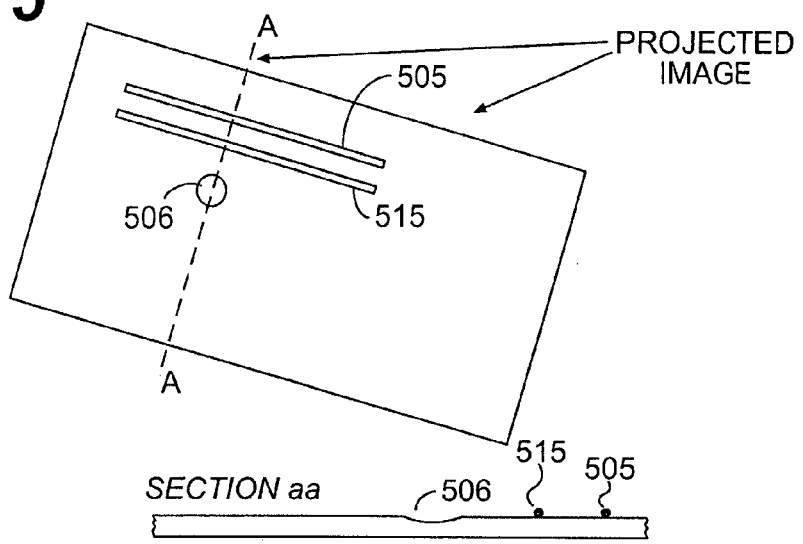
FIGS. 5-5f illustrates a touch screen having indented or raised portions of the screen or overlays thereon to facilitate the driver finding the correct location for input action the touch screen may provide, to aid knob turning, slider moving, switch rocking, turn signaling, transmission mode selection and other usage of various tactile physical selection or adjustment means.

On a touch screen display, it is desirable to have tactile indication of where to touch, ideally so one would not have to take ones eyes off the road.. FIG. 5 illustrates an example using a screen wherein such a means for tactile relation comprises a local disturbance or relief of the screen surface First let us consider a touch screen 500 which could be of any type, but is particularly easy to construct using the surface distortion type. The screen surface 501 is not flat in this case, but has transparent local protrusions such as 505, or indentations such as 506 which make finding the zone near them on the screen possible by feel. Generally, it is preferable that the protrusions or indentations be small, on the order of 0.010 inches or less for example (with correspondingly small slopes if a smooth indentation), such that minimum discontinuity to the eye occurs when images are on the screen.

For example, round indentation 506, could be somewhat larger in diameter "d" than ones finger tip 507, and be a position where z force would give the desired input—what ever It was. Thus if the driver switches screens to driver input functions, and his finger went over to touch the indentation in the approximate zone he knew, he would know he was touching heater speed, for example. If his finger went to the indentation on the other side 516, he would know that was wiper speed, and so forth. He would not each time have to look at the screen.

Similarly, if his finger found ridge 505, which might be one of two ridges, the other being 515, he would know from the displayed information "Heat" the bottom ridge 515 was for example heat temperature, and he would slide his finger along the ridge in the x direction accordingly to indicate how much heat was desired, for example. If he wanted wiper delay, he could slide along the upper ridge 505. In either case, all functions once learned, (ideally possible by a very quick observation if one was driving a rental car for example) could be found by feel.

Figure 5B:
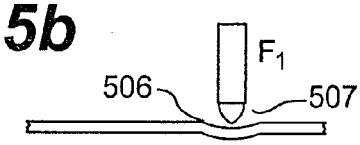
Figure 5C:
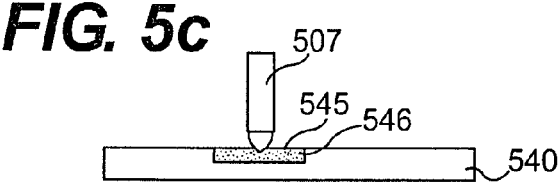

With a distortion based screen, such indentations also serve another purpose, in that they cause more local distortion in the zone indented such as in 506 side view FIG. 5b, due to reduction in wall thickness, t, of the material of the screen (e.g. Plexiglas or Lexan). This is often useful to decrease the force required for a given resolution. A similar effect can be achieved as shown in FIG. 5c by substitution of material of the screen, for example if in screen 540 a zone 545 where contact was to be made (in response for example to displayed functions) could be of material 546 different than that of the rest of the screen 540. In this case the screen could still be flat, and if both materials were equally transparent, likewise transparent. This is a particularly interesting thing, in that functions what ever they are could be memorized by the driver as always occurring in these spots on the screen, even though the screen could be used to display anything. And in some cases the totality of the screen at all points could be touched, even though the response would be different to forces at different points.

Indeed the previous indented or raised screen version, if the indents did not overly optically change the information displayed, can serve the same purpose. This then leads to yet another alternative, discussed in reference 2, that is to provide an overlay, on an otherwise uniform screen. This overlay can be of ridges, as just discussed for example, or can actually include various real knobs and switches, which themselves contact the screen. (previously disclosed in FIGS. 12 and 14 of reference 2).

The idea of adding ridges or indentations to touch screens to improve their tactile function may be employed with other touch screens than my distortion based type, such as those of the resistive type comprising a matrix of elements which contact at a certain point touched when the force of touch presses the outer layer of contacts against the inner. But it may not be possible to easily provide such ridges and indentations on conventional touch screens of today employing capacitive or SAW technology. It would however, be possible for indirect sensing methods, for example the "touch screen" of FIG. 11 in which ones finger image is sensed using cameras or other external means, independent of the screen itself.

Figure 5D:
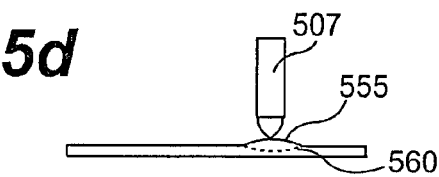

As shown in FIG. 5d, the action of the indented other material 546 for example, could "snap" to a new more indented location such that there would be a definite feel passed back to the person touching it. For example consider button 555 which is curved toward the user in its quiescent state, but when pushed in, snaps to position 560 (dotted lines)

Also of use is a screen version having zones of more elastic behavior, either due to weaker wall thickness of the screen, or different material than other parts of the screen. This may also be in addition to the use of indented or raised portions of the screen to facilitate the driver finding the correct location for input action. Note that where desired the material may be of the substantially the same index of refraction as the base material but considerably softer, and more easily deflected. And it can be flush with the screen so that the total screen appears uniformly flat.

Figure 5E:
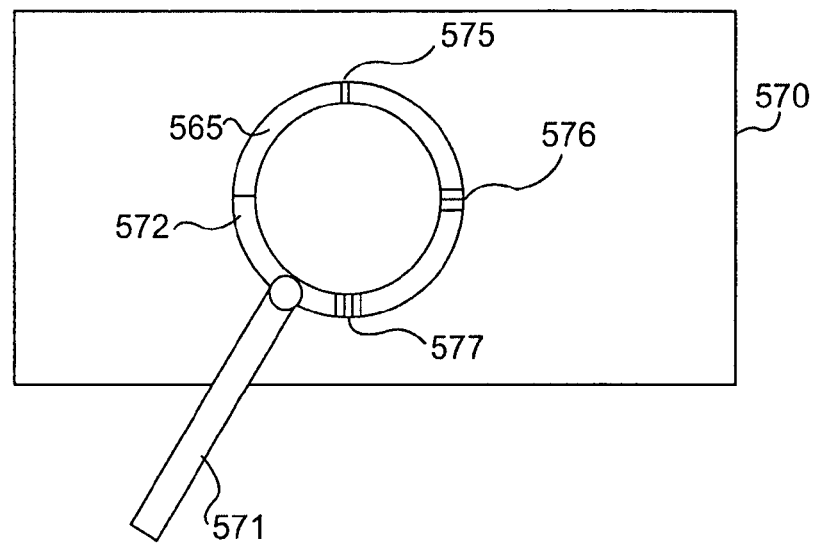

FIG. 5e illustrates a novel annular groove 565 in a translucent flat screen 570, which is easy for a user to under stand by feel, placing his finger 571 in the groove. A raised portion in the groove, 572, at the "9 O'clock position" indicates the start of the groove, and as one moves clockwise, the amount of the desired input increases (typically, it could be programmed otherwise). Optionally, small bumps (which for example, can also be coded as shown, two 575 at 12 O'clock, three 576 at 3 O'clock, and four 577 at 6 O'clock) can be used to further indicate to the user the location of his finger input by feel. As pointed out above, the immediate region of the groove can be color displayed or the like to better communicate visually to the user the result of his action. Again this groove need not be more than a few thousandths of inch deep in order to be felt by the user. If the sidewalls of the groove are aligned with a line from projector to the drivers eye, the effect of the groove on the displayed image will be minimal.

The annular notch or groove is very "natural". It has a neat feel, like the dial of an old style telephone in a way, and the analogy to a clock is known by everybody Alternatively a circular or annular ridge sticking out from the screen can be made with some what the same effect.

As noted, a desirable aspect of such ridges, grooves and the like, is that in linear form they can provide a "line of action", so to speak, which the driver can trace his finger along, in the example from cold to hot, as one goes left to right. The ridge or groove can be under or on top, or surrounded by the display as desired.

Figure 5F:
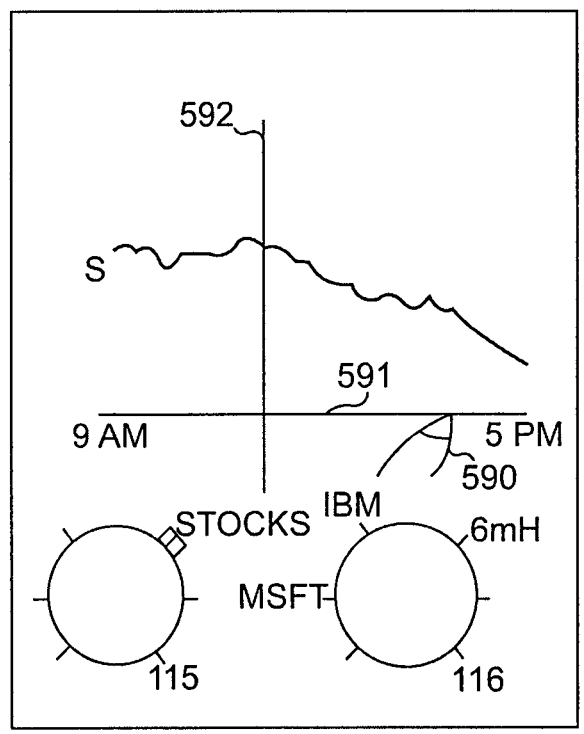

In FIG. 5f, a more sophisticated situation is illustrated wherein a plot of stock prices for the day has been displayed (in this case in the same region as the previous heat control, as a stock price selection has been made), and the driver with a quick glance can tactily slide his finger 590 along a horizontal tactile ridge or groove 591 to the point of the days trading (say 4 pm near the right of the chart) that he wants more information on. Such lines of action" can be vertical as well as horizontal, and more than one can be on a screen (e.g. 592 in the vertical direction). And as disclosed above, the line can be on a screen overlay which may be interchangeable, to accommodate different purposes.

Finally it is of interest to consider in FIG. 1 optional ridge 192 on LCD flat panel screen (or cover glass thereon, which as noted can be interchangable). This as noted is to provide a tactile relation between the users finger 190 and the screen and display. Of importance is that this is a very useful reference.

However to execute this with many types of conventional touch screens is difficult. This is because one typically in the car dashboard case at least would rest ones finger on the tactile ridge, indentation or what ever. This would cause a permanent signal if a conductive grid type, and this may not be what is required. This can in one instance be solved by only looking for changes in location of the finger touch, and when change occurs in finger position, then begin tracking the finger to its final position—which final position then constitutes the signal desired. Alternatively, in some cases the path or other characteristic of the movement may constitute the answer.

FIG. 6

Figure 6:
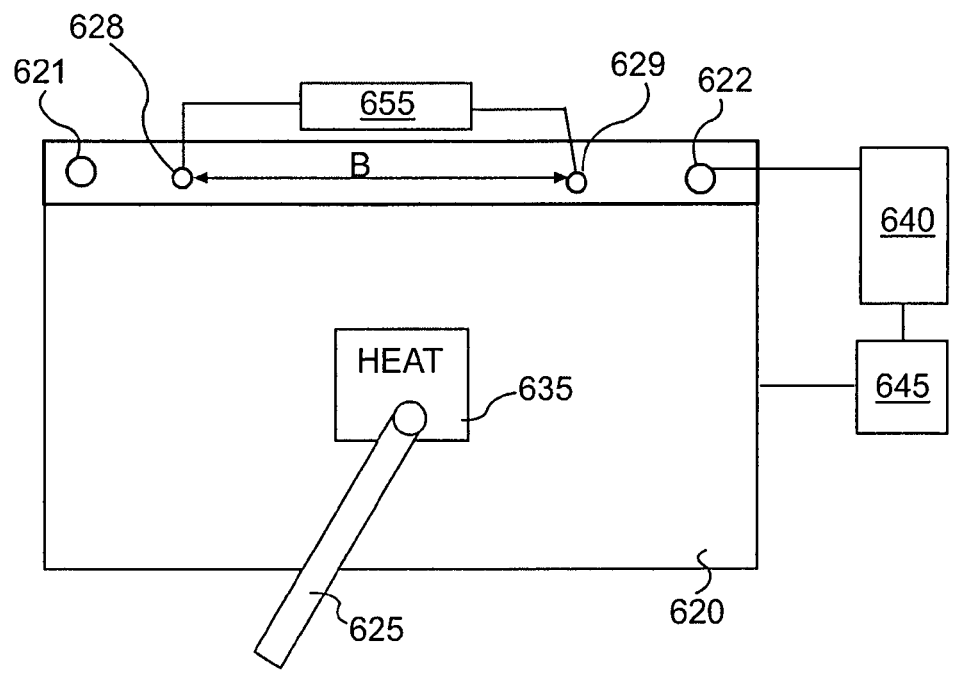
FIG. 6 illustrates a combined touch, gesture and voice activated system

FIG. 6 illustrates a combined touch, gesture and voice activated system

Which further illustrates the intimate connection of various functions of the invention, further including voice activation and response function's. The invention makes possible a multi-sensory dashboard data input/output system, including voice recognition and computer text to speech response, body part motion input (typically sensed optically, but not necessarily) and touch screen capability. Clearly it would be desirable to have such a device large, tactile, easy to read for all functions; and easy to add more functions—not achievable today with conventional dashboards.

FIG. 6a illustrates a touch screen display 620 in which two TV cameras 621 and 622 are located in the upper corners (or elsewhere) in order to observe a users finger 625, for example in stereo to obtain 3D finger position if desired. In addition two microphones 628 and 629 are also located so as to be spaced apart by a baseline b, allowing stereo discrimination of a users voice location, as well as a voice command. The voice location is used to determine driver location, and optionally front seat passenger location for airbag deployment or other purposes.

In a first version, the finger 625 touches the screen and registers a touch location in x and y by whatever means (conventional or as disclosed herein or in copending applications). The point touched by the finger, lets say the box 635 labeled "Heat" is detected and the coordinates of xy provided to the camera analysis module 640 by the touch screen determination module 645. At this point, the camera system then knows the approximate location of the finger (or optionally part or whole hand) in a very localized region of space, and can immediately then look for its indication.

For example, the finger can now be moved vertically up or down (or side to side), to indicate more or less heat depending on the finger position or movement. (heat having been the function selected with the touch screen).

This is not the only indication of combined function. The user upon touch, can vocally speak the words "up" or "down", with voice recognition module 655 discerning his command and executing same.

It is also possible as another example, to do both, moving the finger up or down, and vocally indicating a command to the microphones and voice module 655. In this manner, if one of the signals is faint, or suspect, the other can prevail. Or a co-incidence type of logic can be used where both the finger and the voice have to agree, to execute the function.

Alternatively it would however be possible for finger location to be sensed directly by external means such as the cameras 621 and 622, without any input from the touch screen sensing device.

FIG. 7

Figure 7:
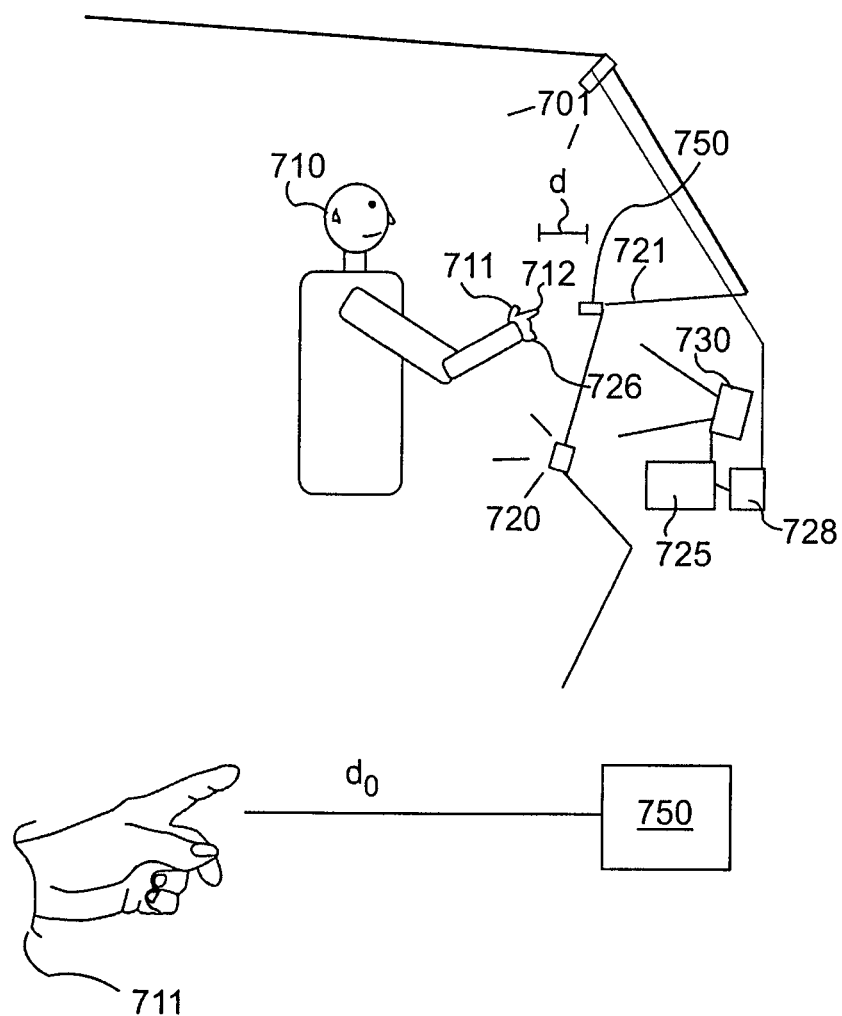
FIG. 7 illustrates a touch screen on the dash, whose control is further (or alternatively) equipped or enhanced with an optional TV camera based human extremity (head, fingers, hands, etc) tracker in the roof and other features.

FIG. 7 illustrates a touch screen on the dash (either passenger or drivers side), whose control is further (or alternatively) equipped, as disclosed in co-pending application references, with an optional camera based head tracker and/or finger or hand tracker (which can include multiple cameras to improve accuracy and cover inputs from more than one occupant). As shown, in one example the camera 701 is located in the headliner over the windshield 705 of the vehicle, in this case positioned to look at the users face 710 (for face recognition security purposes for example), and/or to look at the users hands 711, fingers 712, etc. Alternatively or in conjunction, camera(s), such as 720 can be located in the dash 721 itself, which are also useful for augmentation of inputs of the touch screen by direct viewing of the fingers or hands of the user when near the screen.

A stereo pair of cameras such as 701 (and another located into the plane of the paper and not shown for clarity), located in the roof can be used instead of a single camera. The camera or cameras can alternatively be located in the dash or elsewhere, and can also be used as taught in the copending references to provide depth information of points in their field of view. Indeed cameras can be located in the dash to view the occupants, or as shown in FIG. 7, can even be mounted in the touch screen itself, looking outward from corners thereof.

For example, one mechanism is to use the upward movement of a persons hand, such as 711, detected by camera 701 using image processor computer (eg a Cognex corp "insight" unit) 728, to provide as signal to the display and screen input control computer 725 to change the displayed data on the screen 726 by projector 730. One movement gesture of the hand (or just hand position) could be to change the screen from one type to another, while another movement could indicate which screen. Or as pointed out in co-pending cases, the positions or movements could themselves indicate the action to be taken. For example if a slider running left to right, corresponding cold, to hot of the heater was displayed, an movement of ones hand or finger near the slider from left to right could be used to provide an indication to the control computer to increase heat. In this case, a touch screen per se is not required, only a programmable screen. Thus this technique offers an alternative to use of specialized screens for touch input.

Features of the face, such as the eyes can be used too. For example consider Camera 701 looking at the face of a person in the vehicle 710. In one embodiment, the persons eyes found in the image for example using algorithms such as discussed in U.S. Pat. No. 5,859,921 by Suzuki. The persons eyes are separated a distance d which is determined using the camera computer system of the invention. As the face rotates, the distance d shrinks (foreshortens) as seen by the camera, and this reduction in d can be used to control either a function, like reducing the value of heat, or it can be used to switch consecutively for example for every incremental value of d, to an new screen choice or action choice within a screen (e.g. heat action, vs. the same slider representing fan speed action, say). The user could, for example, even choose in one embodiment via a pre switch selection, whether he wanted to control such things by voice, by hand gesture, or by face position/rotation.

Indeed, the user can signal the system to change screens or some other function, just by the number of fingers he holds up, the distance between them or some other signal.

As disclosed in referenced co-pending applications, by finding the eyes and nose, or eyes and chin, for example (e.g. 3 points), and using the locations so determined, one can arrive a complete single camera photogrammetric solution (if the original spacings are known, or learned by the system), such that x, y, z, roll pitch and yaw of the face relative to the camera can be determined. The person can thus nod up and down to make a selection as described above, using the camera to determine the variation in position of the plane of the face determined by 3 points such as the eyes and nose, or eyes and chin.

Another method to change the screens from one display to the next, or to change the function of individual controls of a screen, is to provide in the dash (or alternatively on the windshield header or door header for example), a ranging sensor such as triangulation optical type 750 located in dash 721, which looks outward in this case from the dash, and, as shown, measures the distance d, of a users hand 711 in front of the dash 721. Sensors of this type are described in U.S. Pat. Nos. 5,362,970 5,880,459, 5,877,491, 5,734,172, 5,670,787 and others by the inventor and his colleagues.

This sensor can be set to read that a particular hand position has been reached (as disclosed for example in U.S. Pat. No. 5,362,970), in which case the display for example can switch to a new screen—e.g. from highway screen 30b, to traffic screen 30c. Or in a more sophisticated mode of operation, the sensor can determine the actual distance to the users hand (or alternatively the change in distance plus or minus from some nominal mid point d0. For example, if the heater screen were touched, the distance delta d from d0 in a positive direction could indicate the increase in heat from the nominal setting. There are clearly many variations on how such controls can be structured, but all have the advantage that they can operate in the car environment, and do not require one to deviate appreciably from important driving tasks. Its noted that with laser sources and solid state cameras (or PSD analog cameras) having large dynamic range, that operation in a car is assured It should also be noted that cameras such as 720 in the dash, can be used with laser or LED sources, such as 750 in the triangulation mode, and at other times can be used for photogrammetry or recognition purposes.

Other types of sensors can also be used to trigger screen changes, or other wise input data to the computer control systems of the invention. these can include, besides voice, other audio inputs (e.g. hand clap), proximity sensors and bulk mass sensors operating on inductive or capacitance principles, and the like.

Sensors such as cameras or triangulation sensors such as can also be used as components of a "Smart" airbag control system to determine the characteristics and locations of occupants of the vehicle, as disclosed in reference 5.

It should be noted that by co-locating camera or cameras or other sensors with the touch screen operation and control "module" to be inserted into a dashboard, one can assure proper line up of camera viewing and touch screen display, using a factory calibrated module, without in situ registration requirements (such that a indication say of a finger pointing at a point on a screen, corresponds to the known projection of information at that point.

It is noted the dashboard which may have a platform for a lap top computer to dock into under the passenger side of the dash, which can then allow the user to use the dashboard screen while driving. The use of hand or fingers or objects held in the hand to operate such a laptop and screen combination has been disclosed in the co-pending references. Clearly one could use normal mice, keyboards and the like which could plug in the laptop, or directly into a dash receptacle. Alternatively, or in addition, voice commands can also be used.

FIG. 8

Figure 8:
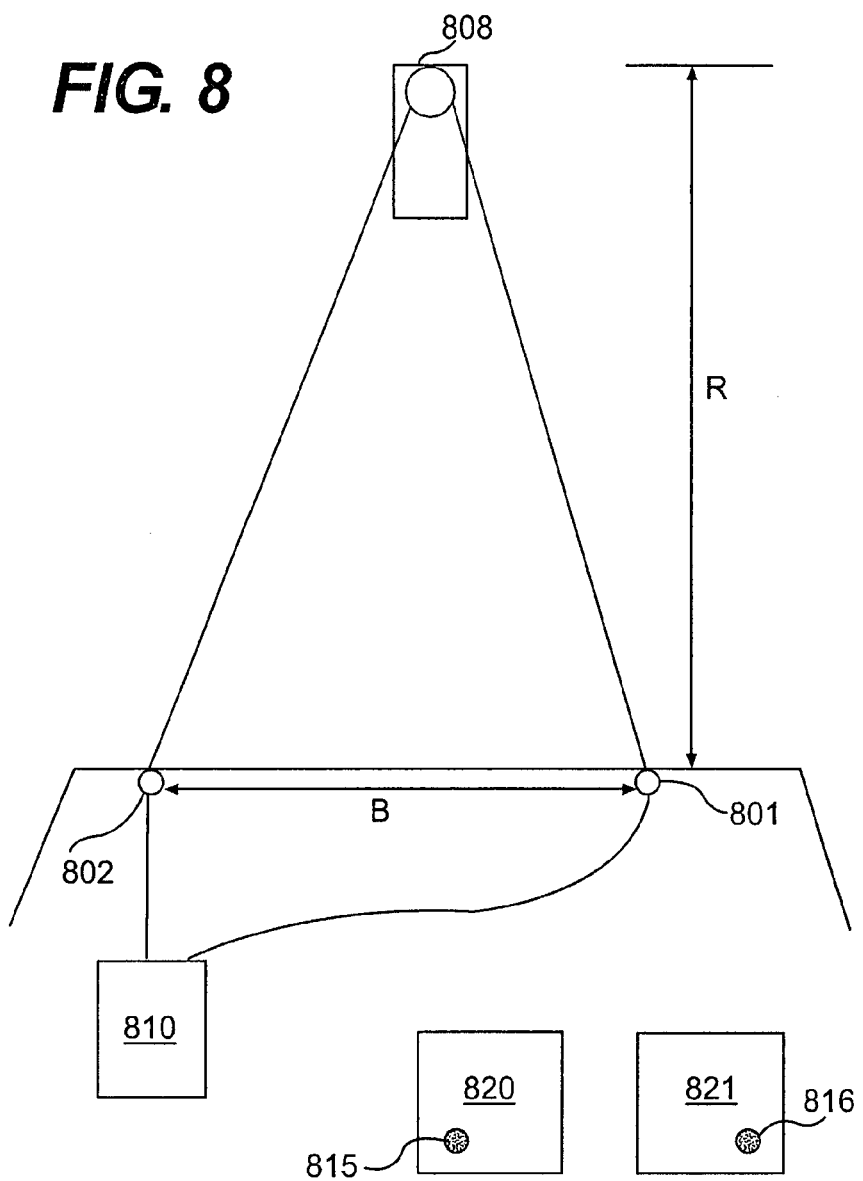
FIGS. 8-8b further illustrate methods provision and functionality of external data using a screen with TV images

Shown in FIG. 8 are user assisted displays used to control machine vision systems associated with TV camera in puts of conditions external to the vehicle. Two embodiments are shown, a stereo vision based system capable of determining range to an object in the z direction, as well as its xy location, and a driver designated feature search, using a screen of the invention.

As shown TV color camera pair 801 and 802 are positioned in close proximity to the windshield 805 with a baseline B between them to provide range information as to range R of objects in front of the vehicle when images from each camera are matched in computer 810 using known stereo photogrammetric triangulation principles. (see for example, A paper by Dr. H. F. L. Pinckney entitled Theory and Development of an on line 30 Hz video photogrammetry system for real-time 3 dimensional control presented at the Symposium of Commission V Photogrammetry for Industry, Stockholm, August 1978, together with many of the references referred to therein gives many of the underlying equations of solution of photogrammetry particularly with a single camera. Another reference relating to use of two or more cameras, is Development of Stereo Vision for Industrial Inspection, Dr. S. F. El-Hakim, Proceedings of the Instrument Society of America (ISA) Symposium, Calgary Alta, Apr. 3-5 1989. This paper too has several useful references to the photogrammetry art.).

The color (e.g. red) and shape (e.g. round) of an object such as the traffic light 808 can be used to help discrimination against background in the scene, as can their location (either above or to the side of the road—which can be inputted to the system automatically given a GPS signal to locate what jurisdiction the car is in (such jurisdiction having known traffic light positions).

In one embodiment, FIG. 8a, the computer 810 is programmed to simply look for red or yellow traffic light signal images, such as 815 and 816 in the lower portion of respective image fields 820 and 821 (due to lens inversion), and provide to the operator of the vehicle a signal as to their presence and distance. Optionally, such signals can be used to actuate the brakes or other functions as well. If only presence is needed, then a single camera data can give this information.

In an alternate and similar embodiment, the signal looked for is brake lights of vehicles ahead, or tail lights. It is noted that a single camera can be used to roughly estimate range to taillights since most are on relatively similar base line widths (almost car width, and are this baseline is nearly horizontal at all times). Similarly oncoming headlights can be detected and range determined if desired in this manner.

Figure 8B:
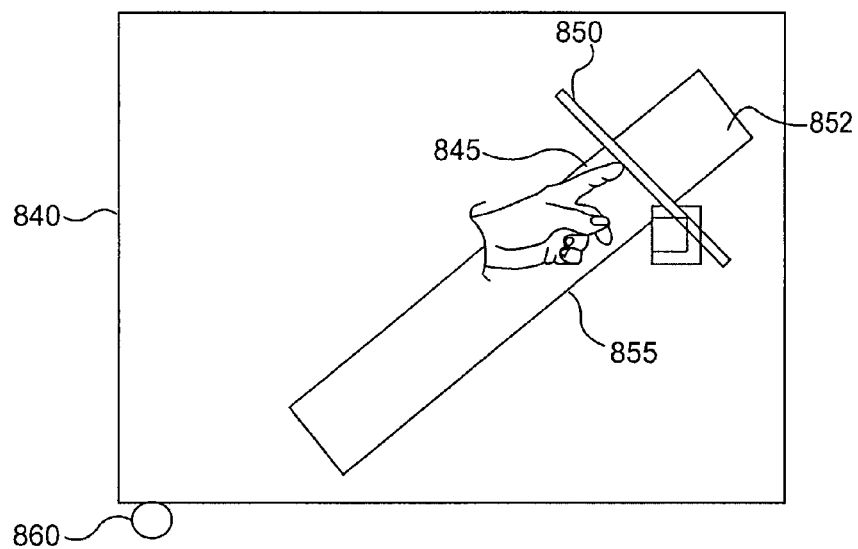

In another embodiment of the invention, the user himself, can designate things of interest for the camera system to sense and help keep him aware of. For example as shown in FIG. 8b, consider large touch screen display on the dashboard 840 on which a TV camera image of the zone ahead of the car is displayed using one of the screen options available. The driver, with his finger 845 can touch the screen to designate a region of interest, and the computer camera analysis system can consider criteria in this region. For example, the user could point out a car ahead, an intersection with traffic lights, a shoulder of the road such as 855, a line marker in the middle of the road, railway crossings such as 852, and so forth. Known machine vision programs such as Vision Bloks by Integral vision corporation can be used to process the TV image data to continue to monitor the position of a crossing gate 850 in crossing and to warn if it begins to go down for example. In this manner Machine vision can be of assist to the driver, without the necessity of processing complex scenes. It is particularly true if the driver can say intersection, or light, and point to the approximate region of the image to monitor.

In an auxiliary implementation, the car can further include one or more infrared light projectors to illuminate retro-reflectors (also generally in known locations) of vehicles and highway signs ahead or to the sides of the vehicle. In this case it is used to keep from disturbing other drivers, and near IR (e.g. 0.9 microns wavelength) can still be detected by conventional cameras.

It is noted that the driver could alternatively ask the system via microphone 860 using voice recognition to look for a certain condition, such as "stoplight". But voice recognition is not as effective to determine where to look in the image field.

In this example it is often desirable to find the traffic light which is lit, so to speak (e.g. red green or yellow), since the lit one is the most distinguishable. A problem exists that if nothing is seen, it still doesn't mean nothing is lit. (not fail safe). Thus operator assist by designation is useful, to define a region that surely has something lit, such that the sensitivity can be ramped up until it is detected)

FIG. 9

Figure 9:
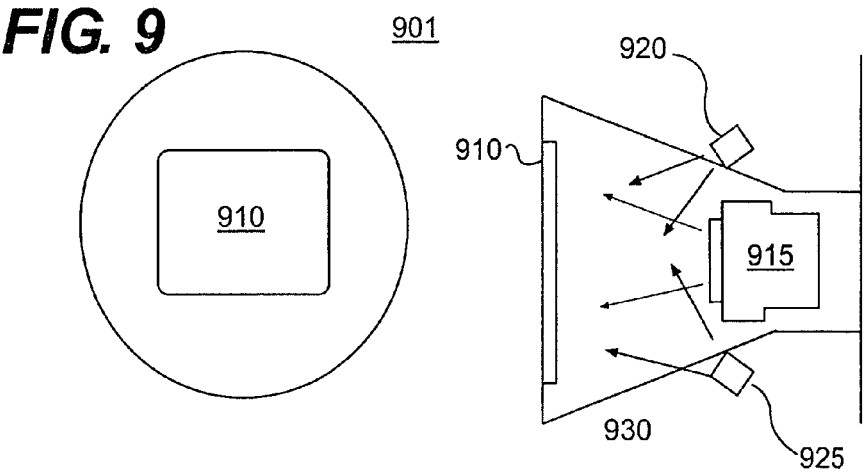
FIG. 9 illustrates another version, in which the steering wheel and airbag also encompasses the display and touch device.

FIG. 9 illustrates an embodiment building on that of FIG. 4, in which the steering wheel 901 includes in its center portion a display and touch device, such as touch screen 910, also with airbag 915 behind it. As in FIG. 4, the image projector 920 and sensing means 925 for the touch screen is preferably off the axis of the airbag deployment. Both are included, with the airbag 915 in housing 930.

In this manifestation, the housing for the sensing means and projector becomes larger in diameter than currently in today's steering columns, however Since the touch screen in the wheel can allow virtually all essential controls and functions to be viewed or actuated, this eliminates the need for many of the switches and levers on the column needed today for windshield wipers, cruise control, transmission and the like, which also pose a safety hazard, as do any switches which can be impacted by passengers. In this example, there are no protruding devices of any kind required It is not necessary to use a rear projection based touch screen in the steering wheel, but given current laws, an airbag is virtually required in the steering wheel. And too a projection device can be fixed in position in some cases, while the wheel moves. While this avoids wrapping of wires, it does mean the display would not look right on a rotated wheel, without computer compensation of the projection to account for same.

Figure 23A:
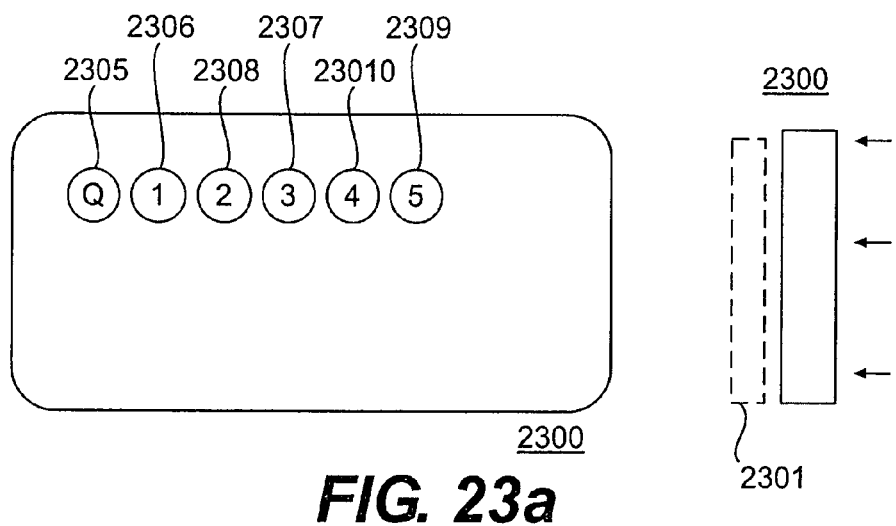
FIGS. 23a-23b illustrate a keyboard embodiment of the invention
Figure 23B:
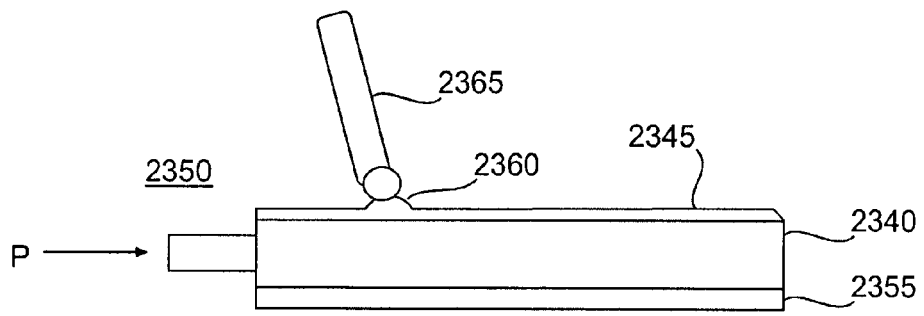

Alternatively, or in addition, A camera overhead or to the side such as shown in FIG. 23 as well as referenced co-pending applications also can be used to input commands from human positions, or small switches knobs or other tactile selection and adjustment means and controls actuated by the human which are on the steering wheel. For example, in this case if the controls are done this way, the touch screen 910, need only be a display screen without the touch capability, since control actuation by the user can be done by use of the cameras as shown, or by conventional devices.

FIG. 10

FIG. 10 illustrates an embodiment of the invention where a Screen display moves around a touch point using a vector of touch, rather than where the touched point is moved by the person touching to different points on a fixed display. This is radically different than any known touch screen operation I am aware of, and is achieved herein by having a display responsive to the vector of touch, which allows an urging of the touched point in a chosen direction to command the display on the screen.

Figure 14:
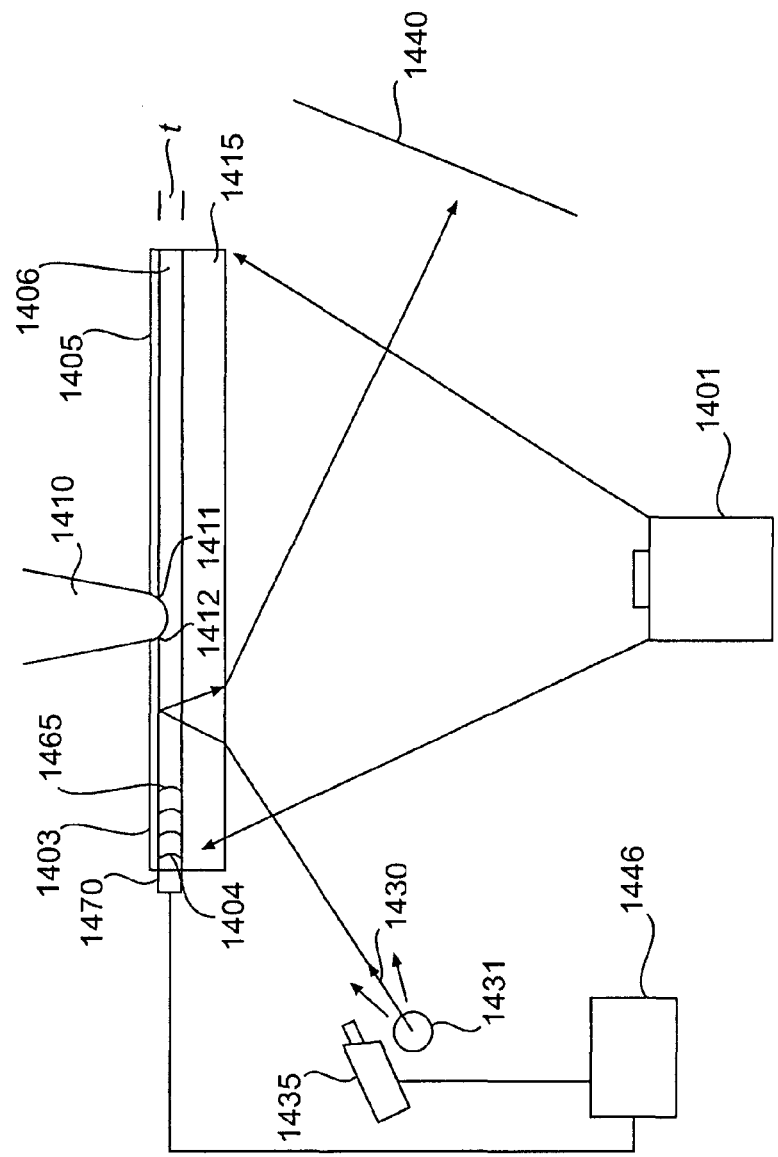
FIG. 14 illustrates a novel screen design for distortion based touch screens. Also illustrated is an Optical touch screen equipped with a force feedback signal which is acoustically generated by a piezo electric or other transducer providing an acoustic wave force pulse back to the user to signal that one is close to the point desired or has reached it for example. It can be pulsed, or of static or varying repetition rate or frequency, or of varying amplitude.

It should be noted that in FIG. 14, the finger 1410 by pressing in on the pliable screen outer surface, undergoes resistance which opposes movement from side to side, but does not inhibit it. This resistance can be helpful in tactilely determining a direction of movement. For example as ones finger touches the screen at a point "P", there is felt in the finger is a resistance when one wishes to push to one side or another. As soon as one begins to push, say to the right, the display begins to move accordingly. But the finger itself need not be moved across the screen, as the force of the finger against the resistance acts as gas pedal so to speak to cause the display to move For example consider FIG. 10*a* where a screen 1000 is touched at point "P" by finger 1010. The display is controlled to put a slider right on the finger point indicative of its position along a sliding control path. At a future time, after pushing with ones finger a given amount, the display looks like that of FIG. 10*b*. Note that the finger is in the same xy location on the screen, but the display has moved, and is now indicative of an increase in the position along the path, and a corresponding increase in a variable, in this case heater blower speed. The previous position of the heater control slider is shown in dotted lines.

This same approach can be followed not only by conventional knobs and the like, but also by more complex items, such as displayed seat icons shaped like seats (such as typically found in Oldsmobile aurora and Mercedes vehicles). These icons can be pushed in any number of different directions, not just x and y related.

Position and orientation of the image can thus be in proportion to the absolute value of a control variable known— which modifies what the image looks like as it jumps to a logical position at the point of touch.

By having a display and associated control function which moves around the point of an arbitrary touch, this embodiment requires much less visual concentration than conventional touch screens requiring the touch to track a predetermined fixed display.

It is noted that the operation shown in FIGS. 10*a* and *b* can also be achieved using more conventional touch screen technology, but simply causing the movement of the display shown between condition a and b to occur by leaving ones finger on the display for a length of time, said time related to the rate of display movement and the rate of change of the control settings.

However in this case, the direction of change is not clear, just by touching the screen at a point. Thus some other indication has to be given (which the touch vector version provides). This direction indication can come from moving slightly in the direction desired, and then leaving ones finger sit. Or it can be provided by voice input. Or some other method.

FIG. 11

Figure 11:
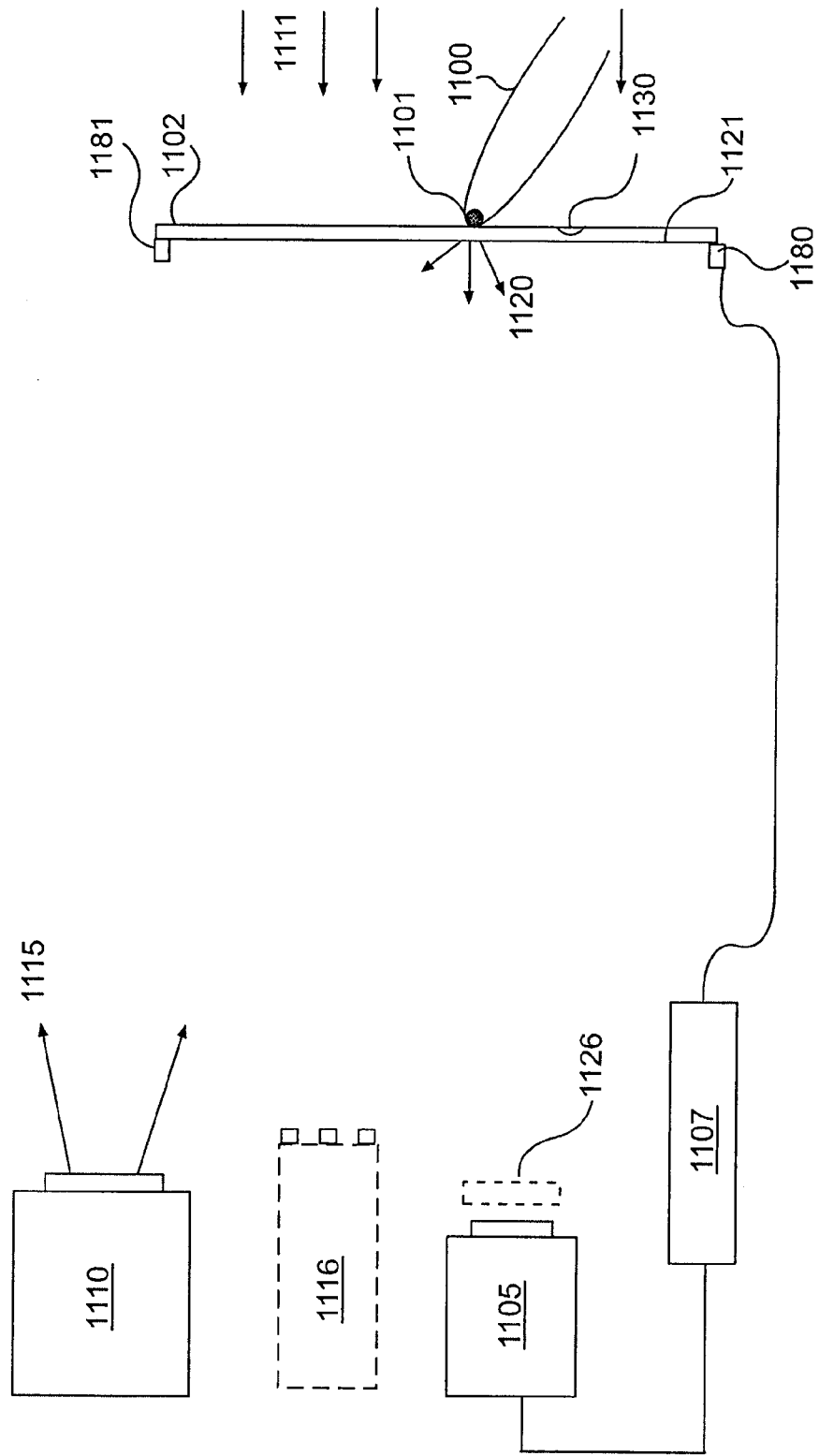
FIGS. 11-11c are alternate embodiments of the invention using the image of a users body portion or object, using light from a projection source, or from inside the car to back illuminate said portion.

FIG. 11 is an alternate embodiment of the invention using the image of a users body portion or object, using light from a projection source, or from inside the car to back illuminate said portion.

For example, consider, finger 1100 of a user touches screen 1102 which is sufficiently transparent (though still able to scatter light projected on its surface). TV Camera 1105, located behind the screen and out of the way of the displayed image projector device 1110, is used to view the screen 1102 from the rear. The Camera image is processed in system computer 1107.

In a first case, the camera sees the darker image of the finger 1100 touching the screen, when back illuminated by light 1111 from the users side (in this case light inside the car. This works well during daylight and in relatively well defined situations, but poorly at night unless auxiliary lighting is provided inside the vehicle (e.g. From IR LED's which can be placed for example in the roof of the vehicle behind the front seats, which are not disturbing as they are invisible). The camera is ideally used to see the finger touch location in x and y screen coordinates when the projector source is dark eliminating background noise from the screen. The projector can in some cases be switched off or its displayed image darkened only momentarily, to avoid the impression of it being off, which can disturb the user.

As an alternative solution to the night illumination problem, a reverse situation can be used, and is generally preferred. Here, in one embodiment, the finger tip 1101 is front illuminated through the screen instead using light 1115 from the projector 1110 (or optionally by a separate source such as IR LED's 1116 (dotted lines) located behind the screen, whose light, like that of the projector, passes through the screen from the rear. The reflection 1120 from the finger, is sensed through the screen by the camera 1105 as shown.

Given the screen scattering properties, generally required to make the projected display image visible to users in variant positions, the user's finger (or fingers) need be close or touching the screen for best results. (when touching it may act to frustrate the scattering effect, and work even better).

For best results in the presence of strong projection images, anti reflection coating 1121 is applied to the back of the screen to prevent backscatter reaching the camera from the projection source, and the camera is purposely located off the angle of direct reflection off the screen from the source as well. If a separate quasi monochromatic source such as IR LED 1116 is used, a band pass filter at that wavelength such as 1126 (dotted lines) can be placed in front of the TV camera 1105 in order to pass largely light from the special source, and not from the projector (which could also include a band blocking filter at that wavelength—desirable in most cases anyway to limit heat reaching the screen.

It is noted that if the screen is to the right of the driver, as it would be if located to the right of the steering wheel on the dash or center stack, the finger will generally approach the screen at an angle as shown—this can make it easier to discern the point of finger contact as a longer stretch of the finger edges can be used to perform the calculation from the TV image.

The screen if desired, could have raised or indented portions, as described in FIG. 5, such as indent 1130 where the users finger would touch.

The image of finger tip 1101 can be further distinguished by other methods. For example the camera 1105 is typically a color camera, and if the light projected by projector is white in nature, the color of the imaged light from the finger tip will be flesh colored, and only flesh colored images can be looked for by image analysis software in computer 1107. Since everyone's flesh may be different in color, one can teach the camera computer system during a setup phase, by simply putting ones finger on a square or squares on which white (or another color) is projected. It is thus desired to match the return from one or more projected colors with an indication of the persons finger.

Another means of distinguishing ones finger is by image sharpness. Since the surface of the screen 1102 is typically scattering, it is clear that objects that aren't in direct contact with the screen will be seen less clearly—and in fact become indiscernible if the finger or other object is too far from the screen in the direction away from the camera. Thus a criteria for determining finger presence on the screen is both sharpness and color, as well as degree of light return and size (most finger touches being within a size range on the order of 10 millimeters on the screen).

To avoid having the camera system exposed to images which don't represent a touch, it is possible to sense independently that a touch condition has occurred, for example with piezoelectric transducers such as 1180, and 1181 whose information is processed by computer 1107 and then use this signal to cause the camera computer to analyze images on the screen. When a force or other touch condition is detected the system is programmed to look, minimizing the chance of false signals due to unusual lighting conditions.

Another variant is to see the deflection of the screen or other indicator of finger location, and using this knowledge, then localize the search for the finger image. Conversely, one can get a rough finger image, and then localize the location of search thru other means, which could be acoustic, optical or whatever.

Figure 11B:
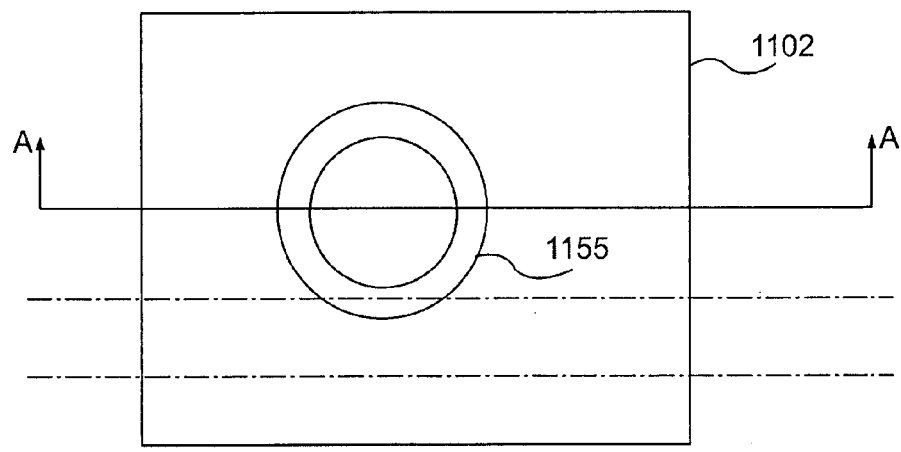
Figure 11B:
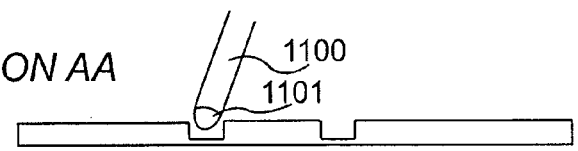

FIG. 11*b* illustrates an annular groove 1155 in screen 1102 which can be traced around with finger tip 1101 in order to guide finger tip to the desired clock wise position indicative of a variable or quantity desired. The finger image, is discerned best when the finger is fully in the groove, as it would be when one was "feeling" for same and guiding ones finger around it, in a fashion similar to a old style telephone dial, or knob.

Figure 11C:
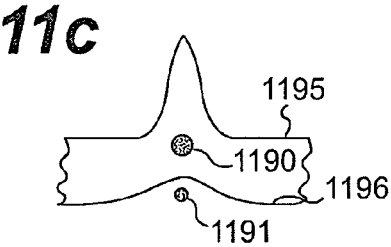

FIG. 11*c* illustrates a thresholded finger image 1190 as seen by camera 1105 when the finger is in direct contact with a outer scattering screen surface, while finger image 1191 is that seen with a finger 3 mm away from the scattering surface. In each case the images are thresholded to the same intensity value. Note too that the edge contrast as illustrated in the intensity profile 1195 of image 1190 is much higher than the corresponding profile 1196 of 1191, which contrast can also be used, besides size at a given threshold intensity value, to discriminate the two conditions While the discussion above has been concerned with finger or other images illuminated with light in the visible or near IR wavelengths, alternatively, the Self generated radiation of the body can be used, detected with IR TV (eg pyroelectric) cameras 1105 operating in longer wavelength regions.

FIG. 12

FIG. 12 is an alternate embodiment of the invention using a SAW type touch screen 1200, such as a Mass Multimedia/

Elo brand, model M14-SAW employed with an LCD display 1201. (note it can also use the micro-display projection unit of FIG. 2). And the display screen may be equipped with eschelle prisms, lectilinear screens, or other optics 1210, to direct the light preferentially, for example toward the driver or in another direction as desired.

Figure 12B:
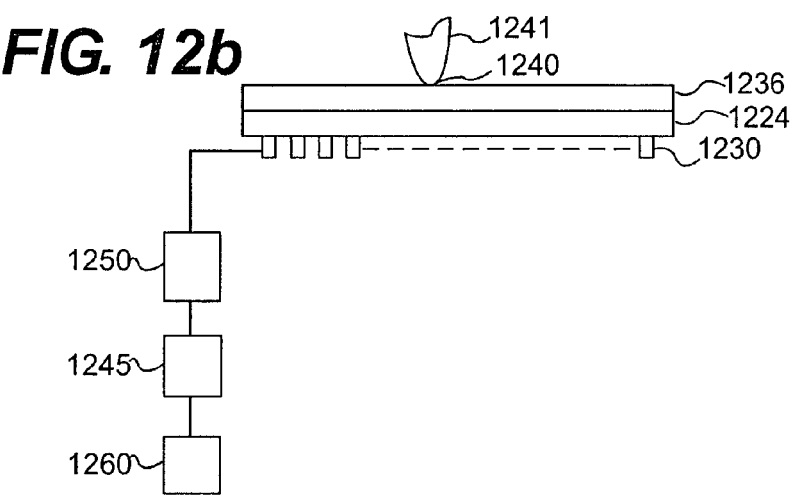
Figure 12B:
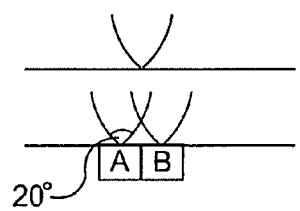

FIG. 12b illustrates another form of ultrasonic based touch screen, in which an acoustic imaging transducer array 1230 is located behind an LCD display screen 1235 having glass cover 1236 is capable of detecting the location of a finger touch 1240 on the front of the screen, 1236. The array 1230 is composed of 100 individual acoustic transducers (individually not shown for clarity,) which are read by signal generator and receiver electronics module 1245 switched to each position in succession by multiplexor 1250. Switching time for 5 Mhz signals from each transducer is about 0.1 seconds, but can be less.

Figure 12C:
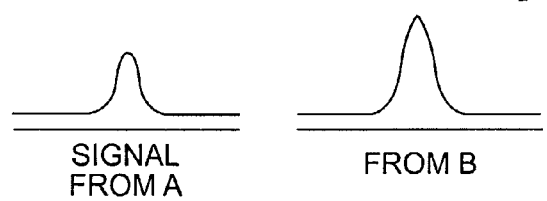

This embodiment can produce an acoustic image of the surface of the screen, which as disclosed above can have ridges on it, or other tactile relations as desired. The finger position and degree of indentation if desired of the glass plate can be determined by computer module 1260 which processes the time of flight of the ultrasonic wave and looks for changes in the norm. Even though the signals from the various layers of the LCD screen are complex, the change in reflected signal due to the finger touch on glass 1236 is clearly discernable, and pinpoints location in xy and distance z. For example in this case shown in FIG. 12c the signal back from transducer A and transducer B is different, with transducer B being stronger, indicating that the finger touch 1240 is closer to B than A. These signals can be calibrated to give a lookup table which allows one to compute the xy location of touch in the computer 1260. Typical beam spreads of the acoustic send and receive modules are 20 degrees.

It should be noted that the xy location is not just limited to resolution of 10×10 where 100 transducers are used, since interpolation between signals of adjacent transducers can be used to isolate the position to at least 4× better in x and y. This gives a 40×40 matrix, sufficient for many touch screen applications in cars.

Ultrasound can also be used in air in such a manner to monitor a screen such as in FIG. 2, illuminated by a projection display for example.

FIG. 13

FIG. 13 illustrates a related embodiment of the invention in which a simple LCD display 1300 is located in the armrest portion 1305 between the two front seats (or optionally between two rear seats). This display may optionally be equipped with touch screen capability.

The display is positioned to be easy for the driver 1328 to use with his right (left in the UK and Japan) hand, and can be seen by him by looking down and to the right. The touch screen or other display may optionally be rotate-able so that the passenger can use it as well. When the display is rotated, the display may be varied to meet applicable safety laws, for example by not presenting graphics or perhaps internet surfing information to the driver while moving.

In a preferred example of an embodiment with many desirable advantages, TV camera 1320 in the roof, for example obtains an image of the touched screen and the finger 1310 touching it (in essence creating a touch screen, by noting the position in the camera computer 1321 of the display as well). This image 1330 is then displayed for the driver on the windshield 1340 of the vehicle in or near his normal line of sight, using a heads up display (HUD) employing holographic or other lens technology known in the art. This provides the driver a very desirable display of what is happening, so to speak on the display/touch screen, along with his vision of the road. Its noted that this approach works wherever the display, touch screen or pad exists—as long as the camera can obtain its image.

For those touch screens or pads capable of outputting the locations of the human finger(s), the display can create these without the camera, by using the image drive circuitry of the touch screen to drive the heads up display as well.

For example FIG. 13B illustrates what a direct image taken with an external camera such as 1320 would look like when projected. The person is touching point a virtual slider 1360 for heat control in this example, which is moved by the driver to position B, from an initial position A. This is something like one sees with ones eyes, when one works a touch screen type display normally—i.e., you see your hand and finger near or at the screen. In either case you can get a much better feel for what you have to do to make a reading register successfully, by watching your finger approach the point in question, and watching the display say change color (if programmed to do so) when you correctly touch it. Alternatively, in other embodiments herein an acoustic signal, or force pulse to your finger can also or alternatively be used to indicate correct contact so to speak. This issue though, is how do you approach the point, with only a glance, at the screen, and without taking your eyes off the road for anything other than an instant.)

This concept is different than conventional touch screens which do not have an auxiliary display (in this case via an HUD, or "heads up" display) displaying not only the results of the touch in a box on a screen, but to actually display the position of ones finger on the screen with the screen information. This is to allow one to "See what one is doing" without taking ones eyes off the road—a new concept in its own right, which could be extrapolated to other tasks in the car—or in other applications such as the home or business as well. Indeed the auxiliary display, could be the only display. The touch screen itself can be of the standard type such as in FIG. 12, or preferably with one or more tactile features as in the invention herein disclosed.

It is noted that because of the unique properties of the heads up display of such touch screen inputs, that one can maintain a conventional instrument cluster ahead of the driver such as in FIG. 1 if desired while still having all the advantages of the touch screens of FIG. 1 and more besides. Data entered from the touch screen can be used to override conventional controls if any which are still present. Or priority can be given to the conventional controls.

Note that to make it easier for the driver, and use up less space on the windshield, one might only display portions of his finger and the slider, not the whole screen image acquired by camera 1320.

FIG. 14

FIG. 14 illustrates another embodiment of my distortion touch screen invention As discussed above A TV or computer display image projector such as a Sharp brand LCD based projector 1401 can be used to project a desired display image on the screen 1403. In this embodiment, distortion of the screen material 1403 (for example a plastic sheet with scattering properties on its front surface 1405) occurs primarily by virtue of the compressible supporting material 1406 that allows the relatively thin sheet member 1403 to locally distort or otherwise be changed under action of a touch, for example by finger 1410.

As shown, the screen member 1403 is separated from rigid Plexiglas backing member 1415 by refractive medium 1406 of thickness t, which is compressed or displaced by the force of finger 1410. Alternatively, the medium 1406 can be a liquid such as oil, glycol, or water, that is compressed or displaced by the finger push (raising the surface elsewhere).

Light 1430 from light source 1431 from the rear passes through backing member 1415 and is reflected off the back surface 1404 of screen member 1405. Desirably, the index of refraction of member 1415 and material 1406 are closely matched such that little refraction occurs, Ideally anti-reflection coatings eliminate most of the reflections from the various surfaces other than that from the back surface 1404 of member 1403 desired.

Light reflected from surface 1404 reflects back toward camera 1435 (after retro reflection by expansive retro reflector 1440 made of scotch light 7615 glass bead material) for example effectively used to determine the distortion of 1403 due to the retro reflective based "D sight" image effect or another optical phenomena such as disclosed in copending reference 1 and 2.

Its noted that the Dsight system operates independently of the projector, and is not affected by its operation. If desired, laser sources instead of a conventional light source 1431 can be used, with appropriate filters on the TV camera to assure function. This holds true of all optical methods such as grid projection that might alternatively be used to determine the change in screen 1403.

It is also noted that in another embodiment, the material of 1403 may itself be in contact with the rigid (relatively at least) member 1415. In this case the material of 1403 should be compressible, and closely matched where possible in its index of refraction to that of 1415. In this case the reflection comes from the front surface of 1403 facing the user. The refractive medium 1406 in this case doesn't exist, or can be considered of t=zero.

Also illustrated in FIG. 14 is the use of a force feedback signal to the users finger in which an acoustic wave in the screen signals to the users finger that an event has occurred It can be pulsed, or of static or varying repetition rate or frequency, or of varying amplitude and is an alternative to providing the user a beep tone for example to indicate that an action has registered.

As the user finger 1410 presses on the screen 1403, a strong acoustic wave 1465 is generated by transducer 1470 in material 1406. The transducer input is triggered by the sensor of what ever type is used in determining the screen has been touched (in the case here, it is signaled by computer 1446 analyzing the image from TV camera 1435 which determines a touch at a given screen coordinate has occurred (and its magnitude if desired. This then is compared to the screen projection data, to determine what the touch has registered, if anything When some sort of registration data is desired, The acoustic wave is generated and impacts finger 1410 which then feels the event. The degree of touching in the z or force direction can be used to control the amplitude or the frequency of the acoustic wave 1465 and thus signal to the user the degree of z actuation.

It should be noted that the finger 1410 by pressing in on the pliable screen outer surface 1405, undergoes resistance from sidewalls 1411 and 1412 for example of the indent, which opposes movement from side to side (and similarly, up and down), but does not inhibit it. This resistance can be helpful in tactilely determining a direction of movement. It can also be actually increased or enhanced in some manner by using an acoustic source to provide a pulse or other signal to the finger in proportion to movement or direction, generated in the medium 1406 by acoustic wave sources such as 1470

A useful display with such as screen is when the display is caused to "jump" to the point touched, using that point as a new reference for the displayed data (eg a heat control bar). This is discussed relative to figures below

FIG. 15

Figure 15:
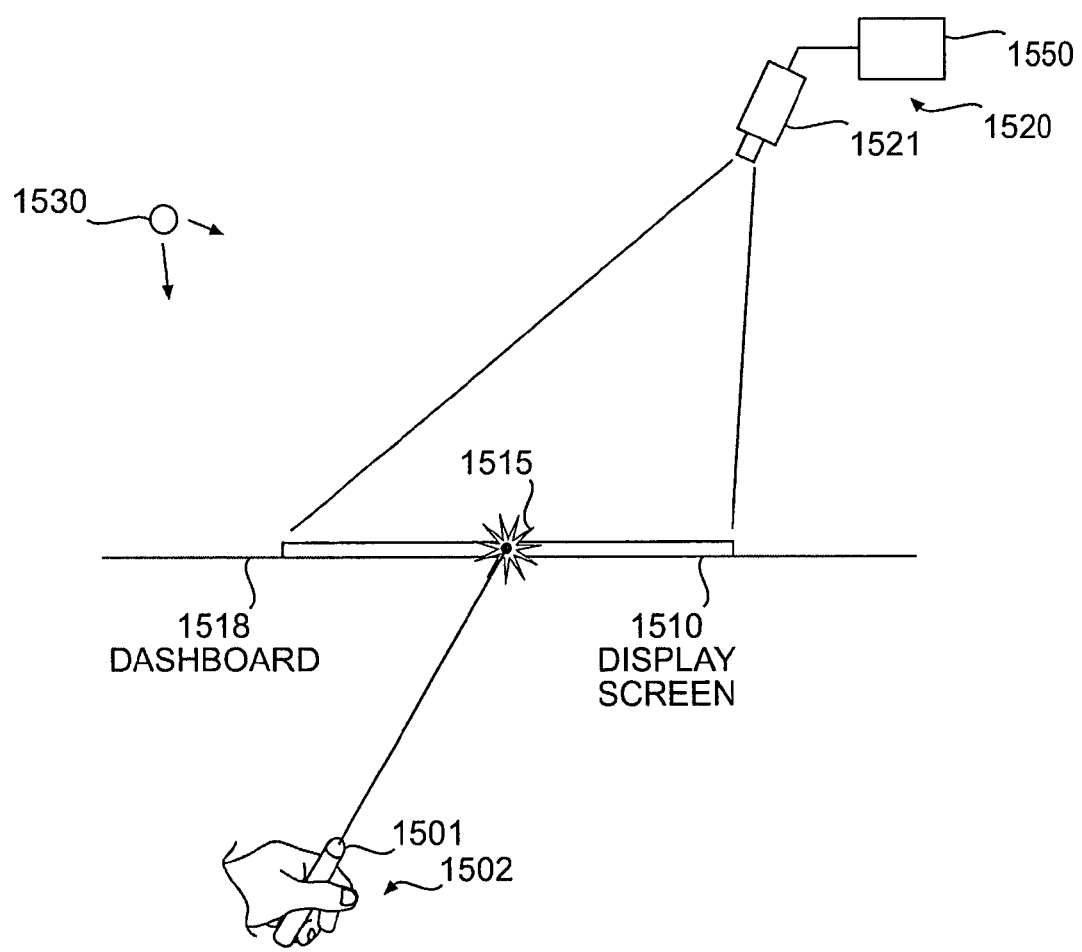
FIG. 15 illustrates a display screen responsive to a laser pointer or like device used by driver or passengers to input data.

The TV camera based rear projection touch screens and other user signal detecting aspects of the invention allow one to use a laser pointer indication on the screen as well for control, entertainment or other purposes. FIG. 15 illustrates a method according to the invention using a laser pointer 1501 which is aimed by user 1502 at the touch screen 1510 on the cars dashboard 1518 producing spot 1515 or other indication. This signal on the backside is visible to TV camera 1520 which may be desirably equipped with a band pass interference filter known in the art centered on the laser pointer wavelength (e.g. 670 nm), 1521, to increase signal to noise. This can be easily combined with the same camera sensing touch distortion, if the light illuminating the screen for this purpose 1530 is also from a laser or other source of the same wavelength (assuming the filter is used). Use of lasers helps in high sunlight environments in the car, but is not necessary for operation in general.

Computer 1550 processes the image from camera 1520 to determine the x, y location of the spot 1515 on the screen and any other data such the spot shape or coded signature, etc, as disclosed in my copending application Ser. No. 09/568,554 incorporated by reference

FIG. 16

Figure 16:
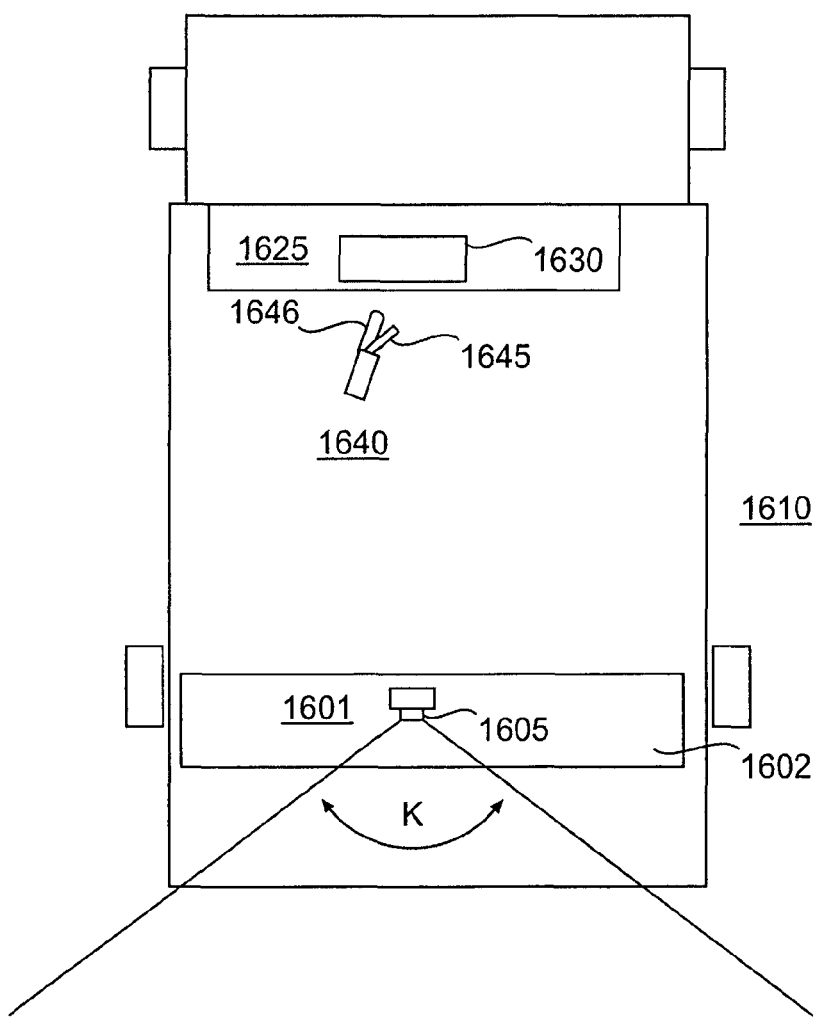
FIG. 16 illustrates an embodiment of the invention having external cameras and cameras to sense the orientation of a drivers head

FIG. 16 illustrates further camera based embodiments of the invention, several of which are discussed as well in other forms in the copending referenced applications above.

For example, these applications and previously granted patents by the inventor such as U.S. Pat. No. 5,982,352 have discussed the use of cameras either single, or stereo pairs and the like to view persons to determine positions and motions of their extremities or objects held by the person. When data is determined from such activity to be of concern for example, alarms can be provided (if out of position occupants are determined say), or to signal Onstar (GMs name for a navigational and help aid).

As pointed out previously, such camera inputs (eg from camera 701) as to rotational position of a head such as 710, can cue the appropriate screen display to moves as head moves—not just for viewpoint changes, but to help the person view the display (for example if one is looking a bit to the side, the critical data on the instrument cluster ahead of the driver can be shifted slightly sideways.) In addition, as pointed out before, if one moves one head, this could cause the display to change function, or if rear view images were presented on the display (from rear facing cameras for example), the display 1600 could change views of the cameras.

For example, with cameras having large numbers of camera pixels at low cost, a single camera with for example 2000×2000 pixels such as 1601 looking rearward from above the rear window 1602 as shown, may be above to cover with a suitable wide angle lens 1605, the total angular field of interest "K" behind the vehicle 1610. However what is displayed on a screen on the dash 1625, for example in zone 1630 allotted for the rear view camera image, might be only a fraction of the field (ie only a fraction of the pixels displayed at once corresponding to an angular region less than K)—and this swept, by simply turning ones head (just as one does when one looks in the rear view mirror)

To aid camera viewing of the human, it is often desirable to have retro reflective or other discernable marks rather than arbitrary human features. For example, glove 1640 with targeted finger tip 1645 and thumb 1646.

As taught in the copending applications referenced, similar cameras can also be used to inexpensively see objects which the human moves for signaling purposes or to cue the control system, for example as to like switch positions, or heater vent locations, or stalk positions etc. For example one could have interchangeable dash overlays, not only for certain screen functions or markings, but also sliders, raised or other wise which could be optically sensed by TV cameras, for example with the camera 701 of FIG. 7 located in the headliner.

It should be noted that where features on the human can be discerned by the computer and camera system, that such features themselves can provide the input. This too can include the fingers and hands, etc. Such features can also be watched for safety purposes, to assure a door isn't slammed on a child's hand for example.

Also pointed out in copending references, objects in the car can also be viewed by cameras, or themselves have cameras, and communicate with other things in the car like fax machines, phones and the like.

The system can aid recognition of the drivers face, hands, eyes etc. for theft security or other purposes. The art is full of such things these days (See for example Suzuki U.S. Pat. No. 5,859,921 Apparatus for processing an image of a face). Such devices can also observe the state of the driver, to determine driver attentiveness and ability to drive. Note too however, that such may be further augmented using the invention, by having a keyboard for example screen presentation, in which certain commands have to be typed in order to start the car—these could assist in determining the drivers state or authenticity (via codes typed in).

A camera of the system can also recognize shape of face, and particularly the pointing direction of the eyes, in order to rotate a presented view on the screen, for example a rear view obtained with exterior mounted cameras (see for example U.S. Pat. No. 5,949,331 by Schofield, et al.), or a night vision view out the front using IR cameras or scanning microwave equipment. Indeed such views, when sensed by the car display and actuation system of the invention to be needed or called on by the driver input can be presented on the display 1405 of dash along with the minimum amount of normal data (speed etc) needed, for example as expressed by a digital speed indication.

In one embodiment, discussed above, when the user is seen by a camera such as 701 and associated image processing computer to be looking in a rearward direction, for example by turning ones head slightly, the dash instrumentation may be programmed to immediately convert to a mode where the rear display is presented as shown on the dash.

FIG. 17

The disclosed camera based object position sensing and control system of the co-pending applications incorporated by reference can be used to turn any part of a car into a control mechanism without wires or levers etc. Detected can be common parts of the car in any position where a conveniently mounted camera(s) can get a reliable view—vent positions, turn signal indicators, shift levers, knobs, buttons, ashtrays foot pedals, etc. Isn't just the point you actuate. Its also a point you move to a new position. For example if you move a vent to a new angular position. Knobs, window and lock switches, etc. seat positions, all can be camera sensed. Thus such controls can be inexpensive, as there is nothing that need connect to them, as all transduction is non contact—and there is an economy of scale of multiple things in field of view of the camera(s).

For example. Consider overlay 1700 on flat panel display screen 1708. The overlay contains knob 1710 with pointer 1715 As shown in FIGS. 1 and 2, such an overlay on the screen can be read from the rear or projection side (if a projection display is used). But alternatively an overlay can be constructed to have a pointer or other marker on the front of the knob as shown, for observation in a front viewing mode.

For operation in a front viewing mode as shown, the persons hand (not shown for clarity) moving the knob, slider or other control can get in the way of the camera, 1720 used to see the knob and its pointer location at least for some camera and person positions. For this reason it is desirable that a certainly latency be acceptable. For example, if one moves the heater slider to a new position hotter than the last, it is generally alright to have the sensing of the new slider position be performed after the hand is retracted (and thus not obscuring the view). This can be sensed by the camera 1720 and its computer system 1740, as a situation where a standard view or "image signature" of the slider 1750 (or other object to be sensed) is present and not blocked.

For example if in the field of view of the camera, the slider mark 1765 occupied an area of 12 dark pixels in the processed camera image 1760 surrounded by bright ones (which could be the case if it was a dark mark on an overlay on a backlit touch screen), and such a situation wasn't seen, then no action would be taken until the situation once again appeared. At that time the new position of the centroid say, of the 12 pixels would be compared either to the absolute position of the dash, or to the previous position of the slider, and appropriate action taken. (this same logic also works for rear viewing as in other embodiments above, where the problem is not necessarily obscuration, but noise from projected image variations in an instant image situation)

The processed image of the knob pointer 1770 is shown as well.

Most controls in a car today fit this scenario. Only some things like adjusting something in real time to "get it right" with no other cues would require constant monitoring of control position.

FIG. 18

Figure 18:
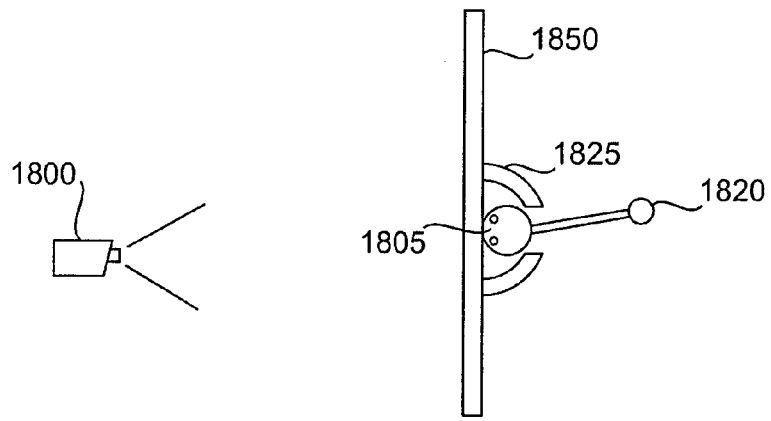
FIG. 18 illustrates a ball joint or gimbaled physical selection or adjustment means in which position and orientation of the handle input is determined optically using for example a four point target set.

FIG. 18 illustrates a ball joint or gimbaled physical selection or adjustment means in which position and orientation of the handle input is determined optically using for example TV Camera 1800 to view a four point target set 1805 (two targets shown for clarity) on ball member 1810 secured in ball joint clamp 1825 Joystick 1820 is attached to member 1810.

Using the invention of Pinkney et al, U.S. Pat. No. 4,219, 847, or the devices of the El-Hakim reference, 6 axes of position and orientation of the member 1810 can be determined using program in computer 1830 connected to the TV camera. This axes data can then be used by computer 1830 to determine a control function desired (e.g. mirror rotation) and an appropriate display or voice or other response if desired. The camera used in this case, can if desired be the same one used to see knob positions, if such is used.

Of considerable interest however is that this system can be mounted right to the dash, even to the display screen 1850 itself, as shown. In this case data selected by any of the up to 6 degrees of motion inputted by the user, can be displayed right next to the joystick by control of the display means such as a computer controlled projector projecting data on the display screen If the ball joint is sufficiently tight, the joystick will stay where it is positioned. Alternatively it can be spring loaded to return to home center position, for example. Or it may be affixed with force feedback capability known in the art (eg from Immersion corporation) to provide a haptic response to the user as well, indicative of actions taken, or data to be fed back as a result thereof.

Note that such a physical selection joystick device can also be built in the form of a palm resting ball or other. And such devices can be used as game controllers—in the car or home, for example

FIG. 19

The invention can be used in the home or work, besides in the car, as was previously disclosed as well. For example either the on axis or off axis version (FIG. 2) of the projection device can be used, the off axis being more complex, but able to occupy a bit different space (realizing the on axis version can be used with mirrors to make it taller rather than deeper, just as projection home TVs are today. Since the display surface, if build of the surface distortion type, can be chosen from different materials, one could use it as a home black board or cork board, putting family notes on, keeping records, drawing pictures or diagrams, etc.

The advent of high definition projection sources, and large computer memories at low cost, allows one to project images of fine detail from a variety of sources. This HDTV type of image capability, in turn makes it practical to get close to a large screen projection, which here to fore has been too crude (pixilated) to view at close range. At this point the projection TV becomes essentially possessing the detail of a fine photograph, or drawing.

Clearly this is useful on the car dash. But interesting too is in the home where such resolution makes it possible to display pictures scenes and the like, still or moving, in the sense of interior decoration.

Shown here is an All Purpose touch screen display for the home, incorporating controls for heating and lighting and appliance systems plus entertainment and internet features, plus interior decorating and other features.

As shown a large screen HDTV (High definition television) capable display 1900 is on wall 1901. It is constructed in this case using a projection micro-display, in a manner similar to the figures above. For the moment, it is shown with the display on axis, but it could be off axis like FIG. 3 as well, which could help in some cases to make the display less deep. As can be appreciated from the above disclosure, this display could at one time display beautiful pictures, say of a scene from Venice in the 1700's (static, or moving) to decorate a Venetian décor living room for example, while at the next moment provide a touch screen to act as home control center, for various functions such as heating, air conditioning, lighting, burglar alarms, appliances, and any and all other desired home functions.

Then at the next moment, it could be used for entertainment (e.g. DVD discs, TV entertainment) or to communicate with the internet. Even images for the interior decoration can be downloaded from the internet. For example if one wanted to have a Venetian masquerade party, one could download from of the internet Carnevale pictures of a real party of that type in a Venetian setting, which could be sequentially played during the guests visit.

In addition, one could use it to write on, for example notes to other family members could be entered directly just as one might do today with a blackboard in the kitchen. The written images, could be transmitted as well to other locations in the home, or to family members in the field.

The screen can also be used for games, as has been discussed at length in other copending applications. Camera 1920, or stereo Camera pair 1921 and 1925 located near the display can be used to sense inputs from humans or objects in the room.

If the display were large sized, covering a good portion of a wall, what would be the effect? The use of such displays was discussed at length in the referenced Co-pending applications, for CAD Systems, Games, Education, and the like. Of particular interest is Life sized displays to give a "natural" feel to the data displayed. People, if life size displayed, become "Guests" in ones house, so to speak. One can in a natural manner use ones hands to wave at them (sensed by cameras of the invention too). And one can use the computer and screen to provide to the people in the home life sized digital images of themselves in various clothes they might wish to buy over the internet for example. And they can modify those images using a computer, to suit how they feel they might look under different weight reduction or enhancing regimens for example. Such digital data as to their initial shape can be obtained using laser triangulation techniques disclosed by the inventor and his colleagues as mentioned in U.S. Pat. Nos. 5,362,970 5,880,459, 5,877,491, 5,734,172, 5,670,787 and others.

It isn't just the home where such a combination control and image entertainment function could be of use. Ones office is another example where the room functions, and pleasing décor, and perhaps ones own computer functions can all be combined. A desk of this type in the context of a CAD terminal is shown in co-pending application U.S. Ser. No. 09/435,854. In this case too, one can write on the screen for presentation purposes, or to transmit such data to others via a network for example. One can display pictures or drawings, and alter them and transmit or store the altered data as well. Such a display screen in a home or office, could become the main focal point for activity, since it allows all functions of a computer to be used, (and could have a plug in keyboard or mouse if desired), as well as entertainment and the like.

The life size aspect of such a potential screen in a business context may relate most to dealing with objects that ones business is comprised of. For example in t he context of car parts, the thing has a real dimension.

But the real benefit is dealing with people, who can be portrayed actual size. Or in dealing with things people use or interact with, which can also be of real size relative to the people in question A good example is the "Digital You" "mirror" of the fashion related co-pending application, in which the touch screen—or even just plain display screen, is in the form of a full length fashion mirror for clothes trying. you can also have a perfect ballerina model, executing a perfect digital move of a particular ballet step It is also possible to present to a user, a life size surrogate person for interaction, in this case in the context of clothes design where one tries different designs on a digital person, and touches them just as described in the copending application—in this case however, not to alter the garment, but to actually change its original design dimensions. And not necessarily fit related, put perhaps style related.

FIG. 20

Figure 17:
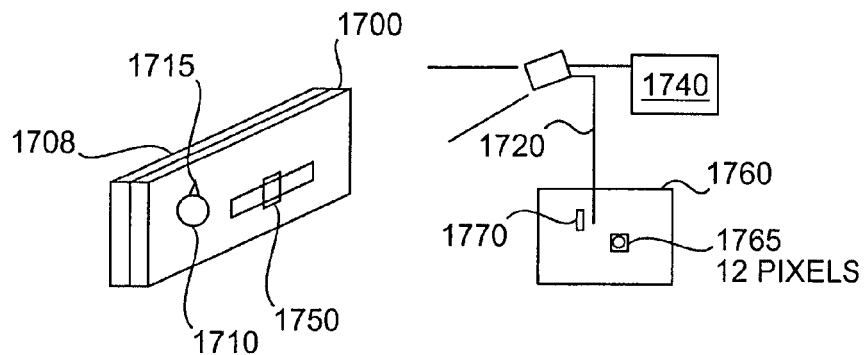
FIG. 17 illustrates a front sensed switch overlay for conventional or other touch screens.
Figure 20:
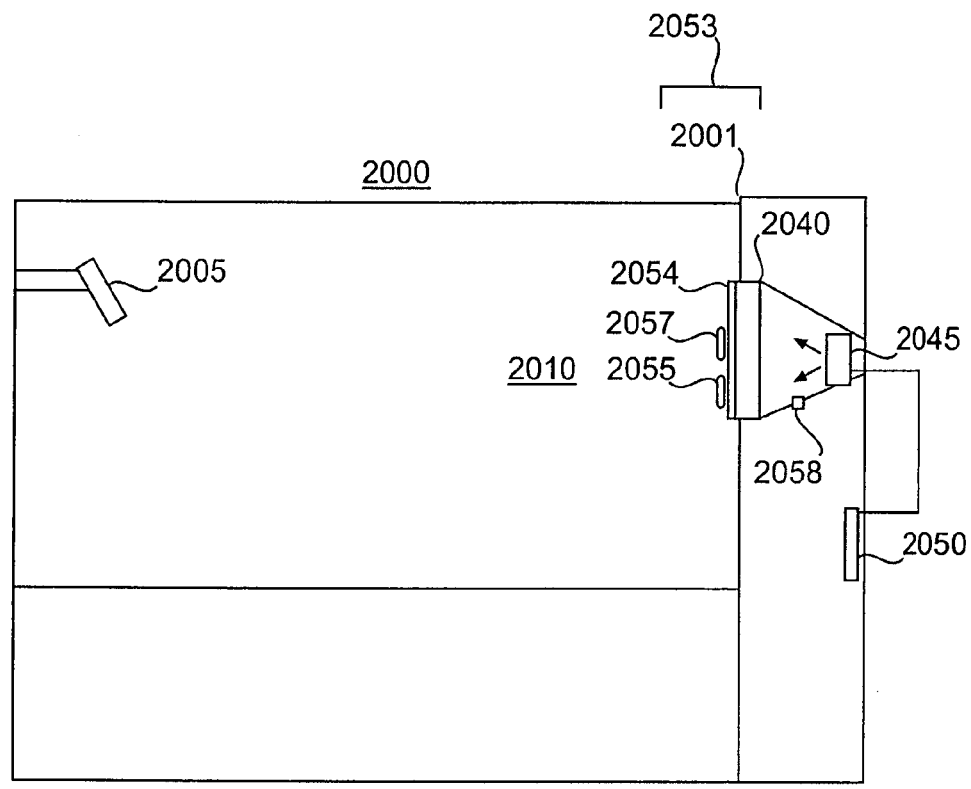
FIG. 20 illustrates an application for difficult environments, such as a home shower bath
Figure 20:
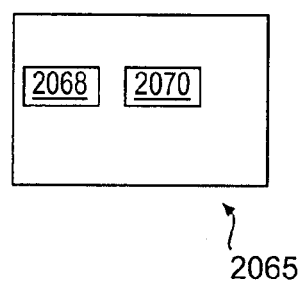

FIG. 20 illustrates another advantage of the invention, namely the ability to locate the touch screen in areas of high electrical problem or contamination. In this case, it is in a shower bath 2000, where located at end 2001 of the shower opposite the shower head 2005 is a touch screen 2010 of the invention, located in the wall of the shower. In this case the unit is used to allow the user to access the internet and all desired audio visual sources while in the shower, but at the same time by selection of a different screen it can control the functions in the home as described in FIG. 17, to include the plumbing, and the various features (heat, pressure, pulsation, etc) of the shower itself.

The touch screen can operate at low voltage but of interest is that the total electrical part of the screen can be shielded easily from the using part attached to the shower. For example consider rubber gasket material 2040 which isolates the electrical components such as projection section 2045, computer control section 2050 from screen input section 2053—in this example a direct camera view 2058 of a screen face 2054 having sliding input or in this case rotating knob 2055, and rotating knob 2057 viewed from the rear as disclosed in FIG. 2/3 above).

For point of illustration, a completely different screen face 2065 having other knobs and input devices such as pushbutton 2068 and 2070 respectively, can be interchanged with the screen face 2054 as desired by the user. In one preferred embodiment, the user may reprogram the system to have these physical functions represent what ever variables he wishes.

FIG. 21

FIG. 21 illustrates an additional embodiment of the invention directed at optically sensed actuation of screens, even by pointing at them. Direct detection by one or more TV cameras of the pointing vector of ones finger (or other object) has been discussed in co-pending applications. A laser pointer application has been described above and in co-pending applications as well. However in this case, ones finger is viewed through the screen of a projection display, which for the moment in a car application is assumed to be in a location not requiring an airbag application though the screen (which however could be affected by angling the camera and sensing system here disclosed as in FIG. 3, so as to be out of the way of the airbag deployment.

Figure 21A:
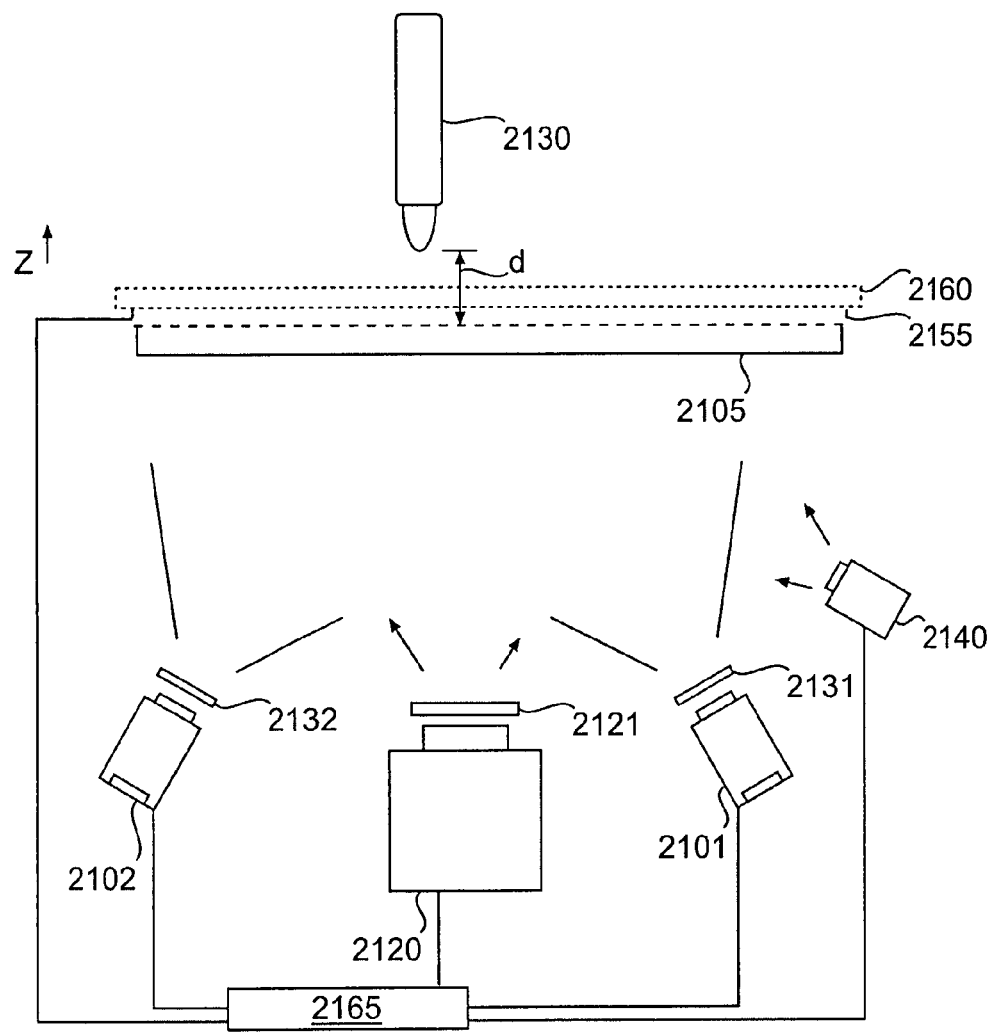
FIG. 21a illustrates another screen input embodiment, using cameras sensing humans or objects through the projection screen of the invention

In this example, let us assume that a stereo pair of cameras 2101 and 2102 is located as shown in FIG. 21*a*, which conveniently is outside the deployment path of the airbag, if present. If the screen 2105 was perfectly transparent, this would be the same arrangement shown in the numerous examples for computer inputs using human features and objects shown in my co-pending applications, where the cameras are looking directly at the user. However. what if the screen is diffuse, as it would have to be to some degree for use in conjunction with image projector 2120, in order that viewers could see the information displayed on the screen?

For objects such as finger 2130 located a distance "d" from the screen 2105 as shown, I have found that it is possible to obtain useful x, y, and in some cases, z (depth direction) informational data concerning the finger or other object such as a pen tip, even if the screen is diffuse, which is a novel result of the invention (discussed also in FIG. 11). It is noted that an IR LED or LED Array, operating at for example a wavelength of 0.9 um, 2140 can be used to illuminate the users finger or other object through the screen. If desired, band pass filters 2131 and 2132 passing the 0.9 um radiation can filter light reaching the cameras 2101 and 2102 so as to substantially block light from the projector source (which also could include a beam blocking filter 2121 at the same wavelength, or even more preferably, to block all IR outside the visible region from the projector lamp (thus reducing heat on the screen and remaining portions of the device).

Alternatively, in another useful arrangement, the screen 2105 illuminated by projector 2120, is preferentially scattering at each elemental point on the screen in the lateral, or "x", direction across the vehicle (or across a room in the FIG. 20 case), but less diffuse if at all in the vertical direction (out of the plane of the drawing). This is the case if a lectilinear screen with vertical diffusing lines is used for example.

If in this case, the stereo pair of cameras 2101 and 2102 are spaced with their baseline in the vertical direction out of the plane of the drawing, then they have an substantially unmodified view of the object situation in that direction, and accurate Z locations can be determined (and y data as well—though x data is modified by the screen effects).

Another variation utilizes a screen 2105 equipped with a Digilens Company or other type switch able device 2155 (dotted lines) to control the holographic diffuser 2160 (dotted lines). On command of computer 2165, the diffuser switch and the projector 2120 are switched off, and the cameras 2101 and 2102 look directly through a now transparent screen at the user (typically hands or fingers or head), 2130. If the switching occurs every 1/60 sec or so, flicker of the image to the eye is minimal. The cameras output is analyzed by image processing program computer 2165 to obtain a stereo image of the edges of the object such as users finger head, or the like and the output made accordingly to control the functions of the vehicle and of the display as desired

FIG. 22

The above control aspects can in some forms be used in a car as well even with a small display, or in some cases without the display.

Figure 22:
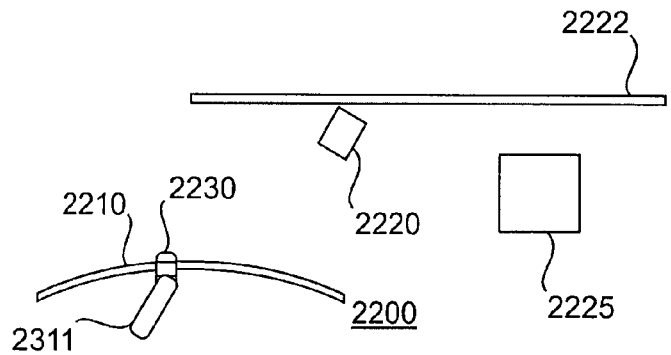
FIG. 22 illustrates further camera sensed controls of the invention

For example, consider car steering wheel rim 2200 in FIG. 22. In particular, consider hinged targeted switch 2210 (likely in a cluster of several switches) on or near the top of the wheel, when the car is pointed straight ahead, and actuated by the thumb of the driver 2211. A camera 2220 located in the headliner 2222, and read out by microcomputer 2225 senses representative target 2230 on switch 2210, when the switch is moved to a up position exposing the target to the camera. (or one could cover the target with ones fingers, and when you take a finger off, it is exposed, or conversely one can cover the target to actuate the action).

The camera senses that target 2210 is desired to be signaled and accordingly computer 2225 assures this function, such as turning on the radio. As long as the switch stays in the position, the radio is on. However other forms of control can be used where the switch and target snap back to an original position, and the next actuation, turns the radio off. And too, the time the switch is actuated can indicate a function, such as increasing the volume of the radio until one lets off the switch, and the target is sensed to have swung back to its original position and the increase in volume thus terminated.

In operating the invention in this manner, one can see position, velocity, orientation, excursion, or any other attribute of actuation desired. Because of the very low cost involved in incremental additions of functions, all kinds of things not normally sensed can be. For example the position of a datum on a plastic air outlet 2241 in the dashboard of FIG. 1*c* can be sensed, indicative of the direction of airflow. The computer can combine this with other data concerning driver or passenger wishes, other outlets, air temperature and the like, to perfect control of the ambiance of the car interior.

It is also noted that the same TV camera used to sense switch positions, wheel position, duct position, seat position head rest position and a variety of other aspects of physical positions or motions of both the car controls and the driver or passengers. And it can do this without wires or other complicating devices such as rotary encoders which otherwise add to the service complexity and cost.

When the camera is located as shown, it can also see other things of interest on the dashboard—and indeed the human driver himself, for example his head. This latter aspect has significance in that it can be used to determine numerous aspects The identity of the driver. For example, if a certain band of height isn't reached, such as point P on the drivers head, the ignition can be interlocked. Much simpler than face recognition, but effective if properly interlocked to prevent repeated retries in a short time period.

The position of the head of the driver in case of an accident. As detailed in reference 4, a camera or cameras can be used to determine head location, and indeed location of the upper torso if the field of view is large enough. This information can be used to control airbag deployment, or head rest position prior to or during an accident (noting too that headrest position can also be monitored without adding any hardware). Particularly of interest is that the pixel addressing camera of the invention can have the frequency response to be useful in a crash, sensing the movement of the person (particularly severe if unrestrained) within a millisecond or two, and providing a measure of the position for airbag deployment. Additional cameras may also be used to aid the determination.

Using a pixel addressing camera for camera 2220 confers additional advantages. For example consider the image of the car interior In the first instance one can confine the window of view of a certain group of pixels of camera to be only in the region of the steering wheel. This allows much faster readout of the more limited number of pixels, and thus of the steering wheel switches, at the expense of not seeing anywhere else in that particular reading. But this may be desirable in some cases, since it may only be required to scan for heater controls or seat positions, every 10 seconds say, while scanning for other more immediate items a hundred times per second or more. A good example are safety related functions. 5 per second might suffice for seeing where the turn signal or windshield washer control was, as an example.

Scans in certain areas of the image can also depend on information obtained. For example one may initiate a scan of a control position, based on the increasing—or decreasing—frequency of an event occurrence. For example if the persons head is in a different location for a significant number of scans made at 15 second intervals for example, then in case of a crash, this data could be considered unreliable. Thus the camera window corresponding to pixels in the zone of the head could be scanned more frequently henceforward, either until the car stopped, or until such action settled down for example. Such action is often the case of a person listening to rock music, for example.

Similarly, if someone is detected operating the heater controls, a scan of predominately heater function controls and related zones like air outlets can be initiated. Thus while normal polling of heater controls might be every 2 seconds say, once action is detected, polling can increase in the window(s) in question to 40 times per second for example.

Scans in certain areas of the image can also depend on information obtained in other areas of scan, or be initiated by other control actions or by voice. For example, if hard deacceleration was detected by an accelerometer, but before a crash occurred, the camera could immediately be commanded to begin scanning as fast as possible in the region of the image occupied by the driver and/or any other humans in its field of view. This would be for the purpose of monitoring movements in a crash, if a crash came, in order to deploy an airbag for example.

While illustrated on the steering wheel where it is readily at hand, it can be appreciated that the position of switch or indication devices for the purpose at hand could be elsewhere than the wheel, for example on a stalk or on a piece of the dash, or other interior component—indeed wherever a camera of the invention can view them without excessive obscuration by persons or things in the car. It need not be on a car either, controls of this type can be in the home or elsewhere. Indeed a viewable control datum can even be on a portable component such as ones key chain, phone, or article of clothing apparel, or whatever. Similarly the camera 2220 can view these items for other purposes as well.

They teach ability of the invention is achieved by showing the camera the code marker in question (e.g. a short bar located on the wheel), and in the computer recording this data along with what it is supposed to signify as a control function—for example, turn rear wiper on to first setting. This added functionality of being easily changed after manufacture is an important advantage in some cases, as for example, today after-market addition of wired in accessories is difficult.

FIG. 23

FIG. 23 illustrates a keyboard embodiment of the invention, in this case in the car touch screen, but certainly not limited to car applications.

Taking the embodiments such as FIG. 5 above one step further, suppose all keys were just circular depression type indents in a transparent piece—either the screen such as depicted here as screen surface 2200 (itself for example similar in function to screen 1403 of the invention), or an overlay thereon, such as member 2201 dotted lines. One could have all of the keys of the QWERTY Keyboard for example, represented as indents such as indent 2205 having projected on it the letter "Q" (Alternatively the letter could be just projected on the screen using the display alone, with no tactile feel). Despite the number of keys, the effect on other images presented on the screen (such as a graphical map of a navigational strategy to reach a location in t he car, for example) would not be unduly affected, as the screen typically has a surface finish which scatters light from its outer surface (plus directs it in the case of the prismatic or lectilinear screen Clearly the goal is to provide, on the dash, or other interior portion of the vehicle such as an arm rest, a keyboard not unlike those familiar today. This can be used for all the computer input functions known in the art. But it can also be used for different things as well. For example with one or more fingers at once or in succession, one can make a heater do something (Multi-finger at once capability is the key advantage of the distortion based screen, not shared with many other touch screen/pad technologies). One other example is that if a QUERTY keyboard with 40 indents, say, was used, a separate illumination of the indents might show up heater and air conditioning choices.

For example, consider again screen 2200 which has numerous indents, only 6 of which are shown for clarity, 2205-2210. One moment the keyboard letters of the QWERTY keyboard can be projected as discussed above, but the next moment on command as needed, shown here in the representative case, the projected numbers are 1, 2, 3, 4, 5, corresponding to 5 heater blower speeds.

The command to change projections, and thus the screen characters and their meaning for touch action can be made for example, either by touch of some change area of the screen, or by voice, using voice recognition to bring up the new screen. Alternatively as discussed elsewhere in this application, for a keyboard is in a car, a camera located in the dash or headliner, for example, can image and using suitable image processing and interpretation algorithms, determine the position or velocity of a persons hand, finger or head for example to get such a switch command, or at a more complex gesture (movement sequence of the person).

Note that the screen surface, or an overlay thereon, can be changed to create different indented or raised styles to suit different user needs. These could be specified when ordering from the factory, or dealer installed, or even user interchangeable. They can also incorporate customized printed on writing or designs, or contains specially added features, such as more knobs, or bigger knobs or keys (for elderly drivers, say). Similarly, the projected images could be bigger too.

It should be noted that the device shown in FIG. 14 provides useful tactile feel in such a keyboard touch screen system. The transparent medium displaced, creates a force resisting the action of the finger. This force can be increased by use of a pressurizing device, which device can be on all the time, or which may be actuated when the action of the finger on the screen is sensed by the camera or other sensing device used to sense touch on the screen.

In a similar vein, it is noted that rather than create a local slope on a flat screen, one can use the invention in a method by which slope is reduced or removed to provide the indication desired. (in which case, the surface of the screen is flattened out so to speak). For example consider FIG. 22b which shows a touch screen having a transparent medium 2240 pressing (in this case upward) against a transparent overlay 2245—urged by the pressure of liquid 2250 pressurized between transparent rear member 2255. In this case the finger locations are round bumps such as 2260, which are touched and pressed down against the action of the pressure by for example finger tip 2265.

Touch screens with high resolution and other useful functions are now described.

FIG. 24

FIG. 24 is an touch screen improvement whereby touch designation precision of small displayed features is assisted by use of two fingers and/or demagnified cursor movement controlled by ones finger movement The pros and cons of various types of conventional computer inputs (mice, trackballs, touch screens etc) are well known. Touch screens are touted as superior and more naturally intuitive, as you can point right at the thing desired, such as an icon, word or whatever.

However, in prior art touch screens, spatial resolution (in xy on the screen face) is often limited due to touch screen resolution, but more importantly, finger size and other finger characteristics, such as force, capacitance, impedance or the like. Even in my distortion based touch screen inventions, resolution is difficult to attain if the screen doesn't significantly distort or undergo stress upon a given force of touch.

So while touch screens are great for input, unless one uses big characters (which are natural human wise in size only on a proportionately big screen), there is a lack of spatial resolution due to the size of your finger, which limits the size of displayed object which can be touched accurately. Thus in touch screens you see in Kiosks, for example, you touch a box, or a big icon—but you seldom are asked to touch to select a letter in a word, as you might do with a mouse and screen pointer.

To improve spatial resolution, now disclosed is a significant improvement on my touch screen invention, and to at least some forms of conventional touch screens. Importantly, it solves the problem of designation of small displayed data items such as letter or characters using "large" fingers operating a touch screen. And it thus allows a touch screen to become an excellent generalized computer input.

There are several manifestations to this. The first concerns use of a touch local to the point desired to "steer" a displayed screen cursor to the point, in a de-magnified manner in which a large finger movement causes a smaller cursor movement—often much smaller, e.g. 1:5. Said another way, I can first put my finger on the screen local to the letter say at a point at which a cursor is then displayed near my finger. I then can move my finger around at the point of touch to aim the cursor at the letter.

Figure 24A:
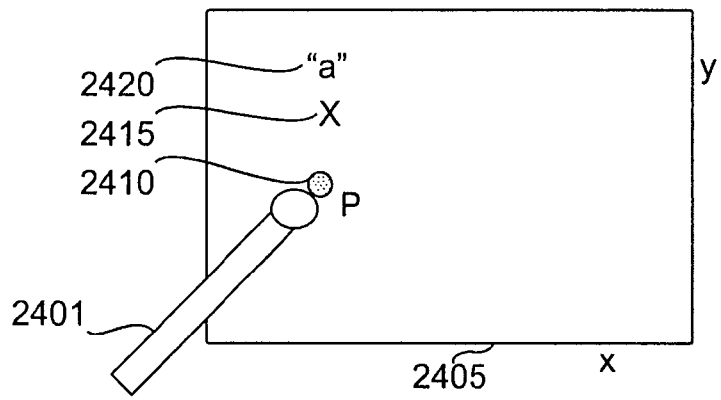
FIGS. 24a-24b are touch screen improvements whereby touch designation precision of small displayed features is assisted by use of two fingers and for demagnified cursor movement controlled by ones finger movement.

For example, as shown in FIG. 24a, a persons finger 2401 touches touch screen 2405 at point 2410 near in both x and y, and perhaps an inch away from a letter "a" that it is desired to designate (typically the letter is in a word which is part of a sentence, none of which is shown for clarity). The letter is typically smaller than the persons finger. At this point one of several alternatives may be executed.

In a first alternative, a cursor 2415 (in this case an X shaped cursor) is caused to appear under control of the display control computer on the screen 2405 a distance of lets say ½ inch above the finger point of touch 2410. (Using known programming techniques which vary the vertical deflection of the screen raster, this amount can be user set, if other amounts are more preferable). A demagnification of movement can be employed, if desired, in sensing and cursor display system such that the cursor moves slowly either laterally or rotationally toward the letter "a" 2420 desired to be indicated for a given touch movement. In this case you would touch somewhat farther away, and "inch" toward the point desired. As the persons finger moves to point P', the cursor has inched upward and over to the letter "a". to illustrate, a movement of the finger on the screen of 0.5 inch in x to the right, would for example move the cursor only 0.1 inch (a 5:1 demagnification of movement, making it easier to move the cursor in small amounts needed to more precisely designate small items or precise points displayed.

Figure 24B:
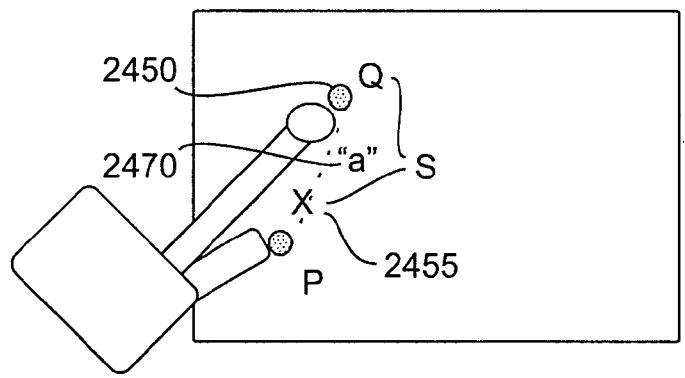

Shown in FIG. 24b is a second example, usable on those touch screens capable of input with two fingers. In this case thumb 2441 touches the screen, causing the cursor to be established at point P as before. But in this case finger 2450 touches the screen as well at point "Q", and by moving the finger around the thumb point of touch, the cursor is caused to rotate around point p. And by moving finger 2450 radially toward or away the thumb, the cursor 2455 is caused to extend toward the letter a as desired (the first point of cursor location having been determined for example, by the initial spacing "S" between the thumb and forefinger on the screen).

It is also possible as shown that the finger 2450 and thumb 2441 can also be used to bracket the desired point "a" to be designated, with then a movement of the finger relative to the thumb can cause the cursor 2455 to move along the line 2470 between thumb and finger. When the cursor hits the desired point, one stops the finger motion. For a screen which can accept z inputs, one then just can push in with the thumb or finger in order to register the selection. Other wise one could use a voice command or hit a key or whatever.

Finally, the radically different touch vector approach of FIG. 29 can also be used for this purpose, but no other touch screens than my own are known to be able to operate in this fashion.

FIG. 25

To recap, shown in FIG. 24 above are at least the following ways to interact with a touch screen.

Figure 25:
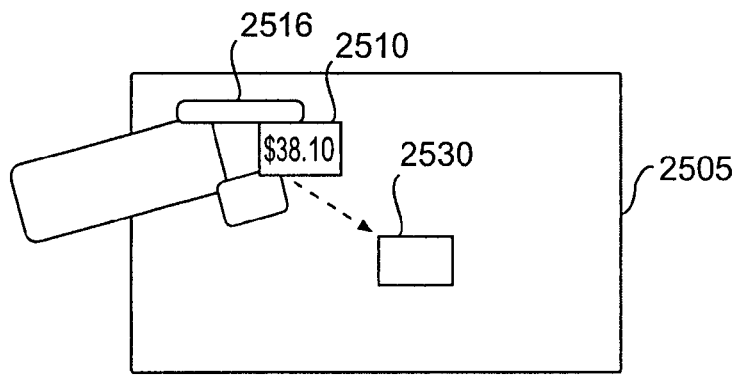
FIG. 25 illustrates further embodiments of the "touch mouse" of FIG. 24 using a pinching or other action—in this case with respect to information in a spreadsheet cell or a word document word or letter.

Touch at one point and move—see change in local position from starting point, or possibly distance from absolute start Touch with two fingers. Move one relative to other—linear or rotationally FIG. 25 now illustrates further embodiments of the "touch mouse" of FIG. 24 using a pinching or other action—in this case with respect to information in a spreadsheet cell or a word document word or letter.

As shown displayed on a screen 2505, is a cell 2510 of the many cells of an "Excel" or other spreadsheet. A user, with a quick move can go right to the cell of interest and with his thumb 2515 and forefinger 2516, "pinch" the data in the cell 2510, in this case the dollar amount $38.10. The pinching action, for example can be programmed to cause the Excel program, to "cut" the data in the cell, for "pasting" elsewhere. The user can then move it, by sliding it on the screen while pinching it, to empty cell 2530. When movement stops and the fingers un-pinch the program in this case would paste the data there. This move is totally natural, just as one would pinch any small object and move it to somewhere else and deposit it. This is considerably faster than using a mouse or touch pad, which needs to incrementally move a cursor across the sheet, highlight the item, and then drag it and drop it in the cell

FIG. 26

Figure 26:
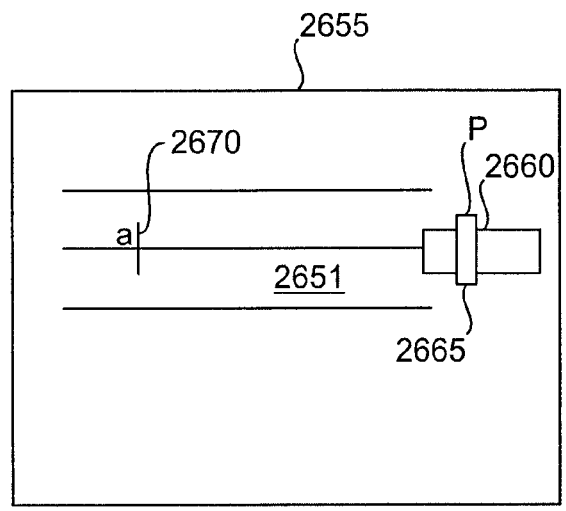
FIG. 26 further illustrates a touch mouse using a sliding lever or rotary knob or joystick representation.

FIG. 26 further illustrates an embodiment of the invention using for example a sliding lever, rotary knob or joystick representation on the display screen. This is another variant, where what ever point you first touch becomes the origin for subsequent movement of the displayed bar, knob or the like.

When used in a car, a driver can just glance over at the screen, touch the screen at a first point desired, which then signals the computer to provide a display on the screen, of a rotary knob, lever or whatever. The display is preferably oriented so that the starting point or frame of reference of its movement is established at the point of finger touch. Alternatively, one can touch the screen at a first point, and then indicate by pushing in on the display or other means that the last point the finger reached is to be considered the first point in this context.

Such a display is preferably big so that one can then easily see the initial position of the knob or slider In the case of a knob, you then can turn it with ones fingers using a touch screen which has a twist motion response. (see FIG. 3). As it is twisted in this virtual manner, a movement of the knob dial with twist may be displayed, along with possibly other changes on the screen such as colors to indicate heat and the like as desired.

It should be noted that in some cases it may be desirable to have an indent in the screen for one finger or other to locate in. This can be handy when driving if it is desirable that the display of data and other information be in the same place on the screen. Alternatively a small ridge in the screen, including linear or annular one can be used. (discussed also in FIG. 1, 5 and elsewhere).

For a slider, you just touch and move the lever with your finger- or better pinch it and pull it back and forth as desired in a virtual motion.

A screen there fore could then provide the ability to at various times display and actuate touch like dials, knobs, etc on the screen, and still have them be conveniently the size of a human hand and fingers. Could just display data in a big area—driver just tries to hit anywhere in the area and receives an indication back like clicks from acoustic pulse or other indicator to his finger.

Such a device can also be used at the side of a page of typewritten data in order to designate a letter in a paragraph say. For example, consider FIG. 26, in which a persons finger 2650 touches point P on the side of a line of writing 2651 on displayed page 2655, and a slider bar 2660 is displayed on the side of the page with a lever 2665 also displayed, which acts to slide a cursor 2670 toward a letter "a" to be designated. Often desired for accurate designation of the letter or other object, is that the movement of the cursor be de-magnified from the movement of the lever.

FIG. 27

Figure 27:
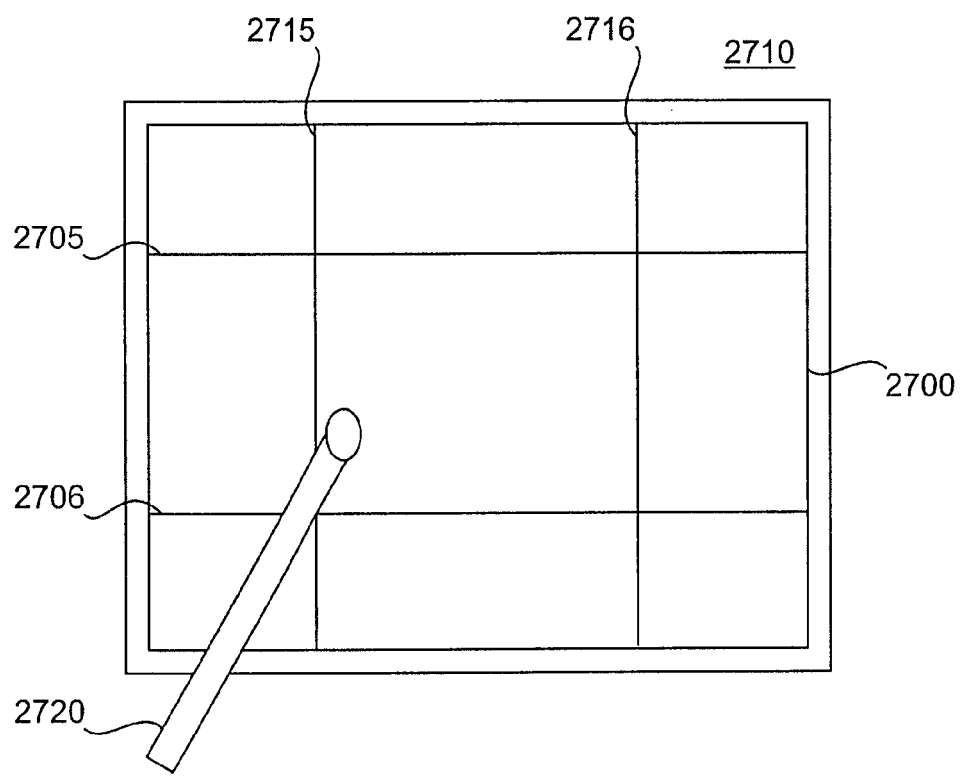
FIG. 27 illustrates embodiments having elastic touch screen properties and employing photo-elastic and other principles

FIG. 27 illustrates improved screen distortion and stress based optical touch screen embodiments, useful in my previous and co-pending applications referenced.

Illustrated, is a clear plastic touch screen 2700 which is reinforced with fine steel wires such as 2705 and 2706 supported by rectangular ring member 2710 (typically of steel or aluminum) which provide elasticity to the screen and basically carry the load caused by a touch to the screen by finger 2720. This has the effect too of making the screen not have too much deflection in the middle, often a problem when large forces are used with an unsupported screen clamped only at the edges. Additionally cross wires can be used to further strengthen the screen such as 2715 and 2716.

An Image projector as before, projects information onto the screen from the rear which is however, blocked in small regions by the wires. If the blockage is small relative to the data presented, it is not objectionable. In addition, or alternatively, the projector control 2730 may be imputed with data concerning the wire location on the screen, and the display program created or modified to keep critical data away from these locations, or at least to make data presented at the wire locations of large enough size as to not be impacted. This is particularly of use at the wire junctures, such as 2735 where crossed wires intersect

FIG. 28

Figure 28A:
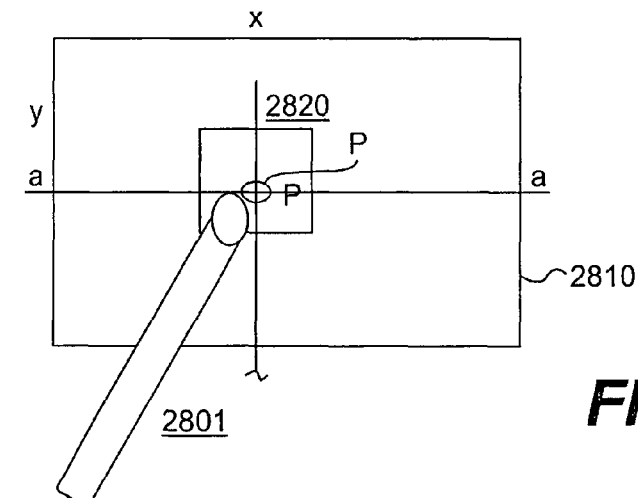
FIGS. 28a-28b illustrate an embodiment of the invention where one first touches a screen at any point desired or comfortable, and said touch is temporarily indented into the screen to serve as reference.

FIG. 28a illustrates an embodiment of the invention where one first touches the screen at any point desired or comfortable, and said touch is temporarily indented into the screen. This indentation, for example in a soft plastic screen, has the latency to later serve as reference to tactilely come back to in a particular short session of touch command activity.

For example consider finger tip 2801 which has just contacted screen 2810 at point "P, and left an indentation 2815 in the screen at the point in question (shown also in depth in section A-A). The purpose of touching the screen in this instance was to hit a large projected box icon 2820 displayed on the screen which cued the system to switch to a new screen.

Figure 28B:
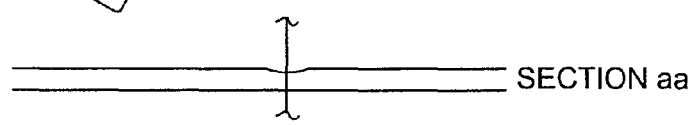
Figure 28B:
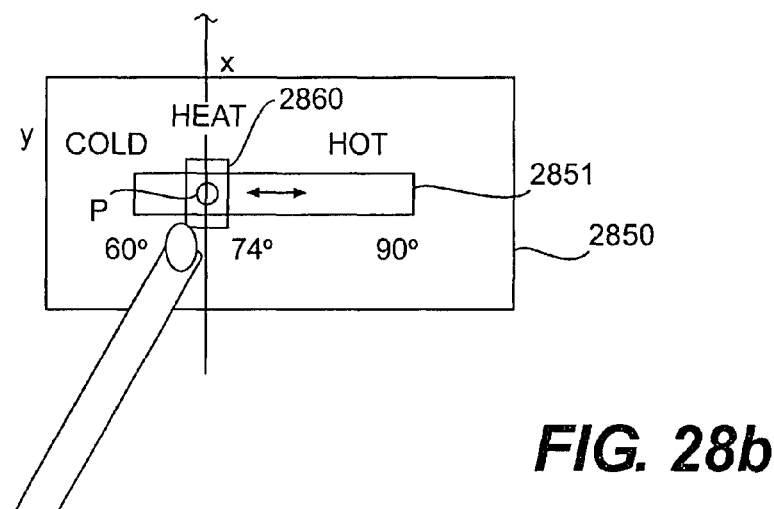

As illustrated in FIG. 28b, the new image such as 2850 displayed by the computer controlled projector, would have its control bar 2851 displayed such that the control lever 2860 would be at the same point "P" of touch, that is at a point whose position was determined by the initial and variant touch location. Put another way, if you hit the big box (e.g. a heat icon) anywhere, the next control of a temperature bar is displayed where the starting point from its present temperature position (e.g. "74 degrees") would be the same point "P" on the screen as you just touched and indented. Thus one can come back to this point, without looking at the screen at all, and move the lever left or right, to increase or decrease temp from 74. The desired setting numbers can be displayed in large letters to make it easy to see.

In another instance it may be desired to come back to point P, and drag the icon box to a new location toward the side of the display, which tells the system a command depending on which side is desired (for example up down, left right for mirror positions). The driver can do this by feeling for the point previously touched—without taking his eyes off the road. And he can further feel the edges of the display, or alternatively, ridges or other indentations in the display as taught herein, if he wishes to explore the limits of the movement possible.

A useful display with such as screen is when the display is caused to "jump" to the point touched. This is discussed relative to FIG. 10 as well The touch screen and related aspects of the invention open up new vistas for adding useful functions for improved control or enjoyment. And the completely programmable nature of the device, provides a future ability to insert new devices.

However, it is often difficult for persons to learn how to use the functionality deliverable. This is particularly true if the person has just gotten into a rental car say. Illustrated a useful embodiment of the invention, wherein the instructions for operation of a device (e.g. the heat control knob and associated computer display screen or screens) is displayed right along with the device on the tactile display or touch screen of the invention.

For example consider in FIG. 1 or 2 for example a table of instructions for use can be down loaded from computer to image projector or other display mechanism and displayed right next the knob or slider or whatever is being used. This makes the understanding much easier, than for example the simple storing of a manual in the computer for later presentation. This is particularly possible when the display is large, and the instructions, and the controls easy to see.

For example, as the person touches the knob, the instructions appear—if an instruction mode is activated in the control computer. The instructions and knob are preferably large enough so that no difficulty is encountered seeing both together in one view.

This aspect of the invention is also very helpful with often complex functions. For example, when the knob is turned to heat as in FIG. 1 or 2, and then pushed in, a thermal bar graph display for example is activated which then itself is energized and used to set the temperature. The instructions then for this function are subsequently displayed to allow the user to at all times be informed as to what is desired.

Further background information and commentary on the Automotive control application.

The driver of the vehicle today, interacts with the controls of the vehicle primarily in three ways by sight only by touch/feel only (possibly accompanied by a sound, such as a click-corresponding to a feeling sensation in many cases, e.g. a detent)

by a quick glance, and then touch. Possibly followed by another quick glance to check a final setting of a knob, slider control, etc.

Typically while driving, only methods 2 and 3 above can be effected, as the control functions are too small to read (radio buttons are notorious) and require too much concentration while driving. Indeed for many users, these functions are effectively completely inoperable while driving, as they cannot be worked by touch only due to the crowded nature of their placement, and they are too hard to see in a glance-especially for those who cannot easily correct their vision away from the far sighted vision needed to drive.

Conversely, some functions, such as turn signal stalks, transmission levers, and some knobs are big enough and/or simple enough such that only touch is needed.

The addition of further desired functions such as internet communication to such an already difficult situation, constitutes a major challenge, and is one of the issues addressed by this invention. For such functions, designers today have heretofore envisioned only voice recognition as the medium for actuation and data retrieval.

Problems of Voice Recognition Alone

In theory one can simply talk to your car. You say wipers on, and they come on, thanks to a program like IBM "via voice" or the like. But this has great difficulty in execution. Noise, unnatural activity, and a need for prompts in anything more than the simplest action, limit the effectiveness. In addition, such action is sequential. You can only do one voice activated thing at a time, and often you must do this slowly.

Consider the extreme frustration of trying to carry out such actions in a noisy environment. You ask to retrieve emails. A voice prompt says from which account, you speak a little softly, it then repeats the request, asking you to speak more slowly/clearly saying it cant under stand. All this takes your mind off the driving and any other task needed. In extreme examples one can become enraged at the system, not a good thing while driving. The more you try to do this way, the worse it is.

Consider too that it may not work well for another driver of the vehicle, as what it has learned with time may not match.

In addition to all of the above, there is a general shortage of dashboard space on which to display data—be it from the vehicle subsystems, or from external sources. Some types of data one would wish to display could be (see also discussion above)

Data useful for driving

Graphical data such as navigational maps, other Navigational information

Picture data useful for front and rear vision and other peripheral viewing.

Data useful for car functions

Maintenance issues

Performance issues etc

Data useful for general information stock price charts, hotel information tourist information Data useful for specific information Email messages for the user Emergency data from outside sources Entertainment—such as TV, games, or Internet for the passengers Tactile Displays and Touch Screens with Physical Attributes A touch screen and/or tactile display such as disclosed above could be used to replace all the display and actuation functions of the conventional dashboard, while at the same time vastly augmenting the potential scope of their application, as it can be reprogrammed to serve different needs in the vehicle at different times. One moment it can be used for heat and radio volume, the next for internet surfing, or camera image viewing (e.g. of the road behind the car) etc. The things to touch are programmably displayed.

Particularly of interest are functions which the touch screen or tactile display may provide in a manner that is "Natural" to the user, such as knob turning, slider moving, switch rocking, turn signaling, transmission mode selection and the like.

The application and adoption by the public of such a radically different dash approach, is probably aided by maintaining as much similarity as possible to the dash of today. And the more tactile, the better, not only for this purpose, but to allow control functions to be found and engaged with the least possible requirement to view the screen while driving in order to engage the needed functions.

The Issue of "Glance" and Degree Thereof Required

Lets consider the "Glance" needed, if any, of the driver to operate today's dash controls.

A worst case is the increasing need for added buttons and the like for the ever multiplying electronic functions of the vehicle or communication systems. With fixed dash space, these become smaller and more complex. And most are not easily arrayed within the drivers line of sight.

In addition, many require not just a first glance, but a continued stare and often a squint—small radio buttons come to mind. Many accidents have been registered as a result, even though the little button once found, may be tactile in nature. Some functions even require one to stare at changing numbers in an awkward location. Others require reading very small print (often impossible for those requiring glasses—a real dilemma for middle aged and old particularly).

A touch screen can free up a whole expanse of screen to work with one function, for example a seat adjustment, or radio. Lettering can be big enough to read without glasses. And by doing all functions this way, a saving in manufacturing cost results as well.

But the touch screen historically has a drawback as noted above, that it too may require of the driver more than a glance to operate successfully. This is because there is nothing on a conventional touch screen to reference ones self too-except the displayed data itself, which then has to be continually read. One means to do this by a "Heads up Display of sorts, displaying data on the windshield is disclosed herein which does not require one to take ones eyes of f the road. Another means is to use computer generated speech commands to for example tell the driver that he has touched, or moved a touch command button to a new position. In this case the Computer voice could say "74 Degrees" for the new setting of the heat control for example.

Another approach is to create a touch screen or conventional display having tactile features, a concept discussed in considerable detail in the invention herein. It can thus be seen that the invention overcomes the problems of conventional touch screens for automotive or other applications in several ways, which can even be combined in some cases.

A Note on the Viewing and Reading of Email and Other Messages.

If email can only be read or spoken, then output of email while driving has to be readable by driver in plain view. But this may be illegal in most jurisdictions. Alternatively, the email message can be spoken to the driver by a text to voice program in the car information presentation computer which also controls the displays of the invention. A suitable program for example is the Text-to-speech (TTS) program of Fonix Corporation.

The read back of email, is something that can be repeated as opportune, or safe. It also can just read who sent the message or other data, with a hand or finger control of the invention used to select whatever further info is desired from the computer and the email source.

A bigger problem on the input side, is for a driver to command actions to a voice recognition program while trying to do something else (e.g. talk on a cell phone) or have conversation going with others. For this function, a tactile based system, possibly combined with voice is considered superior.

Method of Manufacture and Sale

The invention herein would appear to be less costly to manufacture than conventional dashboards, since two or three displays of the invention, which can be installed as modules along with the airbags (at least where airbags are used), can contain all means necessary to control the vehicle, plus provide a large number of exciting further functions and attributes. This means that only a few connections need be made to the other wiring and computers in the car as well.

Heating, defrosting and air conditioning ducts and other related HVAC devices such as mixing doors etc are still required.

It is possible to assemble the displays/airbag modules by inserting them from the front (toward the inside of the car) in a finished vehicle. This keeps them from damage in the line type assembly process. From a trim point however, assembly from the rear allows perhaps a more esthetically pleasing dash. Or the placement of a final trim panel over the displays once assembled can be made.

Indeed the invention lends itself to dealer or after market installation as well. In one scenario, cars could be delivered to dealers without these components, and customers would go into a special room at the dealership and chose their instrumentation to their own tastes. This then would be programmed, any overlays or trim made, and installed in the vehicle. This tends to build dealership traffic, which otherwise is threatened due to the Internet purchasing of vehicles trend, possible if all vehicles are commodities.

It is noted that new display and touch functions can even be downloaded from an internet site such as that of the manufacturer—directly even to the user. This allows a continuous upgrade path for approved "accessories" of a software nature.

The Problem of Driver Viewing of Prohibited Screens.

U.S. Pat. No. 5,949,345 assigned to Microsoft, addresses the issue of what screens on a conventional computer display can be presented to the driver. This is a useful concept to incorporate with the instant invention, in this case making the total touch screen presentation generated in accordance with the ideas of U.S. Pat. No. 5,949,345 or those herein.

There is another problem, that is how to sift through information contained in different screens? U.S. Pat. No. 5,995,3404 addresses one solution to the problem of making the driver sequentially view different screens until he gets to the one of interest, and describes the man machine interface devices such as joysticks needed to operate it. This reference describes a 3D screen presentation where all data is visible (supposedly) in one glance. This too can be incorporated with the touch screen invention here, but is thought to be at least somewhat objectionable as it departs from the classical presentation of dashboards in cars, or instrument panels in planes, which other wise the instant invention herein desirably resembles—a major advantage over presentation of "Computer-like" displays.

Other Ideas

In the touch screen devices above, the various screen selections have been switched by either actuating a switch (which might be gesture activated), or by voice or gesture command—that is say HEAT (or say, point at the heater), and the heat touch screen appears (or a screen having heat controls among other essential things, such as a speedometer display).

One approach too is to have substantially every screen presented, and have a section common to all, which contains a selection control to switch screens.

The screens of the invention can as disclosed be used in numerous positions on the dash or elsewhere, and in some cases can cover the near total width of the dash. It is possible to envision that the image computers creating the displays for such screens could have multiple programs stored in the vehicle, loaded in by CD ROMs or DVD Discs, or down load new programs over the internet or other communication channels from remote data bases.

Some novel screens could be for example to change the language of the screen, English to Spanish for example. But not only that, but to change the motif of the screen- to a more Spanish preferred layout if desired. OR the motif could depend on personal rather than regional tastes, for example a dash with a GO BLUE theme, if the driver was a die hard University of Michigan supporter for example. An Impressionist art lover, could have Van Goghs and Renoir's decorating his dash, and so on. In the extreme case of flexibility, not only could the language change and the decoration change, but also the actual placement and type of controls. For example ones standard and other screens could be changed to suit, limited by any laws that require certain data at all times, for example. Business interests could include stock tickers and the like, with data received off the internet by cell phone.

And the display could be dynamic, with display of at least data varying with time, for example pictures varying with music.

Figure 19:
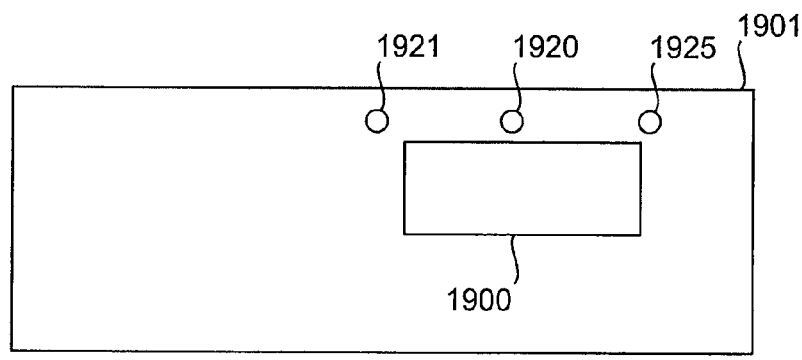
FIG. 19 illustrates a multipurpose home application of the invention

The same arguments also apply for the screen in ones home, or in ones office such as disclosed in FIGS. 19 and 20 for example.

It should be noted that when the sensing of a finger used to touch a screen is performed independently of the screen itself, for example as described in FIG. 6c, then the programmable screen "feel can be anything which is transparent enough for the projected image, without regard to whether the screen itself has the ability itself to sense touch.

The touch screen and other sensing aspects of the invention above are useful for navigational purposes as well. A large screen presentation is available which is easy to see, and the driver can immediately designate a desired blow up of a route or other aspect on a map by rapidly touching it. The driver can also quickly draw on the map a possible alternative route, which the computer of the map system (local or remote) can then explore, and suggest possible avenues.

A Note on New Business Models

In addition to the improved vehicle safety and control possibilities provided by the invention, there are many "New Business" possibilities opened up by instrument panels build according to the invention. From an internet business point of view, one for example, could customize ones own dash over the internet from the manufacturers or sellers web site, designing just how you wanted it presented. Perhaps you would want it all touch screen, or perhaps with some "real" knobs or the like. Then when the car was delivered it would be special for you, also with your name and address on the screen (a theft deterrent too!) for example. If you wanted to change it later, it could be reprogrammed by the dealer (or possibly yourself), and if you wanted major change, you could go back to the web site and design another one which could be put in. This could also done, just by changing an overlay and/the program for projecting images (if a projection display) and interpreting the touch screen and any other inputs such as cameras, microphones (for voice input or other purposes), etc.

It should be noted that the programmable tactile features, such as knobs of the invention can have their use changed by the user, or by download of new functions from some source such as a car company (g GM) web site.

Because the functions are shared, so much more data can be presented—even down to minor things like giving heater outlet air blowing regimens and graphs-any data available indeed where one can easily go back to important functions and data when needed.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention

What is claimed:

1. A method for controlling a computer system, comprising:
   detecting a touch input at a first point of touch on a touch screen;
   in response to the detected touch input, displaying a first image at the first point of touch;
   detecting a direction of a tangential force applied upon the touch screen concurrently with the touch input; and
   adjusting the first image in accordance with the detected direction of the tangential force.

2. The method according to claim 1, further comprising adjusting a value in the computer system based on the determined direction of the tangential force.

3. The method according to claim 1, further comprising detecting a distortion on the touch screen at the first point of touch, and detecting the direction of the tangential force based on the detected distortion.

4. The method according to claim 1, wherein the first image is adjusted about the first point of touch while the first point of touch remains substantially stationary.

5. The method according to claim 1, further comprising:
   detecting a magnitude of the tangential force associated with the touch input; and
   adjusting a value in the computer system based on the detected magnitude of the tangential force.

6. The method according to claim 1, further comprising detecting the direction of tangential force by detecting a temporary movement of the touch input across the touch screen followed by a stoppage of that movement.

7. The method according to claim 4, wherein the first image is a virtual controller, and wherein a first portion of the virtual controller is adjusted about the first point of touch while a second portion of the virtual controller remains stationary at the first point of touch.

8. The method according to claim 7, wherein the virtual controller is one of a virtual slider, a virtual knob or a virtual keyboard displayed on the touch screen.

9. The method according to claim 1, further comprising receiving a direction indication from a voice input.

10. The method according to claim 1, wherein the detected direction is selected from a right direction, a left direction, an up direction, a down direction and a combination thereof.

11. The method according to claim 1, further comprising adjusting the first image by a first rate as long as the touch input is detected.

12. The method according to claim 11, wherein the first rate is determined based on a magnitude of the detected tangential force.

13. A method according to claim 1, wherein the touch screen is implemented in a vehicle compartment for controlling various automobile functions.

14. A device, comprising:
- a touch screen configured for receiving a touch input at a first point of touch; and
- a processor communicatively coupled to the touch screen, the processor capable of displaying a first image at the first point of touch in response to the touch input, detecting a tangential direction of force associated with the touch input, and adjusting the first image in accordance with the detected direction of the tangential force.

15. The device according to claim 14, the processor further capable of adjusting a value in the computer system based on the determined tangential direction of the force.

16. The device according to claim 14, the processor further capable of adjusting the first image about the first point of touch while the first point of touch remains substantially stationary.

* * * * *

UNITED STATES PATENT AND TRADEMARK OFFICE
CERTIFICATE OF CORRECTION

Page 1 of 1

PATENT NO. : 8,576,199 B1
APPLICATION NO. : 11/878024
DATED : November 5, 2013
INVENTOR(S) : Pryor It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1387 days.

Signed and Sealed this
Seventh Day of April, 2015

Michelle K. Lee
*Director of the United States Patent and Trademark Office*